US005706569A

United States Patent [19]

Miyamoto et al.

[11] Patent Number: 5,706,569

[45] Date of Patent: Jan. 13, 1998

[54] APPARATUS FOR ASSEMBLING PLUG JOINT

[75] Inventors: Takayuki Miyamoto; Hiroyuki Watanabe, both of Yokkaichi, Japan

[73] Assignee: Sumitomo Wiring Systems, Ltd., Japan

[21] Appl. No.: 563,284

[22] Filed: Nov. 28, 1995

[30] Foreign Application Priority Data

| | | | |
|---|---|---|---|
| Dec. 7, 1994 | [JP] | Japan | 6-303911 |
| Jan. 20, 1995 | [JP] | Japan | 7-007308 |
| Feb. 14, 1995 | [JP] | Japan | 7-025279 |
| Feb. 28, 1995 | [JP] | Japan | 7-040803 |
| Mar. 9, 1995 | [JP] | Japan | 7-050060 |

[51] Int. Cl.[6] .............. B23P 19/04; H01R 43/00

[52] U.S. Cl. .............. 29/564.1; 29/754

[58] Field of Search .............. 29/33.12, 747, 29/754, 564.1, 742, 235, 859, 857, 854; 445/7, 67

[56] References Cited

U.S. PATENT DOCUMENTS

| | | | |
|---|---|---|---|
| 2,683,924 | 7/1954 | Schryver et al. | 29/754 |
| 3,807,021 | 4/1974 | Birkett | 29/754 |
| 3,849,850 | 11/1974 | Goutard | 445/67 |
| 3,955,414 | 5/1976 | Anderson | 29/747 |
| 5,267,869 | 12/1993 | Nadasky et al. | 29/859 |

FOREIGN PATENT DOCUMENTS 619631 10/1994 European Pat. Off. .

*Primary Examiner*—William R. Briggs
*Attorney, Agent, or Firm*—Jordan B. Bierman; Bierman, Muserlian and Lucas LLP

[57] ABSTRACT

A plug joint assembling apparatus (50) includes a joint bushing feed portion (100), a terminal temporary insertion portion (200), a terminal main insertion portion (300), a withstand voltage test portion (400), a terminal insertion condition check and talc coating portion (500), a first joint bushing extraction and supply mechanism (600), a second joint bushing extraction and supply mechanism (701), a third joint bushing extraction and supply mechanism (710), a fourth joint bushing extraction and supply mechanism (720), and a joint bushing extraction mechanism (730). These mechanisms (600, 701, 710, 720, 730) transport joint bushings. The joint bushing feed portion (100) includes a joint bushing check station (110) having a length measuring mechanism and an air vent hole detecting mechanism. The plug joint assembling apparatus (50) assembles plug joints efficiently at a stable pace by automatic assembly processes, stabilizes a check level, and improves reliability.

26 Claims, 44 Drawing Sheets

APPARATUS FOR ASSEMBLING PLUG JOINT

BACKGROUND OF THE INVENTION

1. Field of the Invention

The present invention relates to a plug joint assembling apparatus intended for the automatic assembly, checks and talc coating of a so-called direct-coupled plug joint which is connected at its one end to a spark plug in a plug hole formed in a cylinder head of an internal combustion engine of an automotive vehicle and the like and connected at its opposite end to an ignition coil thereof.

2. Description of the Background Art

An example of the conventional direct-coupled plug joints includes a plug joint 5 as shown in FIG. 37 which comprises a tubular joint bushing 1 made of an insulative elastic material such as rubber, and a joint terminal 4 received in the joint bushing 1 and having a tubular terminal element 2 and a coil spring 3 serving as a terminal spring and connected to one end of the tubular terminal element 2.

The joint bushings 1 are of various shapes and lengths in accordance with the models of the internal combustion engines. The joint bushing 1 on the end connected to the ignition coil has an outwardly overhanging sealing collar portion 6 for contact with the outer surface of the periphery of the plug hole of the cylinder head to ensure a water-tight seal. The sealing collar portion 6 has suitable air vent holes 7.

The assembly processes of the plug joint 5 are described below. The joint bushing 1 and the joint terminal 4 having the terminal element 2 and coil spring 3 connected together are prepared. As shown in FIGS. 38 and 39, the joint terminal 4, with the coil spring 3 at the front, is temporarily inserted by hand into a predetermined position in the joint bushing 1 to provide the joint bushing 1 in a temporary insertion condition in which a part of the joint terminal 4 is inserted (terminal temporary insertion process).

Next, the joint bushing 1 in the temporary insertion condition is set to a terminal inserting machine 9 in a predetermined position as shown in FIGS. 40 and 41. The terminal inserting machine 9 is actuated to provide the plug joint 5 such that the joint terminal 4 is received in the joint bushing 1 in a predetermined position as shown in FIG. 37 (terminal main insertion process).

The terminal inserting machine 9 comprises, on the upper surface of a support table 10, a total of ten bushing rests 11 arranged in side-by-side relation longitudinally of the support table 10 and each for resting thereon the joint bushing 1 so that its longitudinal axis extends in the transverse direction of the support table 10. A slide cylinder 12 is actuated to permit the bushing rests 11 to move in the longitudinal direction of the support table 10 along a slide guide 13.

A support base 15 supports five bushing hold-down elements 14 for vertical sliding in corresponding relation to five bushing rests 11 in the middle of the sliding path of the bushing rests 11. A hold-down cylinder 16 is actuated to permit the bushing hold-down elements 14 to move integrally in the vertical direction.

An insertion cylinder 17 is provided on the upper surface of the support table 10 in corresponding relation to the support base 15. A slide base 19 slidable along a pair of left and right slide guides 18 is provided with terminal push-in elements 20 corresponding to the bushing rests 11. The insertion cylinder 17 is actuated to permit the slide base 19 to move along the slide guides 18.

As the joint bushings 1 in the temporary insertion condition are set respectively on the five bushing rests 11 extending toward either end of the support table 10 and the slide cylinder 12 is actuated, the bushing rests 11 with the joint bushings 1 in the temporary insertion condition placed thereon move toward the middle of the support table 10.

Then the hold-down cylinder 16 is actuated to move the bushing hold-down elements 14 downwardly onto the bushing rests 11 to hold the joint bushings 1 in position. In this state, the insertion cylinder 17 is actuated to move the terminal push-in elements 20 toward the joint bushings 1. The terminal push-in elements 20 force the temporarily inserted joint terminals 4 into the joint bushings 1 by a predetermined amount.

The actuation of the insertion cylinder 17 retracts the terminal push-in elements 20. The actuation of the hold-down cylinder 16 moves the bushing hold-down elements 14 upwardly. The actuation of the slide cylinder 12 moves the bushing rests 11 to the original position. Then the joint bushings 1 in which the joint terminals 4 have already been inserted may be removed from the bushing rests 11.

The plug joint 5 wherein the joint terminal 4 is inserted in the predetermined position in the joint bushing 1 is tested for electrical leakage from the joint terminal 4 to the outside due to a crack or damage in the joint bushing 1 (withstand voltage test process).

In the leak test, as shown in FIG. 42, the terminal element 2 of the plug joint 5 is set and connected to an electrode 23 of a leak check tool 22 to conduct a high voltage generated by the ignition coil to the electrode 23. Then an operator brings a ground rod 24 closer to a non-conducting portion of the outer peripheral surface of the joint bushing 1 to visually recognize whether or not sparking occurs.

After the withstand voltage test process is completed, the plug joint 5 is subjected to a retraction length check for correct insertion of the terminal element 2 in the predetermined position in the joint bushing 1, and talc is applied to the inner peripheral surface of an end portion of the joint bushing 1 for purposes of reducing the inserting force when mounted to the spark plug and preventing seizing up (retraction length check and talc coating process).

The retraction length check is carried out by using a predetermined gauge rod 26 having a marked portion **26*a* indicative of an allowable range M (for example, ±0.5 mm) around the position of a standard retraction length L as shown in FIGS. 43 and 44. An end of the gauge rod 26 is inserted into the plug joint 5 toward the terminal element 2, and an operator visually recognizes whether or not the marked portion 26*a* of the gauge rod 26 is located at the edge position of the joint bushing 1 when the inserted end of the gauge rod 26 contacts the edge of the terminal element 2 to determine that the retraction length N of the terminal element 2** is acceptable or rejected.

In the talc coating process, an operator manually applies talc to the inner peripheral surface of the joint bushing 1.

After the retraction length check and talc coating process, the plug joint 5 is subjected to final checks including a length measuring check for visually recognizing whether or not the joint bushing 1 has a predetermined length by using a gauge, an air vent hole check for visually recognizing whether or not the predetermined air vent holes 7 have been formed, with a light illuminated, and a coil spring presence check for looking into the interior of the joint bushing 1 illuminated by a light from one end to visually recognize whether or not the coil spring 3 is removed (final check process).

In the conventional assembly processes of the plug joint 5, however, one operator is required for each of the terminal temporary insertion process, terminal main insertion process, withstand voltage test process, retraction length check and talc coating process, and final check process. The respective operations principally depend upon the manual operation of the operators and are accordingly executed at varied paces, resulting in the difficulty in establishing an assembly line of the assembly process steps.

Further, the operations in the withstand voltage test process, retraction length check and talc coating process, and the final check process depend upon the skills of the operators and might cause a check error resulting from operator fatigue. Thus, the conventional operations are not reliable and might cause determination errors of the individuals, causing unstable check levels.

SUMMARY OF THE INVENTION

A first aspect of the present invention is intended for a plug joint assembling apparatus for inserting a joint terminal into an insulative tubular joint bushing to assemble a plug joint, the joint bushing including at its one end a sealing collar portion having an air vent hole, the joint terminal including a tubular terminal element and a terminal spring connected to one end of the terminal element and serving as a coil spring. According to the present invention, the plug joint assembling apparatus comprises: a joint bushing feed portion for feeding the joint bushing from a first position to a second position; a terminal temporary insertion portion for temporarily inserting a part of the joint terminal into the joint bushing; a terminal main insertion portion for inserting the joint terminal into a set position in the joint bushing; a withstand voltage test portion for checking the joint bushing receiving the joint terminal therein for leak; a terminal insertion condition check and talc coating portion for performing a retraction length check on the joint terminal received in the joint bushing, performing a continuity check between the terminal element and terminal spring of the joint terminal, and applying talc to an inner peripheral surface of the joint bushing around the terminal spring; a first joint bushing extraction and supply mechanism for removing the joint bushing from the second position in the joint bushing feed portion to feed the joint bushing to the terminal temporary insertion portion; a second joint bushing extraction and supply mechanism for removing the joint bushing from the terminal temporary insertion portion to feed the joint bushing to the terminal main insertion portion; a third joint bushing extraction and supply mechanism for removing the joint bushing from the terminal main insertion portion to feed the joint bushing to the withstand voltage test portion; a fourth joint bushing extraction and supply mechanism for removing the joint bushing from the withstand voltage test portion to feed the joint bushing to the terminal insertion condition check and talc coating portion; a joint bushing extraction mechanism for removing and feeding the joint bushing from the terminal insertion condition check and talc coating portion; a length measuring mechanism for detecting the axial length of the joint bushing; and an air vent hole detecting mechanism for detecting the air vent hole, the length measuring mechanism and the air vent hole detecting mechanism being located at a given position in a joint bushing feed path extending from the first position to the second position in the joint bushing feed portion.

Preferably, according to a second aspect of the present invention, the joint bushing feed portion is provided in linear form in a predetermined direction; and the terminal temporary insertion portion, the terminal main insertion portion, the withstand voltage test portion and the terminal insertion condition check and talc coating portion are arranged sequentially in side-by-side relation in a direction from the second position toward the first position.

Preferably, according to a third aspect of the present invention, the first joint bushing extraction and supply mechanism, the second joint bushing extraction and supply mechanism, the third joint bushing extraction and supply mechanism, the fourth joint bushing extraction and supply mechanism, and the joint bushing extraction mechanism are operated in synchronism with each other.

Preferably, according to a fourth aspect of the present invention, the plug joint assembling apparatus further comprises a control portion for exercising control so that the talc coating is dispensed with when any one of the results of the leak check, the retraction length check and the continuity check is determined as defective.

Preferably, according to a fifth aspect of the present invention, the plug joint assembling apparatus further comprises: a defective take-out portion for transporting a defective, and a product take-out portion for transporting a acceptable product, wherein the control portion exercises control so that the joint bushing extraction mechanism transports the joint bushing to the defective take-out portion when any one of the results of the leak check, the retraction length check and the continuity check is determined as defective, and so that the joint bushing extraction mechanism transports the joint bushing to the product take-out portion when all of the results of the leak check, the retraction length check and the continuity check are determined as acceptable.

Preferably, according to a sixth aspect of the present invention, the terminal insertion condition check and talc coating portion includes a talc coating rod having a peripheral surface formed with talc emitting holes for applying talc to the inner peripheral surface of the joint bushing, and a cover element for covering the talc coating rod.

Preferably, according to a seventh aspect of the present invention, the joint bushing feed portion includes an endless belt element movable around in a predetermined direction for feeding the joint bushing from the first position to the second position, and a plurality of bushing retaining elements mounted on an outer peripheral surface of the endless belt element in predetermined spaced relation in the predetermined direction, each of the bushing retaining elements having a retentive shaft portion to be inserted in the joint bushing for holding the joint bushing in a vertical position, with the sealing collar portion located downside; and the plug joint assembling apparatus further comprises a joint bushing check station provided at a given position in the joint bushing feed path, the joint bushing check station including the length measuring mechanism and the air vent hole detecting mechanism.

Preferably, according to an eighth aspect of the present invention, the length measuring mechanism includes a height detector for detecting the height of an upper end of the joint bushing placed on and held by each of the bushing retaining elements to detect the axial length of the joint bushing.

Preferably, according to a ninth aspect of the present invention, the air vent hole detecting mechanism includes a lifting portion for grasping an upper end portion of the joint bushing in a position at the joint bushing check station to lift the joint bushing upwardly, an air vent hole detecting portion movable toward and away from the sealing collar portion of the joint bushing lifted by the lifting portion, and a rotating portion for rotating the joint bushing lifted by the lifting portion about its axis, the air vent hole detecting portion having a hole detector for detecting the air vent hole.

Preferably, according to a tenth aspect of the present invention, the air vent hole detecting portion includes a pair of air vent hole detecting portions corresponding to opposite sides of the joint bushing, each of the pair of air vent hole detecting portions including a guide roller in rolling contact with an outer peripheral surface of the joint bushing about its vertical axis when moved toward the sealing collar portion.

Preferably, according to an eleventh aspect of the present invention, the terminal temporary insertion portion includes a temporary insertion bushing chucking mechanism for releasably holding the joint bushing in a horizontal position, a terminal chucking mechanism in coaxially aligned relation with the joint bushing held by the temporary insertion bushing chucking mechanism for releasably holding the joint terminal, with the terminal spring directed toward the joint bushing, a terminal supply mechanism for supplying the joint terminal to the terminal chucking mechanism, and a terminal temporary insertion mechanism having an alignment rod portion to be inserted in the joint terminal held by the terminal chucking mechanism in such a manner as to enter the terminal element to reach the terminal spring, the terminal temporary insertion mechanism for temporarily inserting a part of the joint terminal into the joint bushing, with the alignment rod portion received in the joint terminal; the terminal main insertion portion includes a main insertion bushing chucking mechanism for releasably holding the joint bushing in a horizontal position, and a terminal main insertion mechanism for forcing the temporarily inserted joint terminal into the set position in the joint bushing held by the main insertion bushing chucking mechanism; and the first joint bushing extraction and supply mechanism feeds the joint bushing to the temporary insertion bushing chucking mechanism, and the second joint bushing extraction and supply mechanism removes the joint bushing from the temporary insertion bushing chucking mechanism to feed the joint bushing to the main insertion bushing chucking mechanism.

Preferably, according to a twelfth aspect of the present invention, the terminal chucking mechanism is moved integrally with the joint terminal when the joint terminal receiving the alignment rod portion therein is temporarily inserted into the joint bushing.

Preferably, according to a thirteenth aspect of the present invention, the terminal main insertion mechanism includes a pushing element for pushing the joint terminal, and the plug joint assembling apparatus further comprises: a control portion for controlling the amount of insertion of the joint terminal forced by the pushing element.

Preferably, according to a fourteenth aspect of the present invention, the withstand voltage test portion includes a check bushing chucking mechanism for releasably holding an outer peripheral surface of the joint bushing in a horizontal position, and a voltage applying mechanism for applying voltage to the joint terminal in the joint bushing held by the check bushing chucking mechanism, the check bushing chucking mechanism including a pair of conductive grounded chucking elements supported by an insulating member for holding the joint bushing in a horizontal position, the voltage applying mechanism including a electrode portion for removably contacting the joint terminal in the joint bushing held by the check bushing chucking mechanism; and the withstand voltage test portion further includes a leak detector for detecting current flowing in the grounded chucking elements when voltage is applied to the electrode portion in contact with the joint terminal.

Preferably, according to a fifteenth aspect of the present invention, the pair of grounded chucking elements hold an axially intermediate portion of the joint bushing.

Preferably, according to a sixteenth aspect of the present invention, the withstand voltage test portion further includes a ground portion for grounding the grounded chucking elements; and the leak detector includes a current amplifier for amplifying current flowing from the grounded chucking elements to the ground portion, a variable resistor for converting the current amplified by the current amplifier to voltage, and an indicator for indicating the voltage converted by the variable resistor.

Preferably, according to a seventeenth aspect of the present invention, the voltage applying mechanism includes an insulative cover element for surrounding an outer periphery of the voltage applying mechanism.

Preferably, according to an eighteenth aspect of the present invention, the terminal insertion condition check and talc coating portion includes a bushing retaining mechanism for holding the joint bushing in a horizontal position, a retraction length check mechanism for checking a retraction length from an edge of the terminal element to an end surface of the joint bushing receiving the joint terminal therein, and a talc coating mechanism for applying talc to the inner peripheral surface of the joint bushing receiving the joint terminal therein around the terminal spring, the retraction length check mechanism and the talc coating mechanism being opposed on both sides of the bushing retaining mechanism, the retraction length check mechanism including a retraction length measuring rod made of a conductive material and removably inserted into the joint bushing held by the bushing retaining mechanism for removably contacting the edge of the terminal element, a check element axially movably fitted on and held by the retraction measuring rod and elastically urged toward the forward end of the retraction length measuring rod, the check element for releasably contacting an edge of the joint bushing when the retraction length measuring rod is inserted into the joint bushing, and a retraction length detector for detecting the position of the check element relative to the retraction length measuring rod in contact with the edge of the terminal element, the talc coating mechanism including a talc coating rod made of a tubular conductive material and removably inserted into the joint bushing held by the bushing retaining mechanism for releasable elastic contact with an edge of the terminal spring, and a talc pressure feed portion for feeding a predetermined amount of talc under pressure into the talc coating rod, the talc coating rod having a peripheral surface formed with talc emitting holes for emitting talc, the terminal insertion condition check and talc coating portion further includes a continuity detecting portion for detecting continuity between the retraction length measuring rod in contact with the terminal element and the talc coating rod in elastic contact with the terminal spring.

Preferably, according to a nineteenth aspect of the present invention, the terminal insertion condition check and talc coating portion further includes a talc coating rod rotating mechanism for rotating the talc coating rod about its axis in synchronism with pressure feed of talc into the talc coating rod.

Preferably, according to a twentieth aspect of the present invention, the talc coating rod has a felt element mounted on an outer peripheral surface of a forward end portion thereof for slidable contact with the inner peripheral surface of the joint bushing.

Preferably, according to a twenty-first aspect of the present invention, the plug joint assembling apparatus further comprises: a control portion for sequentially performing the continuity check by the continuity detecting portion, the retraction length check by the retraction length check mechanism, and the talc coating by the talc coating mechanism.

In the first aspect of the present invention, the joint bushing fed to the joint bushing supply position in the joint bushing feed portion is transported to the joint bushing extraction position by the joint bushing feed portion. On the midway in the feed of the joint bushing, the length measuring mechanism detects whether or not the axial length of the joint bushing equals a predetermined length, and the air vent hole detecting mechanism detects the presence/absence of the air vent hole in the sealing collar portion.

Upon reaching the joint bushing extraction position, the joint bushing is removed from the joint bushing extraction position and then fed to the terminal temporary insertion portion by the first joint bushing extraction and supply mechanism.

In the terminal temporary insertion portion, the joint terminal is temporarily inserted into the fed joint bushing.

The joint bushing in which the joint terminal is temporarily inserted is removed from the terminal temporary insertion portion and then fed to the terminal main insertion portion by the second joint bushing extraction and supply mechanism.

In the terminal main insertion portion, the joint terminal in the temporary insertion condition is inserted into the set position in the joint bushing. In this manner, a plug joint is assembled.

The joint bushing in which the joint terminal is inserted into the predetermined position is removed from the terminal main insertion portion and then fed to the withstand voltage test portion by the third joint bushing extraction and supply mechanism.

In the withstand voltage test portion, the joint bushing is checked for leak.

Upon completion of the leak check, the joint bushing is removed from the withstand voltage test portion and then fed to the terminal insertion condition check and talc coating portion by the fourth joint bushing extraction and supply mechanism.

The terminal insertion condition check and talc coating portion performs a retraction length check on the joint terminal received in the joint bushing, performs a continuity check between the tubular terminal element and terminal spring of the joint terminal, and applies talc to the inner peripheral surface of the joint bushing around the terminal spring.

The joint bushing extraction mechanism removes the joint bushing from the terminal insertion condition check and talc coating portion to feed the joint bushing to the predetermined position.

In this fashion, the assembly processes, respective checks and talc coating are carried out automatically. The automatic assembly processes allow efficient assembly of the plug joints at a stable pace and a stable check level with improved reliability.

The automatic assembly processes reduce the number of operators and production costs.

In the second aspect of the present invention, the joint bushing feed portion is provided in linear form in the predetermined direction, and the terminal temporary insertion portion, terminal main insertion portion, withstand voltage test portion, and terminal insertion condition check and talc coating portion are arranged in side-by-side relation in the direction from the joint bushing extraction position toward the joint bushing supply position. This reduces the size of the whole apparatus and the space for installation.

In the third aspect of the present invention, the first joint bushing extraction and supply mechanism, the second joint bushing extraction and supply mechanism, the third joint bushing extraction and supply mechanism, the fourth joint bushing extraction and supply mechanism, and the joint bushing extraction mechanism are operated in synchronism with each other, thereby accomplishing efficient assembly of the plug joints.

In the fourth aspect of the present invention, the control portion exercises control so that the talc coating is dispensed with when any one of the results of the leak check, extraction length check and continuity check is determined as defective. The provision of such a control portion effectively prevents talc coating from being wasted and readily determines the assembled plug joint as acceptable or defective depending on the presence/absence of talc.

In the fifth aspect of the present invention, the control portion exercises control so that the joint bushing extraction mechanism transports the joint bushing to the defective take-out portion when any one of the results of the leak check, retraction length check and continuity check is determined as defective and so that the joint bushing extraction portion transports the joint bushing to the product take-out portion when all of the results of the leak check, retraction length check and continuity check are determined as acceptable. The provision of such a control portion automatically classifies the plug joints into the acceptable products and defectives, improving work efficiency.

In the sixth aspect of the present invention, the terminal insertion condition check and talc coating portion includes the talc coating rod having the peripheral surface formed with the talc emitting holes for applying talc to the inner peripheral surface of the joint bushing and the cover element for covering the talc coating rod, thereby effectively preventing talc from flying off.

In the seventh aspect of the present invention, when the joint bushings with the sealing collar portion positioned downside are sequentially fitted on the retentive shaft portions of the bushing retaining elements mounted on the endless belt element in the joint bushing supply position, the joint bushings in the vertical position are placed on and held by the bushing retaining elements and sequentially fed toward the joint bushing extraction position as the endless belt element is moved around.

At the joint bushing check station located midway in the feed path of the joint bushings, the length measuring mechanism detects whether or not the axial length of the joint bushing equals the predetermined length, and the air vent hole detecting mechanism detects whether or not the predetermined air vent hole is formed.

The automatic feed of the joint bushings to the joint bushing extraction position in this manner can supply the joint bushings to the next process at a stable pace. The length measuring mechanism and air vent hole detecting mechanism automatically perform the length measurement of the joint bushings and the check for the air vent hole, respectively, providing the stable check level.

In the eighth aspect of the present invention, the height detector is provided for detecting the top end height of the joint bushing placed on and held by the bushing retaining element. The height detector detects the top end height of the joint bushing to detect the axial length of the joint bushing. This allows the detection of the axial length of the joint bushing being transported to the joint bushing check station.

In the ninth aspect of the present invention, the air vent hole detecting mechanism includes the lifting portion for grasping the upper end portion of the joint bushing in the position at the joint bushing check station to lift the joint bushing upwardly, the air vent hole detecting portion movable toward and away from the sealing collar portion of the joint bushing lifted by the lifting portion and having a hole detector for detecting the air vent hole, and a rotating portion for rotating the joint bushing lifted by the lifting portion about its axis. As the joint bushing is lifted upwardly by the lifting portion and then rotated in the lifted position by the rotating portion, the hole detector of the air vent hole detecting portion detects the air vent hole in the sealing collar portion throughout the circumference of the sealing collar portion.

In the tenth aspect of the present invention, the pair of air vent hole detecting portions are provided in corresponding relation to opposite sides of the joint bushing, and each of the pair of air vent hole detecting portions has a guide roller in rolling contact with the outer peripheral surface of the joint bushing about its vertical axis when each air vent hole detecting portion is moved toward the sealing collar portion. The guide rollers rotate the joint bushing while guiding the joint bushing in the predetermined position, permitting stable rotation of the joint bushing.

In the eleventh aspect of the present invention, the first joint bushing extraction and supply mechanism feeds the joint bushing to the temporary insertion bushing chucking mechanism, and the terminal supply mechanism feeds the joint terminal to the terminal chucking mechanism. In this state, the terminal temporary insertion mechanism is driven to insert the alignment rod portion of the terminal temporary insertion mechanism into the joint terminal. Then, with the alignment rod portion inserted in the joint terminal, a part of the joint terminal is temporarily inserted into the joint bushing.

During the temporary insertion of the joint terminal, the alignment rod portion enters the terminal element to reach the terminal spring. This restricts the curve of the free end of the terminal spring, effectively prevents the terminal spring from being removed from the terminal element when the joint terminal is temporarily inserted, and allows the smooth temporary insertion of the joint terminal.

Upon completion of the temporary insertion of the joint terminal, the temporary insertion joint bushing extraction and supply mechanism removes the joint bushing from the temporary insertion bushing chucking mechanism to feed the joint bushing to the main insertion bushing chucking mechanism. In this state, the terminal main insertion mechanism is driven to force the joint terminal in the temporary insertion condition into the set position. In this manner, there is provided the joint bushing in which the joint terminal is inserted into the predetermined position.

The automatic temporary and main insertions of the joint terminal eliminate the need for an operator to care much about the removal of the terminal spring and to manually push the joint terminal in the temporary insertion, alleviating the operation. The insertion of the joint terminal is facilitated and operator's fatigue is alleviated.

The automatic feed of the joint bushing to the temporary insertion bushing chucking mechanism and main insertion bushing chucking mechanism stabilizes the feed positions of the joint bushing in the temporary insertion bushing chucking mechanism and main insertion bushing chucking mechanism. When the terminal main insertion mechanism forces the joint terminal in the joint bushing, the insertion position of the joint terminal relative to the joint bushing is stable, and the quality of products is stabilized.

In the twelfth aspect of the present invention, when the joint terminal receiving the alignment rod portion therein is temporarily inserted in the joint bushing, the terminal chucking mechanism is moved integrally with the joint terminal. This further stabilizes the position of the joint terminal during the temporary insertion.

In the thirteenth aspect of the present invention, the terminal main insertion mechanism includes the pushing element for pushing the joint terminal, and the plug joint assembling apparatus further comprises the control portion for controlling the amount of insertion of the joint terminal forced by the pushing element. This readily controls the insertion position of the joint terminal.

In the fourteenth aspect of the present invention, the third joint bushing extraction and supply mechanism feeds the plug joint to the check bushing chucking mechanism. The joint bushing of the fed plug joint is held in the horizontal position by the grounded chucking elements of the check bushing chucking mechanism.

In this state, the electrode portion of the voltage applying mechanism comes in contact with the joint terminal in the joint bushing, and voltage is applied to the electrode portion.

If there is a current flow from the joint bushing to the grounded chucking elements, the leak detector detects the current flow to determine the result of check as defective. If there is no current flow from the joint bushing to the grounded chucking elements, the leak detector detects no current to determine the result of check as acceptable.

In this fashion, the automatic feed of the plug joint and automatic determination of the presence/absence of leak from the joint bushing permit the check at a stable check level and at a stable pace.

In the fifteenth aspect of the present invention, the grounded chucking elements hold the axially intermediate portion of the joint bushing to effectively prevent the detection of creeping leak along the surface of the joint bushing, effectively preventing misjudgment by the leak detector.

In the sixteenth aspect of the present invention, the leak detector includes the current amplifier for amplifying the current flowing from the grounded chucking elements to the ground portion, a variable resistor for converting the current amplified by the current amplifier to the voltage, and the indicator for indicating the voltage converted by the variable resistor, thereby satisfactorily detecting a slight leak.

In the seventeenth aspect of the present invention, the insulative cover element surrounds the outer periphery of the voltage applying mechanism to effectively isolate the high-voltage portion.

In the eighteenth aspect of the present invention, the retraction length measuring rod of the retraction length check mechanism is inserted into the joint bushing from one side of the plug joint held in the horizontal position by the bushing retaining mechanism to contact the edge of the tubular terminal element. The talc coating rod of the talc coating mechanism is inserted into the joint bushing from the other side of the plug joint held in the horizontal position by the bushing retaining mechanism to elastically contact the edge of the terminal spring.

In this state, current is caused to flow between the retraction length measuring rod and the talc coating rod for continuity check through the joint terminal. The continuity detecting portion determines that the terminal spring is not removed if the continuity is detected, and determines that the terminal spring is removed if the continuity is not detected.

The retraction length check mechanism is adapted such that the retraction length detector detects the position of the check element in contact with the edge of the joint bushing relative to the retraction length measuring rod to determine whether the retraction length of the terminal element is acceptable or defective depending upon the relative position.

The talc coating mechanism is adapted such that the talc pressure feed portion feeds a predetermined amount of talc under pressure into the talc coating rod to emit talc from the talc emitting holes in the talc coating rod to the inner peripheral surface of the joint bushing for talc coating.

The automatic check for terminal spring removal, automatic check for retraction length, and automatic coating of a predetermined amount of talc eliminate the dependence of the respective operations upon the skills of the operators. This provides a stable check level and a stable amount of talc to be applied, and improves reliability.

In the nineteenth aspect of the present invention, the provision of the talc coating rod rotating mechanism for rotating the talc coating rod about its axis in synchronism with pressure feed of talc into the talc coating rod permits uniform dispersion of talc emitted from the talc emitting holes to the inner peripheral surface of the joint bushing, achieving uniform talc coating.

In the twentieth aspect of the present invention, the felt element slidably movable along the inner peripheral surface of the joint bushing is mounted on the outer peripheral surface of the forward end portion of the talc coating rod. The felt element slidably moves along the inner peripheral surface of the joint bushing when the talc coating rod is removed from the joint bushing. The sliding movement of the felt element flattens the talc applied to the inner peripheral surface of the joint bushing, achieving more uniform talc coating.

In the twenty-first aspect of the present invention, the control portion for sequentially performing the continuity check by the continuity detecting portion, the retraction length check by the retraction length check mechanism, and the talc coating by the talc coating mechanism eliminates the need to perform the process subsequent to the determination of the result of check as defective, effectively avoiding wastes.

It is therefore an object of the present invention to provide a plug joint assembling apparatus which efficiently assembles plug joints at a stable pace by automation of the assembly processes and which is intended for a stable check level and improvement in reliability.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
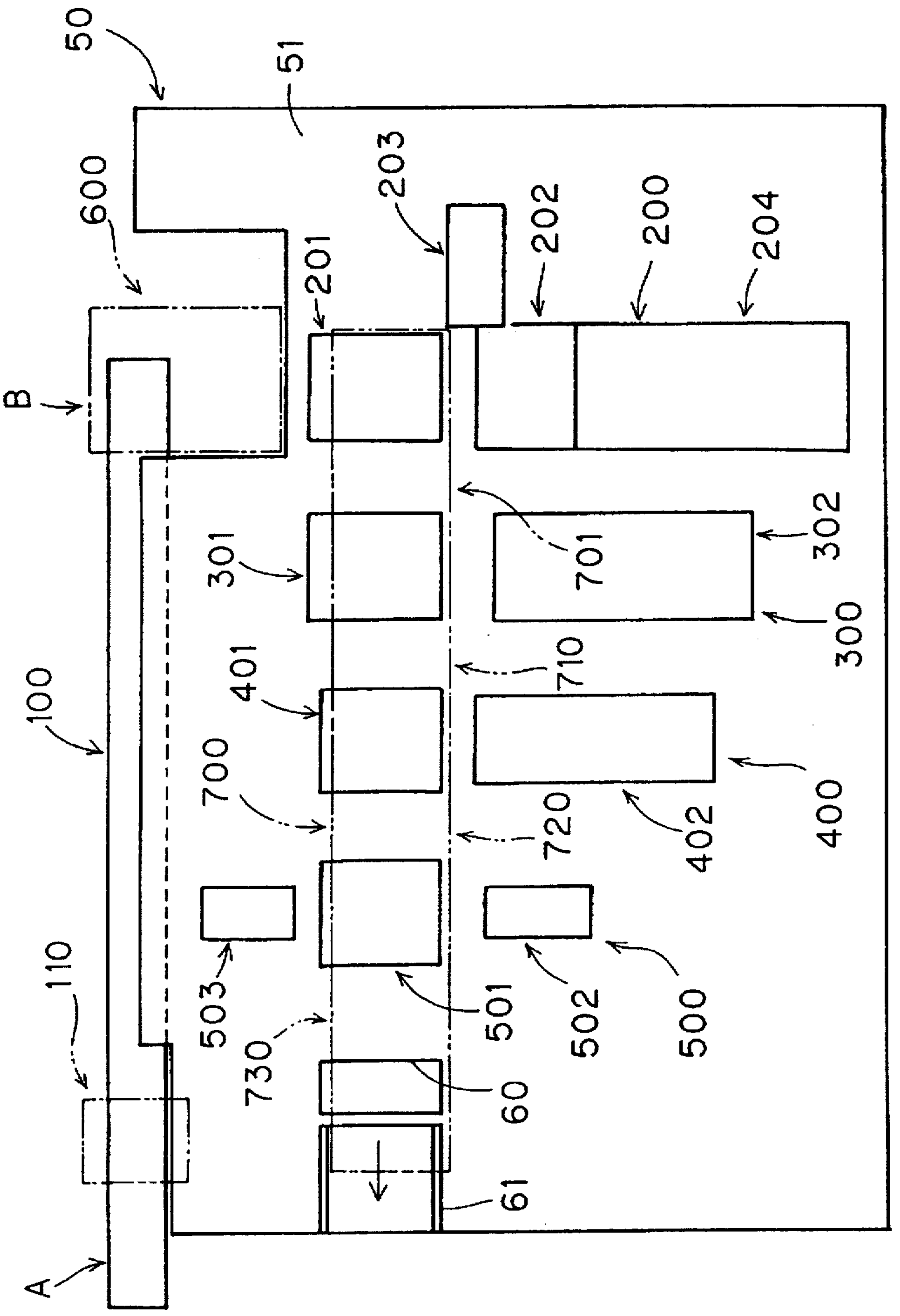
FIG. 1 is a schematic overall diagram of a preferred embodiment according to the present invention.
Figure 2:
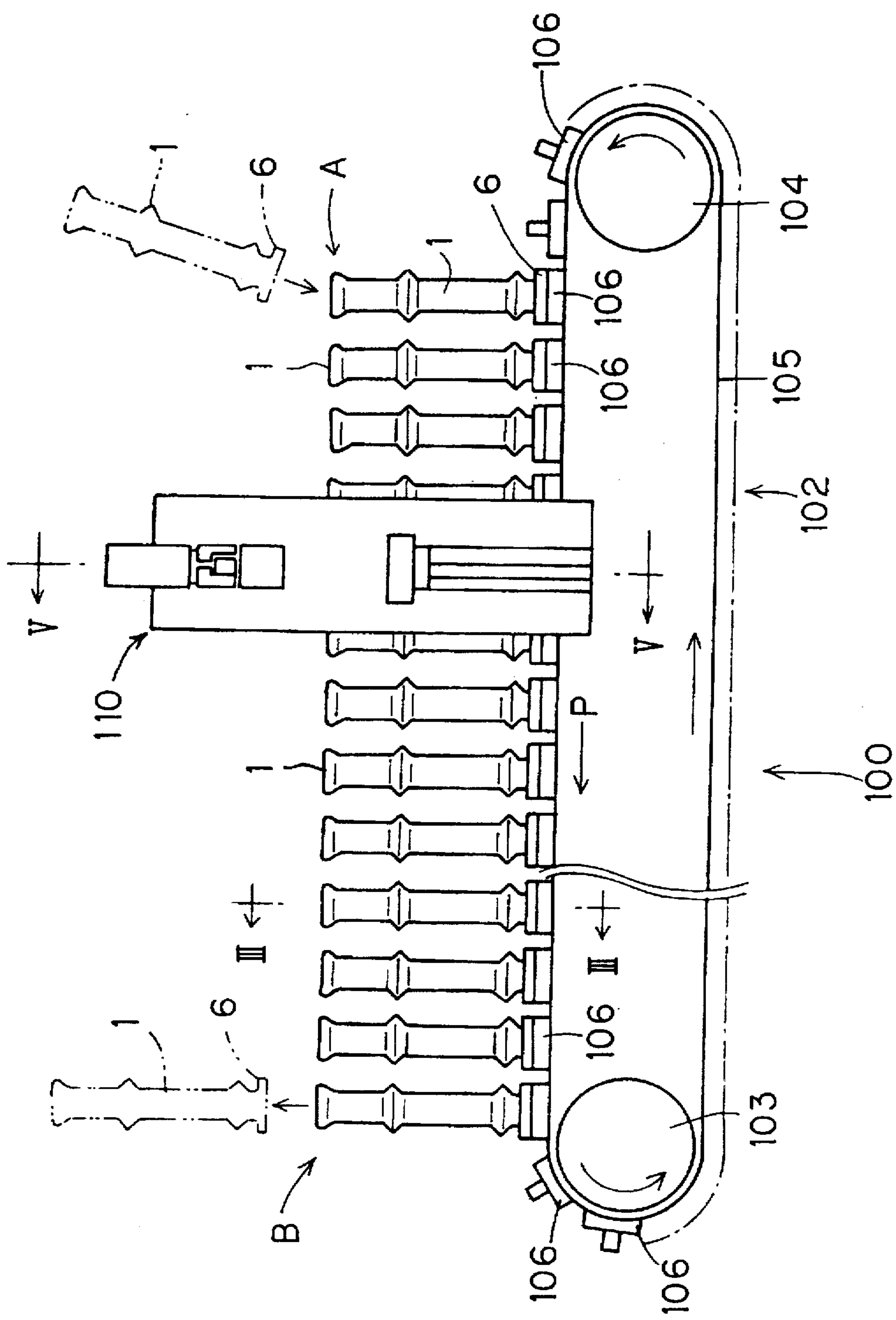
FIG. 2 schematically illustrates a joint bushing feed portion.

A preferred embodiment according to the present invention will now be described with reference to the drawings. FIG. 1 is a schematic overall diagram of the preferred embodiment. On a support table 51 of a plug joint assembling apparatus 50, a joint bushing feed portion 100 is provided along one side of the support table 51 and extends in linear form from a joint bushing supply position A serving as a first position to a joint bushing extraction position B serving as a second position.

A terminal temporary insertion portion 200, a terminal main insertion portion 300, a withstand voltage test portion 400, and a terminal insertion condition check and talc coating portion 500 are arranged on the upper surface of the support table 51 in sequential order from the joint bushing extraction position B toward the joint bushing supply position A. A defective discharge opening portion 60 serving as a defective take-out portion and a product guide chute 61 serving as a product take-out portion are sequentially arranged on an extension of the arrangement of the portions 200, 300, 400, 500 on one end of the support table 51.

A first joint bushing extraction and supply mechanism 600 is provided between the joint bushing extraction position B in the joint bushing feed portion 100 and the terminal temporary insertion portion 200. A joint bushing conveying mechanism 700 is provided over the terminal temporary insertion portion 200, terminal main insertion portion 300, withstand voltage test portion 400, terminal insertion condition check and talc coating portion 500, defective discharge opening portion 60 and product guide chute 61.

The joint bushing feed portion 100 comprises a feed device 102 extending from the joint bushing supply position A to the joint bushing extraction position B as shown in FIGS. 2 through 9.

The feed device 102 includes a driving gear 103, a driven gear 104, and an endless belt element 105 looped around and mounted on the gears 103 and 104 for freely moving around. The feed device 102 is adapted such that the driving gear 103 is driven to move the endless belt element 105 around in a predetermined direction P at a predetermined rate.

A plurality of bushing retaining elements 106 arranged in predetermined spaced relation in the predetermined direction P of movement of the endless belt element 105 are mounted on the entire outer peripheral surface of the endless belt element 105. The bushing retaining elements 106 are made of polypropylene and the like and each includes a circular base portion 106*a* on one end of a joint bushing 1 for placing thereon an outwardly overhanging sealing collar portion 6 and a retentive shaft portion 106*b* projecting upwardly from the center of the base portion 106*a* as shown in FIG. 3.

The joint bushing 1, similar to the conventional joint bushing, is made of an insulative elastic material such as silicone rubber and in a tubular form.

When the retentive shaft portion 106*b* is relatively fitted in a hole portion 8 of the joint bushing 1 which extends in the axial direction thereof, with the sealing collar portion 6 of the joint bushing 1 located downside, and the sealing collar portion 6 is placed on the base portion 106*a*, then the retentive shaft portion 106*b* restricts the falling down of the joint bushing 1, permitting the joint bushing 1 to be placed and held in a vertical position.

Figure 3:
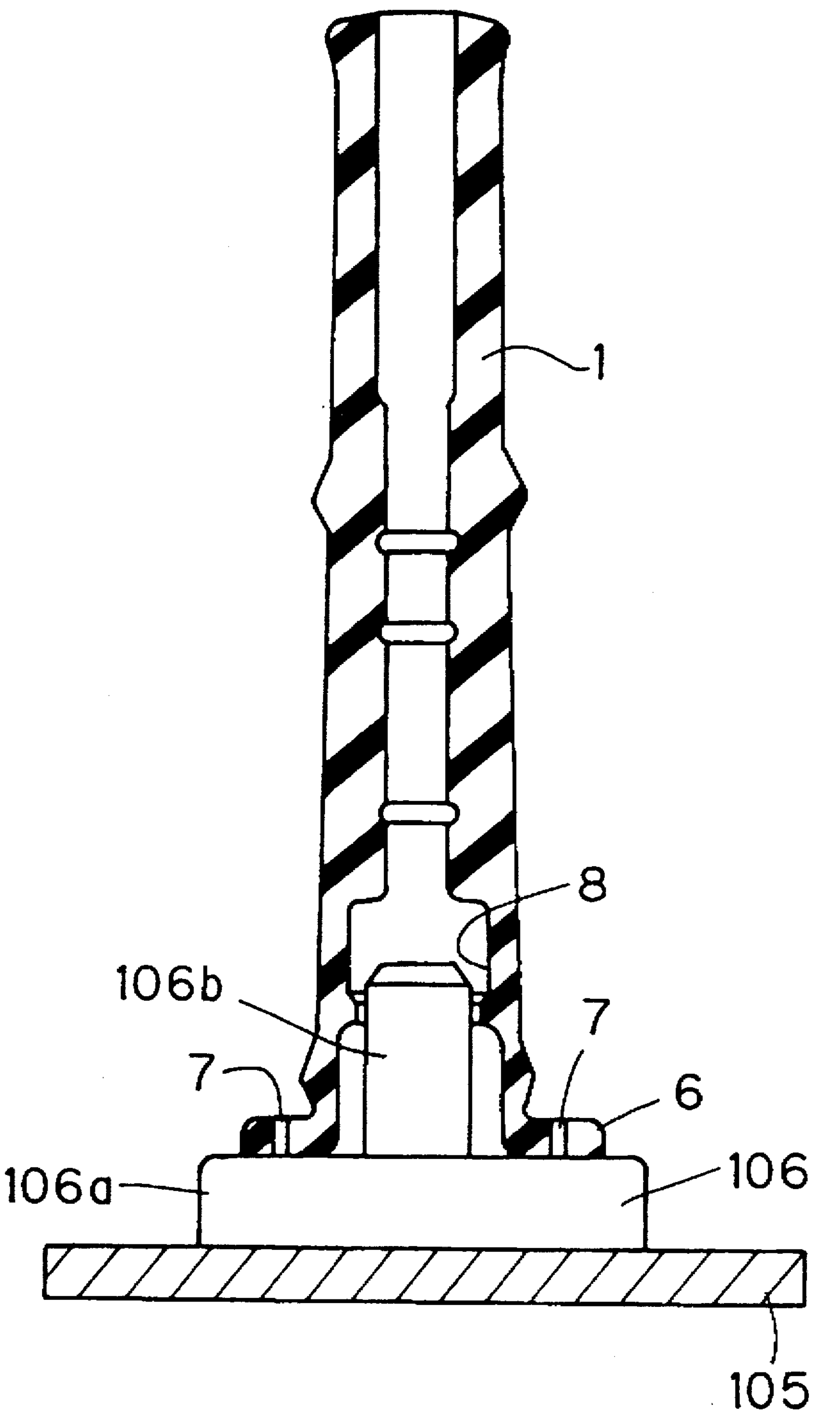
FIG. 3 is a cross sectional view taken along the line III—III of FIG. 2.
Figure 4:
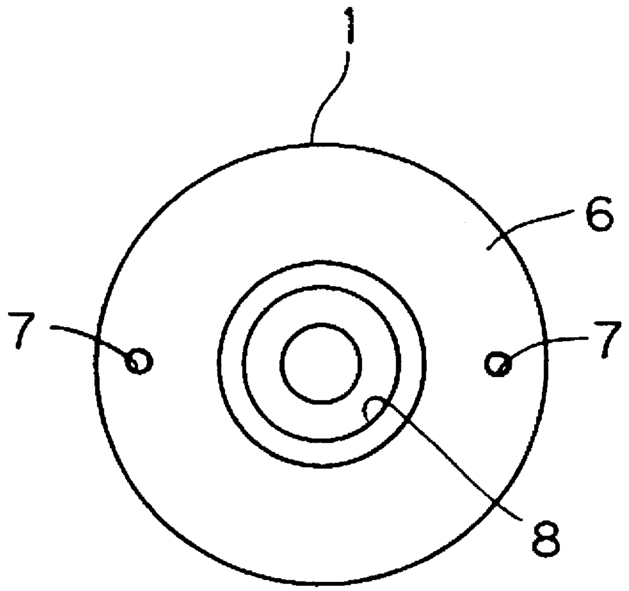
FIG. 4 is a bottom view of a joint bushing.
Figure 5:
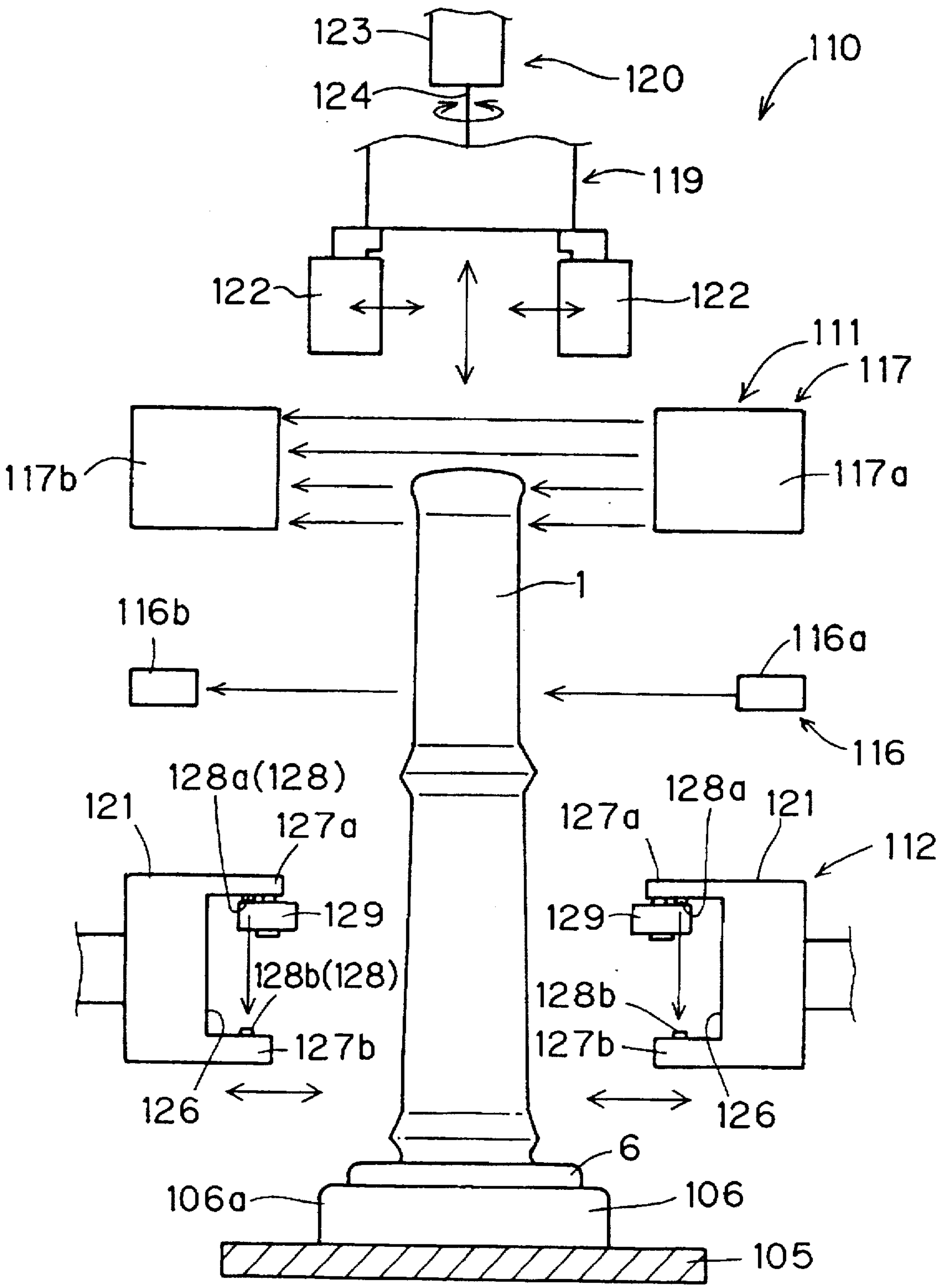
FIGS. 5 through 8 illustrate the operation of a joint bushing check station.

The sealing collar portion 6 of the joint bushing 1 has a pair of air vent holes 7 spaced in a radial direction as shown in FIGS. 3 and 4.

A joint bushing check station 110 is provided at a given position in the feed path of the joint bushing 1 extending from the joint bushing supply position A to the joint bushing extraction position B. As shown in FIGS. 5 through 9, the joint bushing check station 110 includes a length measuring mechanism 111 for detecting the axial length of the joint bushing 1 and an air vent hole detecting mechanism 112 for detecting the air vent holes 7 of the sealing collar portion 6.

The joint bushing check station 110 further includes a photosensor 116 having a light emitter 116*a* and a light receiver 116*b* for detecting the arrival of the joint bushing 1 to a predetermined position at the joint bushing check station 110 by the feed device 102. Upon detection of the joint bushing 1 by the photosensor 116, the feed device 102 is controlled to come to a temporary stop. The joint bushing 1 is adapted to stop at a predetermined position at the joint bushing check station 110 when the feed device 102 is stopped in response to the detection of the joint bushing 1 by the photosensor 116.

The length measuring mechanism 111 includes a photosensor 117 at an altitude substantially corresponding to the upper end of the joint bushing 1 placed on and held by the bushing retaining element 106 and having a light emitter 117*a* for emitting a vertically wide laser light and a light receiver 117*b* for receiving the laser light. Since the lower surface of the sealing collar portion 6 placed on the base portion 106*a* has a constant altitude, the axial length of the joint bushing 1 may be relatively detected by detecting the width of the intercepted laser light. A control portion not shown in the plug joint assembling apparatus 50 is controlled to determine whether or not the axial length of the joint bushing 1 equals a predetermined length.

The air vent hole detecting mechanism 112 includes a lifting portion 119 for lifting the joint bushing 1 in corresponding relation to a position over the joint bushing 1 stopped at the predetermined position at the joint bushing check station 110, and a rotating portion 120 for rotating the lifting portion 119 about its vertical axis.

A pair of air vent hole detecting portions 121 are spaced apart from each other on opposite sides of the joint bushing 1 at a predetermined altitude corresponding to the height of the sealing collar portion 6 of the joint bushing 1 lifted by the lifting portion 119. The pair of air vent hole detecting portions 121 are movable toward and away from the sealing collar portion 6 by the actuation of a cylinder.

The lifting portion 119 includes a pair of openable and closable chucking elements 122 made of MC nylon and the like for grasping the upper end of the joint bushing 1. The chucking elements 122 are movable upwardly and downwardly by the extension and retraction of a piston shaft 124 of a cylinder 123.

The rotating portion 120 rotates the piston shaft 124 about the vertical axis thereof throughout a 180° arc in the normal and reverse directions.

As illustrated in FIGS. 5 through 9, each of the air vent hole detecting portions 121 is of inclined U shape with a groove portion 126 relatively receiving the sealing collar portion 6. Upper and lower overhanging wall portions 127*a* and 127*b* defining the groove portion 126 are provided with a photosensor 128 serving as a hole detector including a light emitter 128*a* and light receiver 128*b*.

Figure 8:
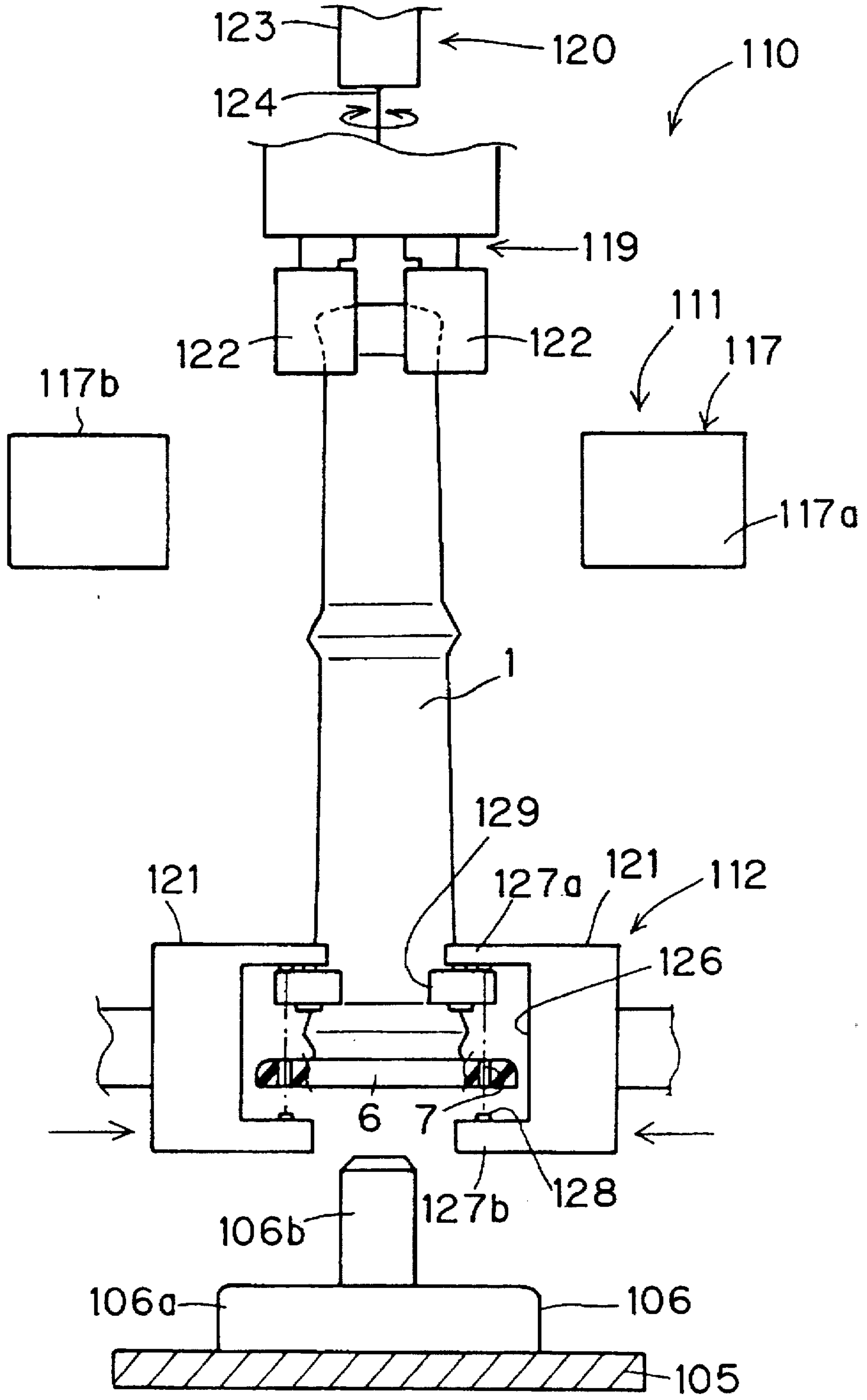

The photosensor 128 is designed to be located at a position corresponding to each air vent hole 7 of the sealing collar portion 6 when the air vent hole detecting portions 121 are caused to provide access to the sealing collar portion 6 as shown in FIG. 8.

Figure 9:
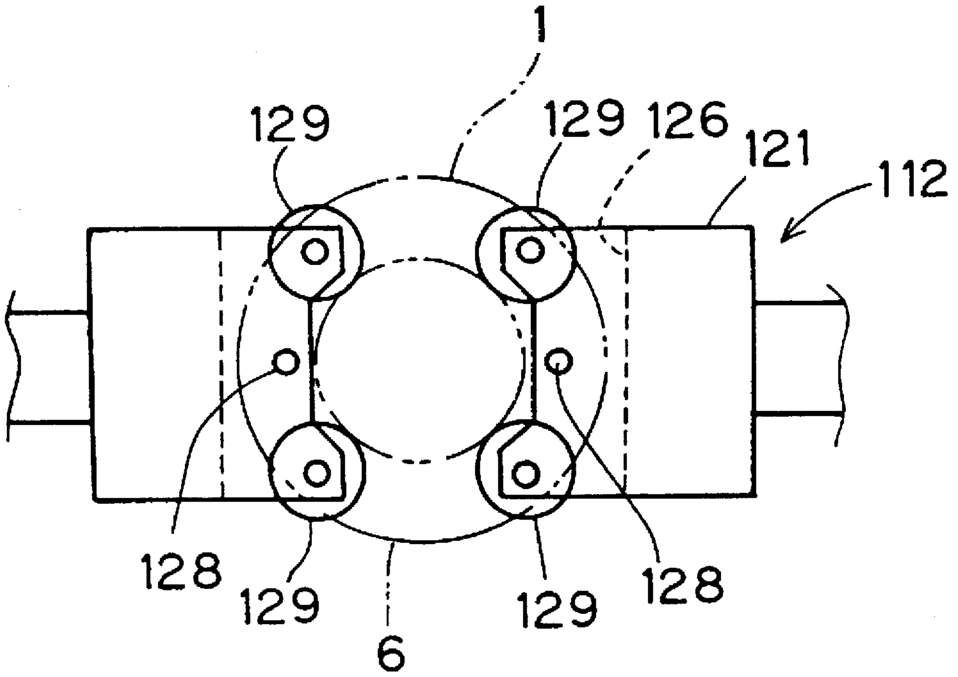
FIG. 9 illustrates the operation of an air vent hole detecting mechanism.

A pair of guide rollers 129 for rolling about their vertical axis are mounted on the upper overhanging wall portion 127*a* of each air vent hole detecting portion 121 as shown in FIG. 9. The guide rollers 129 are designed to come into contact with the outer peripheral surface of the joint bushing 1 when the air vent hole detecting portions 121 provide access to the sealing collar portion 6.

As the plug joint assembling apparatus 50 is driven to drive the joint bushing feed portion 100, the endless belt element 105 is moved around at a low rate in the predetermined direction P, thereby moving the bushing retaining elements 106 in sequential order at the low rate in the direction P.

When an operator sequentially supplies and fits the joint bushings 1 one by one onto the retentive shaft portions 106*b* of the bushing retaining elements 106 at the joint bushing supply position A, with the sealing collar portion 6 of each joint bushing 1 located downside, then the joint bushings 1 are placed on and held by the bushing retaining elements 106 in the vertical position and transported sequentially toward the joint bushing extraction position B.

The movement of the endless belt element 105 is temporarily stopped when the photosensor 116 at the joint bushing check station 110 detects the arrival of each joint bushing 1 placed on and held by the bushing retaining element 106 at the predetermined position at the joint bushing check station 110.

Then the photosensor 117 is operated to detect the width of the intercepted light, thereby measuring the length of the joint bushing 1. This length measurement provides for discrimination from similar products. The operation proceeds to the next process if the result of measurement equals the predetermined length. If the result is defective, the operator is informed of the defective by a buzzer and the like, and the endless belt element 105 is held stopped.

The plug joint assembling apparatus 50 is controlled not to operate again until a re-start button is pushed after the defective joint bushing 1 is removed.

The joint bushing check station 110 is located adjacent the joint bushing supply position A in proximity to the operator, for example, within a distance of 0.6 m from the operator to facilitate the removal of the joint bushings 1.

Figure 6:
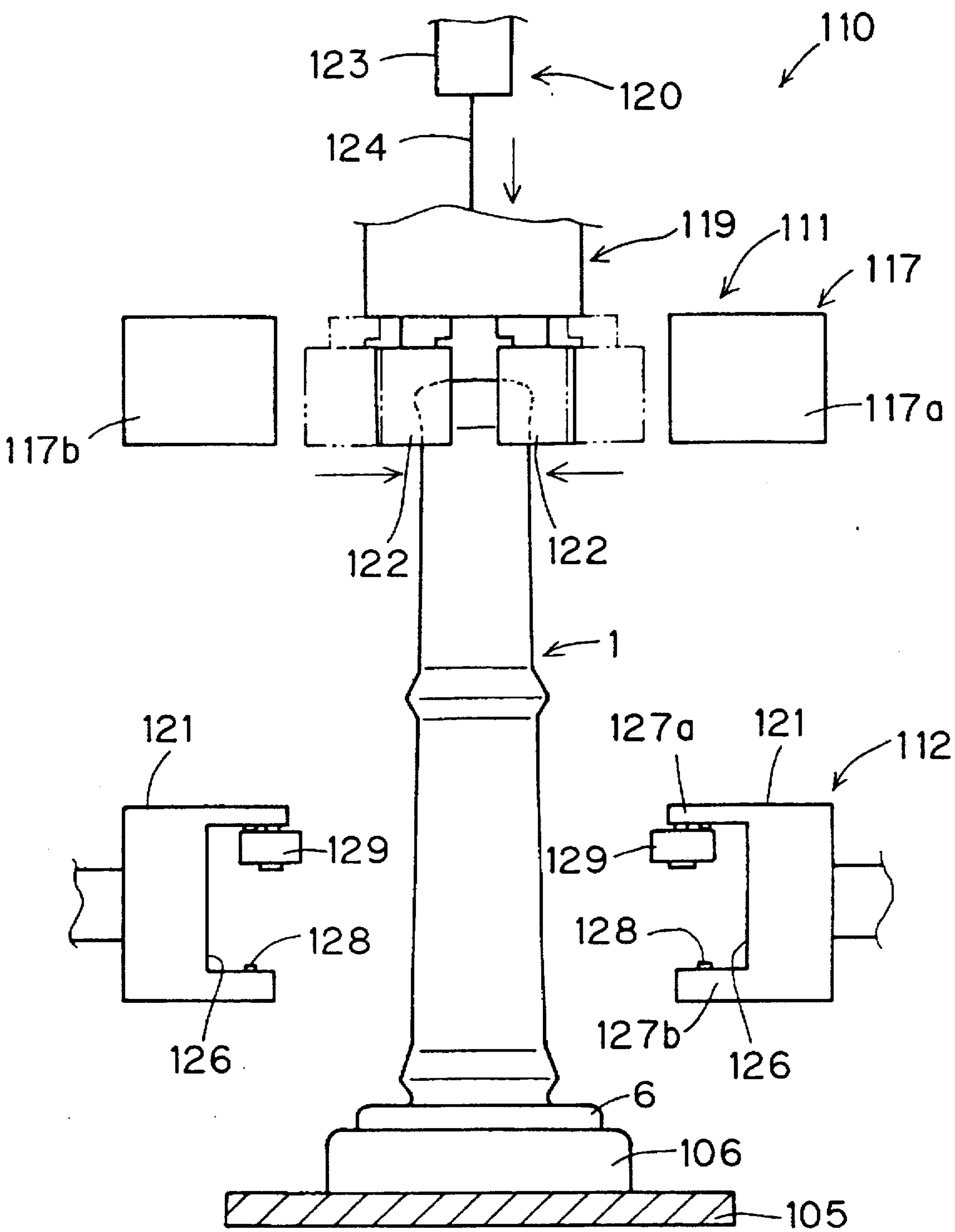
Figure 7:
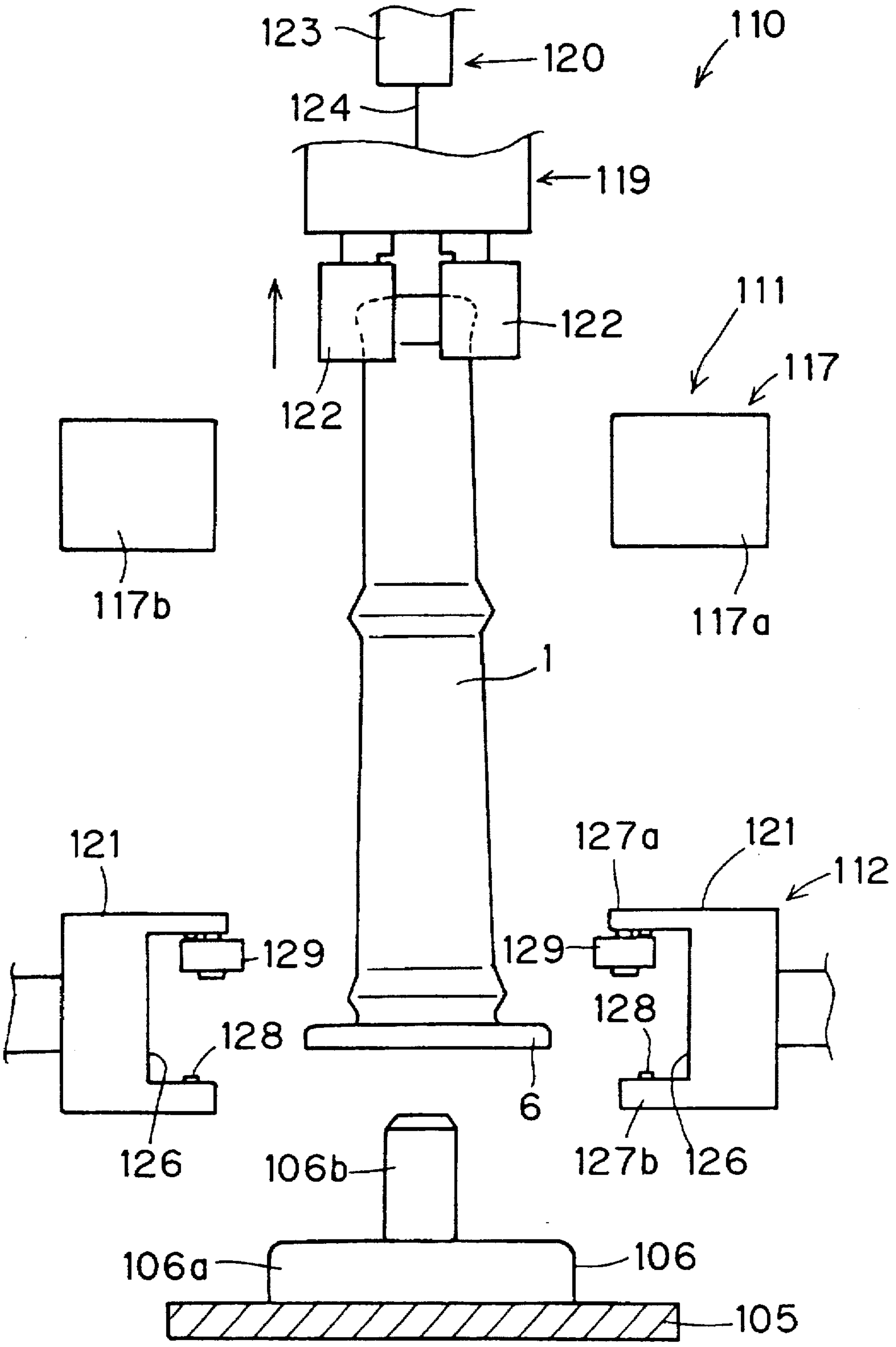

If the result of measurement equals the predetermined length, the lifting portion 119 moves downwardly and the pair of chucking elements 122 move toward each other to grasp the upper end portion of the joint bushing 1 as shown in FIG. 6. Then the lifting portion 119 moves upwardly to lift the joint bushing 1 upwardly to a predetermined height as shown in FIG. 7.

Then the air vent hole detecting portions 121 move toward each other until the guide rollers 129 come into contact with the outer peripheral surface of the joint bushing 1 as shown in FIGS. 8 and 9.

In this state, the rotating portion 120 is operated to rotate the lifting portion 119 by 180° about the vertical axis and then rotate the lifting portion 119 by 180° in the reverse direction to the original position. The air vent hole detecting portions 121 are opened, and the lifting portion 119 is lowered to return the joint bushing 1 onto the bushing retaining element 106. After the grasp by the chucking elements 122 is released, the lifting portion 119 is returned to the original lifted position.

The presence of the air vent holes 7 is determined by the photosensors 128 during the rotation in the normal and reverse directions. If the result of detection of the air vent holes 7 is defective, the operator is informed of the defective by the buzzer and the like in the above stated manner, and the endless belt element 105 is held stopped. The plug joint assembling apparatus 50 is controlled not to operate again until the re-start button is pushed after the defective joint bushing 1 is removed.

If the result of detection of the air vent holes 7 is acceptable, the endless belt element 105 is moved around again.

The above described operation is repeated. As the joint bushing 1 reaches the joint bushing extraction position B, a sensor at the joint bushing extraction position B detects the arrival of the joint bushing 1, and the endless belt element 105 temporarily stops moving in response to the detection. The endless belt element 105 starts moving again after the joint bushing 1 is removed by the first joint bushing extraction and supply mechanism 600.

The arrival position of one joint bushing 1 at the joint busing check station 110 is in phase with the arrival position of another joint bushing 1 at the joint bushing extraction position B.

Figure 10:
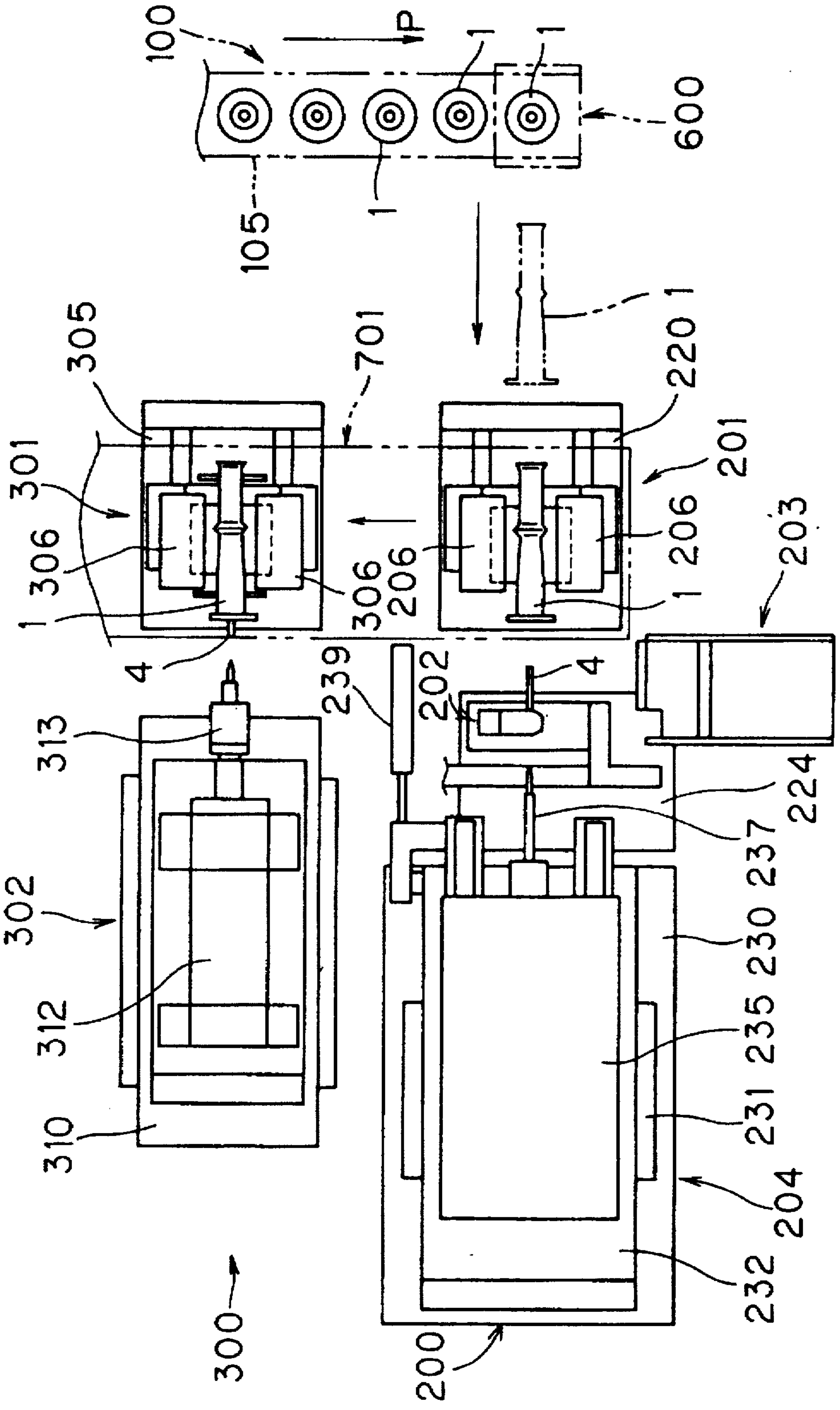
FIG. 10 schematically illustrates a terminal temporary insertion portion and a terminal main insertion portion.

Referring to FIG. 10, the terminal temporary insertion portion 200 comprises a temporary insertion bushing chucking mechanism 201 for releasably holding the joint bushing 1 in a horizontal position, a terminal chucking mechanism 202 for releasably holding a joint terminal 4 in a horizontal position, a terminal supply mechanism 203 for feeding the joint terminal 4 to the terminal chucking mechanism 202, and a terminal temporary insertion mechanism 204 for temporarily inserting a part of the joint terminal 4 held by the terminal chucking mechanism 202 into the joint bushing 1.

The terminal main insertion portion 300 comprises a main insertion bushing chucking mechanism 301 for releasably holding the joint bushing 1 in which the joint terminal 4 is temporarily inserted in a horizontal position, and a terminal main insertion mechanism 302 for forcing the temporarily inserted joint terminal 4 into a set position.

A second joint bushing extraction and supply mechanism 701 for removing the joint bushing 1 from the temporary insertion bushing chucking mechanism 201 to feed the joint bushing 1 to the main insertion bushing chucking mechanism 301 is provided over the temporary insertion bushing chucking mechanism 201 and the main insertion bushing chucking mechanism 301.

Figure 11:
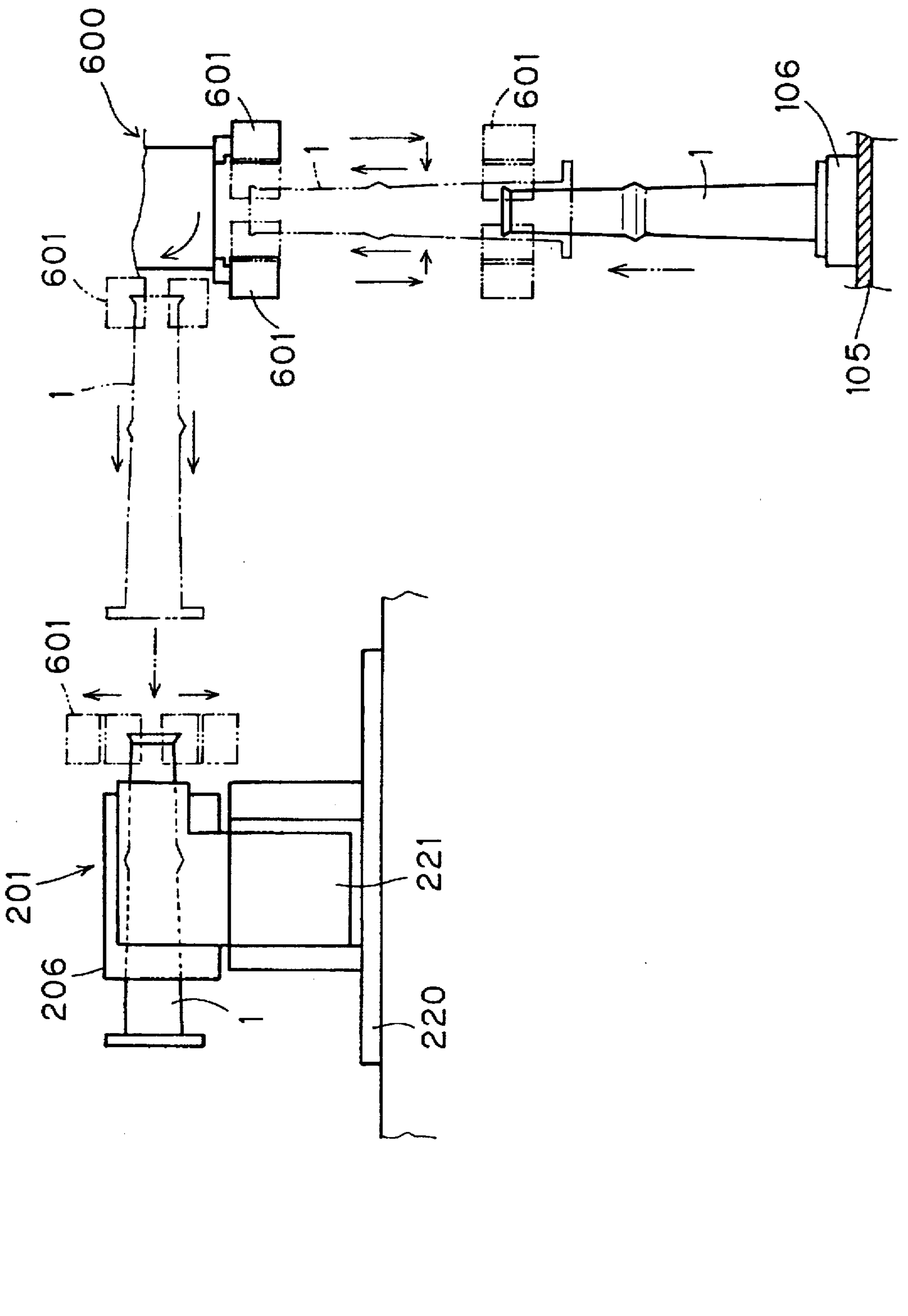
FIG. 11 schematically illustrates a first joint bushing extraction and supply mechanism.

Referring to FIG. 11, the first joint bushing extraction and supply mechanism 600 comprises a pair of openable and closable chucking elements 601 made of a synthetic resin such as MC nylon for grasping the upper end portion of the joint bushing 1. The pair of chucking elements 601 are permitted to extend and retract in a predetermined direction by the extension and retraction of the piston shaft of a cylinder not shown. The chucking elements 601 and the cylinder are pivotable about an axis extending perpendicularly to the plane of FIG. 11.

The opposed inner surfaces of the chucking elements 601 have respective arcuate retaining grooves corresponding to the joint bushing 1.

As the joint bushing 1 transported by the endless belt element 105 reaches a predetermined position when the chucking elements 601 are in an open, initial position indicated by the solid lines of FIG. 11, the cylinder is actuated to extend the piston shaft thereof, thereby moving the chucking elements 601 downwardly. After being moved a predetermined distance, the pair of chucking elements 601 are caused to provide access to each other to grasp the upper end portion of the joint bushing 1.

Then, the piston shaft is retracted by the actuation of the cylinder to move the pair of chucking elements 601 upwardly. The upward movement of the chucking elements 601 lifts the joint bushing 1 upwardly. The chucking elements 601 are pivoted 90° about the axis extending perpendicularly to the plane of FIG. 11, and the joint bushing 1 assumes a horizontal position. In this state, the chucking elements 601 are moved horizontally. The piston shaft is extended by the actuation of the cylinder to feed the joint bushing 1 in the horizontal position to a predetermined position in the temporary insertion bushing chucking mechanism 201.

With reference to FIGS. 10, 11, 14 and 15, when the joint bushing 1 is held by a pair of openable and closable chucking elements 206 made of a synthetic resin such as MC nylon in the temporary insertion bushing chucking mechanism 201, the pair of chucking elements 601 are opened to release the grasp of the joint bushing 1. Then, the reverse operation is performed such that the cylinder is actuated and the chucking elements 601 are moved horizontally, pivoted 90°, and returned to the initial position.

Figure 12:
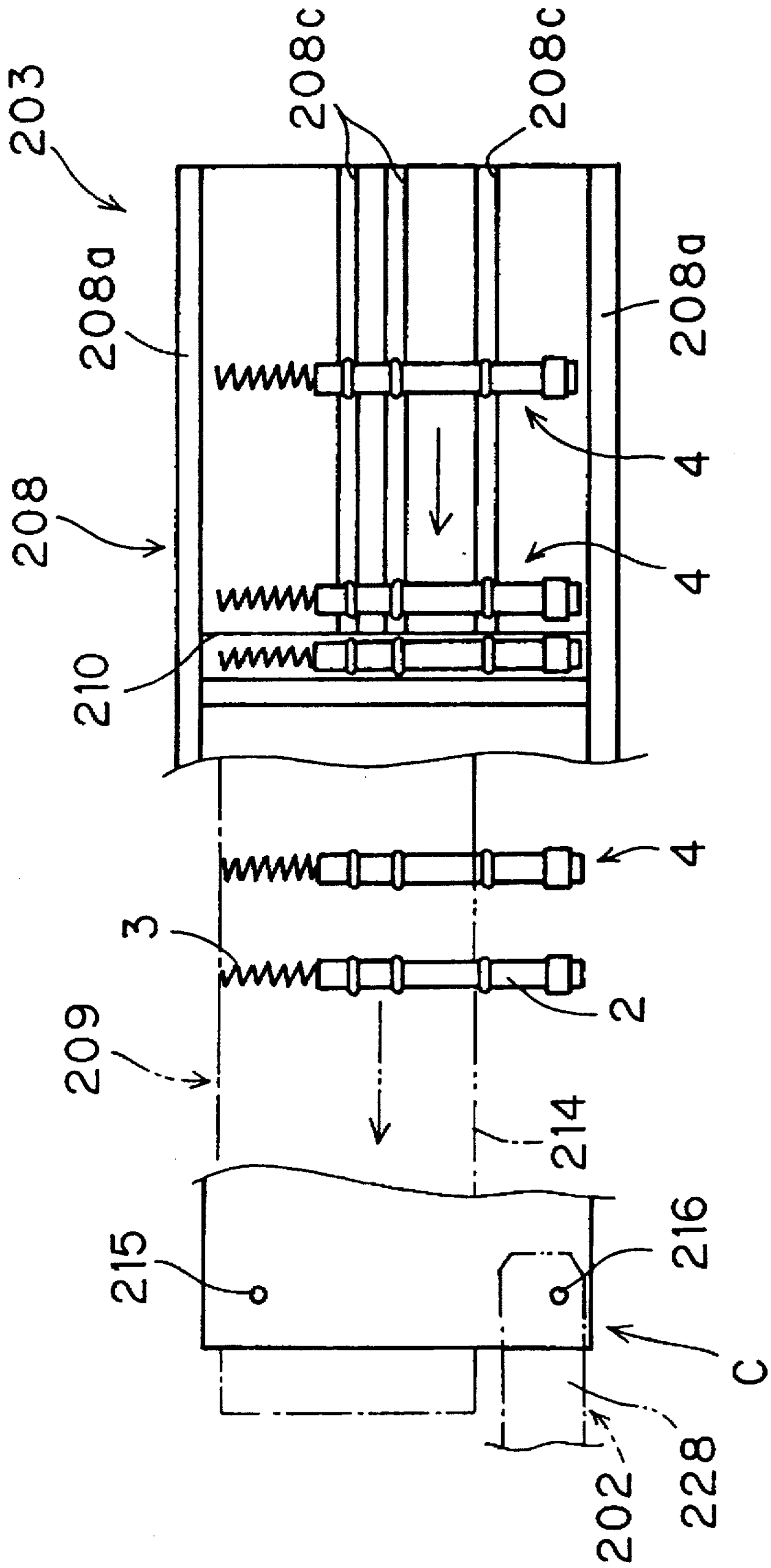
FIG. 12 is a top plan view of a terminal supply mechanism.
Figure 13:
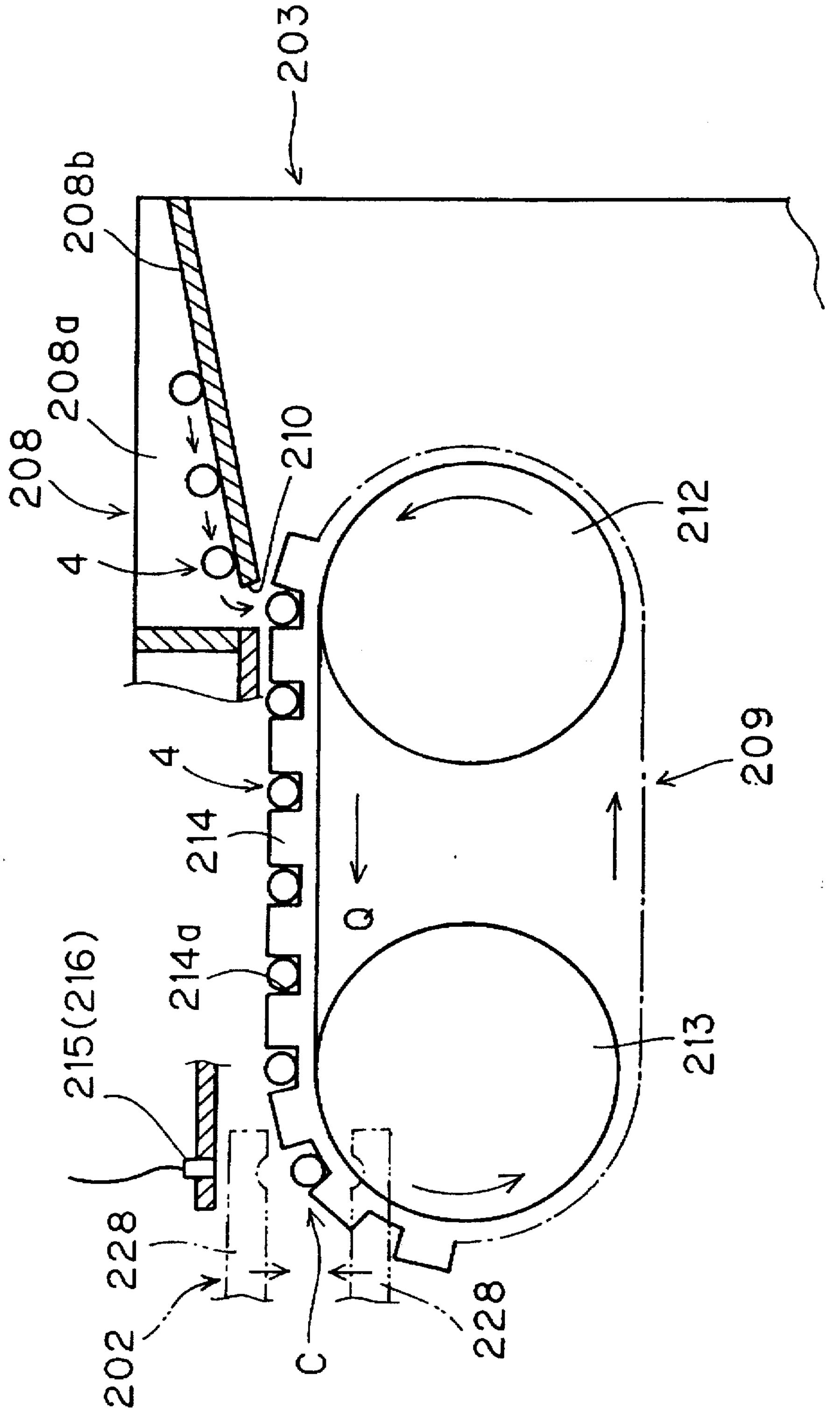
FIG. 13 is a front view of FIG. 12.

Referring to FIGS. 12 and 13, the terminal supply mechanism 203 includes a terminal receiving and guiding portion 208 for receiving the joint terminals 4 in which a first end portion of a coil spring 3 is inserted and locked in one end of a tubular terminal element 2 in non-slipping off manner, and a terminal transporting mechanism 209 for conveying the joint terminals 4 guided by the terminal receiving and guiding portion 208 to a predetermined position.

The terminal receiving and guiding portion 208 includes a pair of opposed side wall portions 208a spaced a distance slightly greater than the longitudinal axial length of the joint terminals 4, and a bottom wall portion 208b provided between the opposed side wall portions 208a and inclined downwardly (e.g., at an angle of about 15°) in one direction. A terminal fall opening 210 into which the joint terminal 4 can fall is provided at the lower end of the bottom wall portion 208b.

Guide grooves 208c extending in the direction of the inclination are suitably formed in the upper surface of the bottom wall portion 208b to prevent the joint terminals 4 from slipping out of place.

Upon being placed on the bottom wall portion 208a of the terminal receiving and guiding portion 208, the joint terminals 4 are guided to move downwardly by gravity along the inclination of the bottom wall portion 208b to fall from the terminal fall opening 210 in the downward direction.

The terminal transporting mechanism 209 located under the terminal receiving and guiding portion 208 includes a driving and driven pulleys 212 and 213 such as timing pulleys, and an endless belt element 214 such as a timing belt looped around and mounted on the pulleys 212 and 213 for freely moving around. The driving pulley 212 is driven to move the endless belt element 214 around in a predetermined direction Q.

Terminal retaining grooves 214a extending widthwise are arranged in predetermined spaced relation along and in the outer peripheral surface of the endless belt element 214. The joint terminal 4 falls into one of the terminal retaining grooves 214a passing under the terminal fall opening 210 of the terminal receiving and guiding portion 208 by the movement of the endless belt element 214, and is conveyed in the predetermined direction Q while being held in the terminal retaining groove 214a.

When the joint terminal 4 held in the terminal retaining groove 214a of the endless belt element 214 reaches a predetermined terminal extraction position C, a coil spring check sensor 215 and a reference position check sensor 216 serving as terminal detectors located in corresponding relation to the terminal extraction position C examine whether or not the joint terminal 4 has the coil spring 3 connected thereto and the terminal element 2 located in a reference position, respectively. The driving pulley 212 stops driving upon detection by the sensors 215 and 216 to stop the joint terminal 4 in the predetermined terminal extraction position C.

When the terminal chucking mechanism 202 extracts the joint terminal 4 in the terminal extraction position C, the sensors 215 and 216 do not detect the joint terminal 4. Then the driving pulley 212 is driven again to convey the next joint terminal 4 to the terminal extraction position C.

As illustrated in FIGS. 10, 11, 14 and 15, the temporary insertion bushing chucking mechanism 201 includes an opening and closing mechanism 221 formed on a base 220 for horizontally opening and dosing the pair of chucking elements 206 by means of an air cylinder and the like. The opening and closing mechanism 221 causes the pair of chucking elements 206 to open and provide access to each other.

The opposed inner surfaces of the pair of chucking elements 206 have respective arcuate retaining grooves corresponding to the joint bushing 1 for holding the joint bushing 1 in the horizontal position such that the longitudinal axis of the joint bushing 1 extends in the horizontal direction. The opposed inner surfaces of the pair of chucking elements 206 are in contact with each other when the chucking elements 206 hold the joint bushing 1. The terminal temporary insertion portion 200 further comprises a suitable detector such as a sensor for detecting the joint bushing 1 held by the pair of chucking elements 206.

Figure 14:
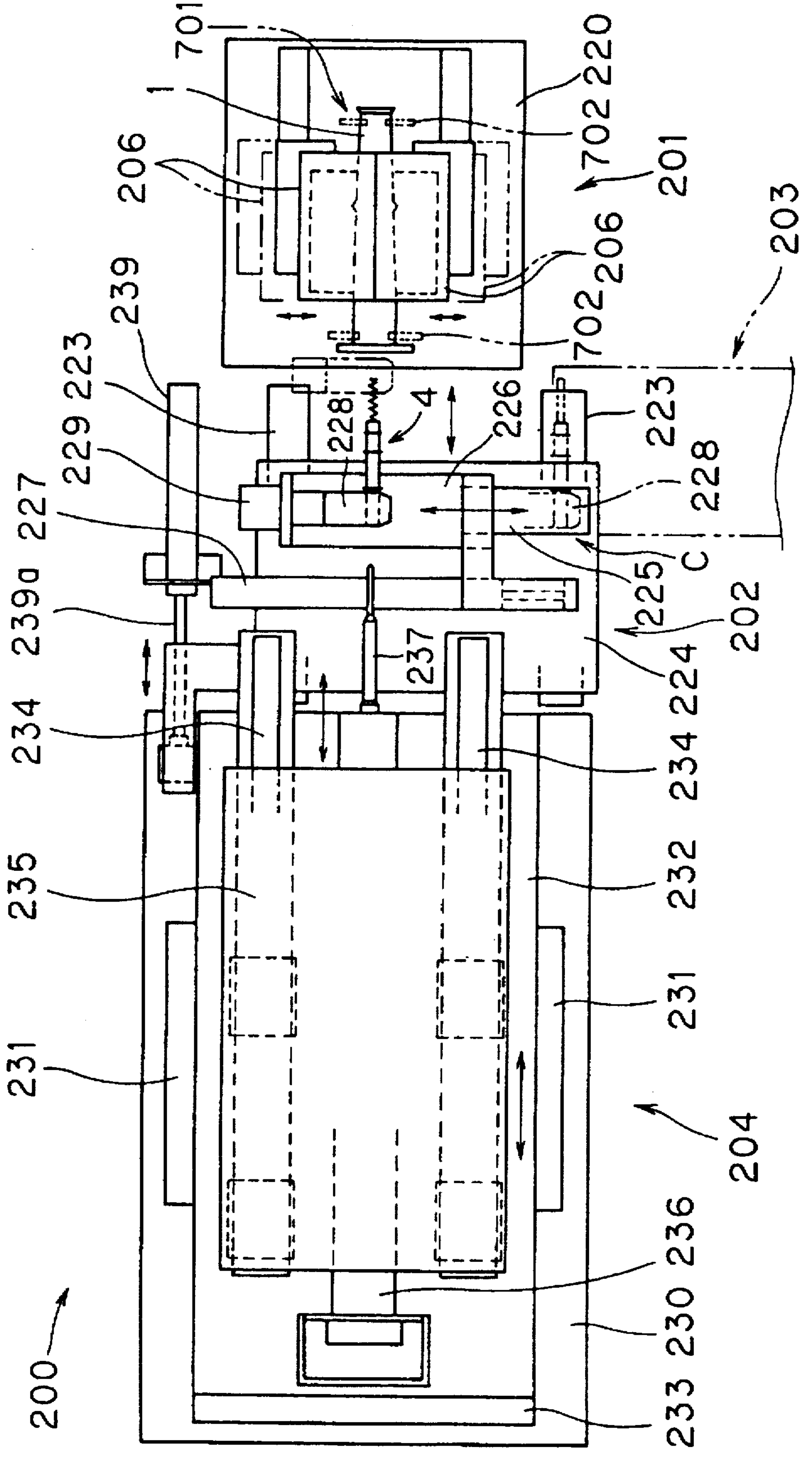
FIG. 14 is a top plan view of the terminal temporary insertion portion.
Figure 15:
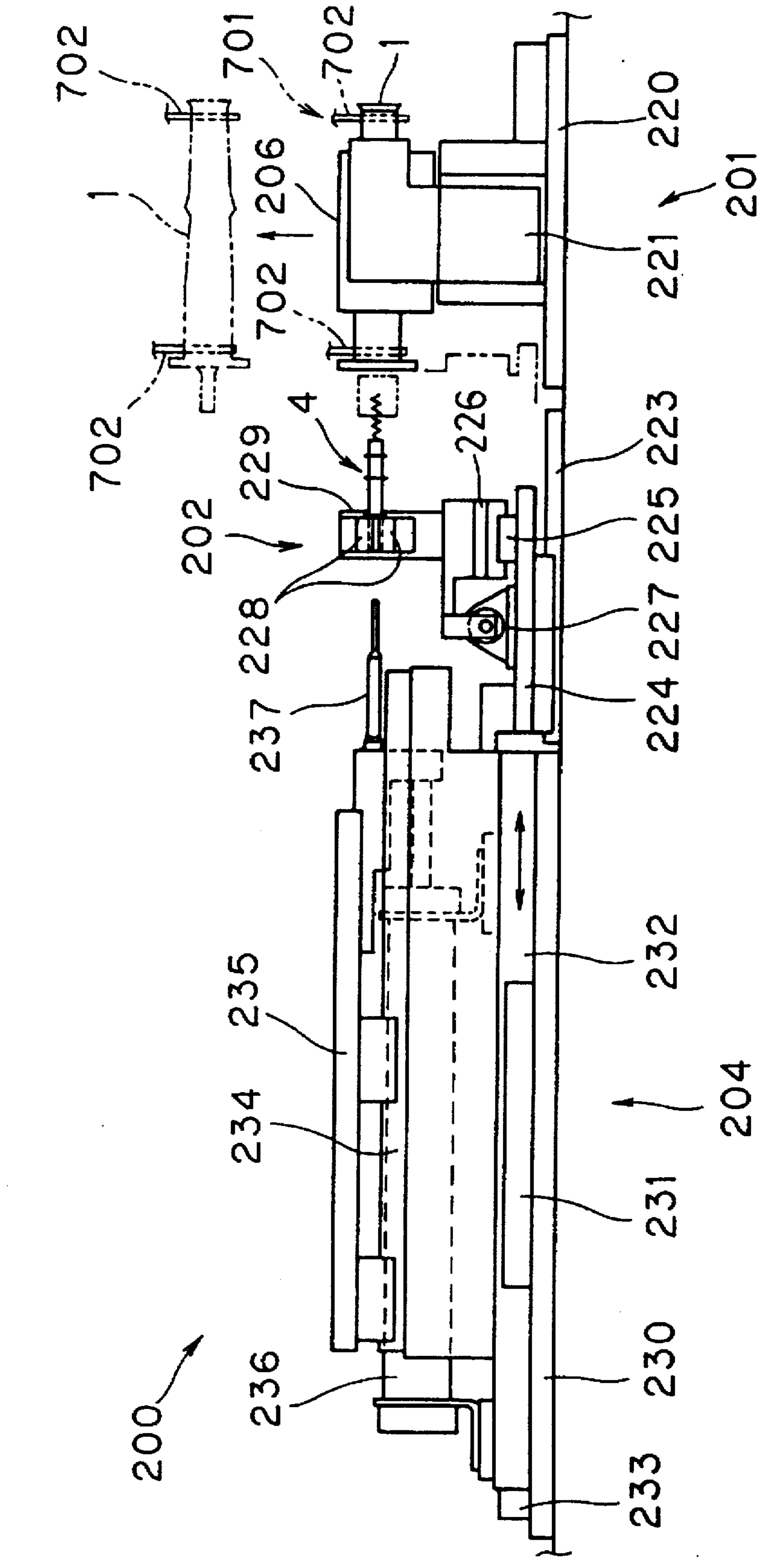
FIG. 15 is a front view of FIG. 14.

As depicted in FIGS. 14 and 15, the terminal chucking mechanism 202 includes a pair of guide rails 223 extending rightwardly and leftwardly in FIGS. 14 and 15, a base plate 224 formed on and movable along the guide rails 223, and a chuck guide rail 225 formed on the base plate 224 and extending perpendicularly to the guide rails 223.

A support base 226 movable along the chuck guide rail 225 is provided on the chuck guide rail 225. A slide cylinder 227 mounted on the base plate 224 moves the support base 226 along the chuck guide rail 225.

On the support base 226, an opening and closing mechanism 229 is provided for vertically opening and closing a pair of chucking elements 228 made of a synthetic resin such as MC nylon by means of an air cylinder and the like. The opening and closing mechanism 229 causes the chucking elements 228 to open and provide access to each other.

With the chucking elements 228 open, the slide cylinder 227 is actuated to move the chucking elements 228 from its initial position toward the terminal supply mechanism 203. As shown in FIGS. 12 and 13, upon arrival at a predetermined position, the chucking elements 228 are driven by the opening and closing mechanism 229 to provide access to each other to grasp the free end of the terminal element 2 of the joint terminal 4 located at the terminal extraction position C.

With the joint terminal 4 grasped by the chucking elements 228, the slide cylinder 227 is actuated to return the chucking elements 228 to the initial position. In the initial position of the chucking elements 228, the longitudinal axis of the joint terminal 4 grasped by the chucking elements 228 is aligned with the longitudinal axis of the joint bushing 1 held by the chucking elements 206 of the temporary insertion bushing chucking mechanism 201.

The opposed inner surfaces of the pair of chucking elements 228 have respective arcuate retaining grooves corresponding to the joint terminal 4 for holding the joint terminal 4 in the horizontal position such that the longitudinal axis of the joint terminal 4 extends in the horizontal direction.

Figure 16:
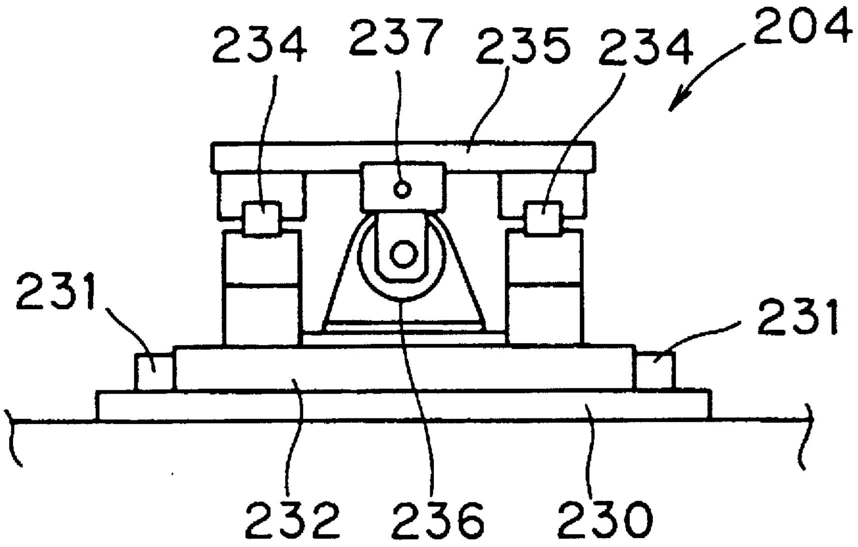
FIG. 16 is a right side view of a terminal temporary insertion mechanism of FIG. 15.

As illustrated in FIGS. 14 through 16, the terminal temporary insertion mechanism 204 includes a pair of guide elements 231 mounted on a base plate 230 and extending parallel to the guide rails 223, a slide base plate 232 of a rectangular configuration in plan view and slidable in the same direction as the base plate 224 along and between the guide elements 231, and a stopper element 233 mounted on the end of the base plate 230 opposite from the terminal chucking mechanism 202 for restricting the movement of the slide base plate 232.

A pair of guide rails 234 extending parallel to the guide rails 223 are mounted on the upper surface of the slide base plate 232. A slide plate 235 is slidably mounted on and along the guide rails 234.

A slide cylinder 236 for moving the slide plate 235 along the guide rails 234 is mounted on the slide base plate 232.

A terminal alignment rod 237 serving as an alignment rod portion is removably mounted on one end of the slide plate 235 which is closer to the terminal chucking mechanism 202. The longitudinal axis of the terminal alignment rod 237 is aligned with the longitudinal axes of the joint bushing 1 held by the chucking elements 206 and joint terminal 4 grasped by the chucking elements 228.

Figure 19:
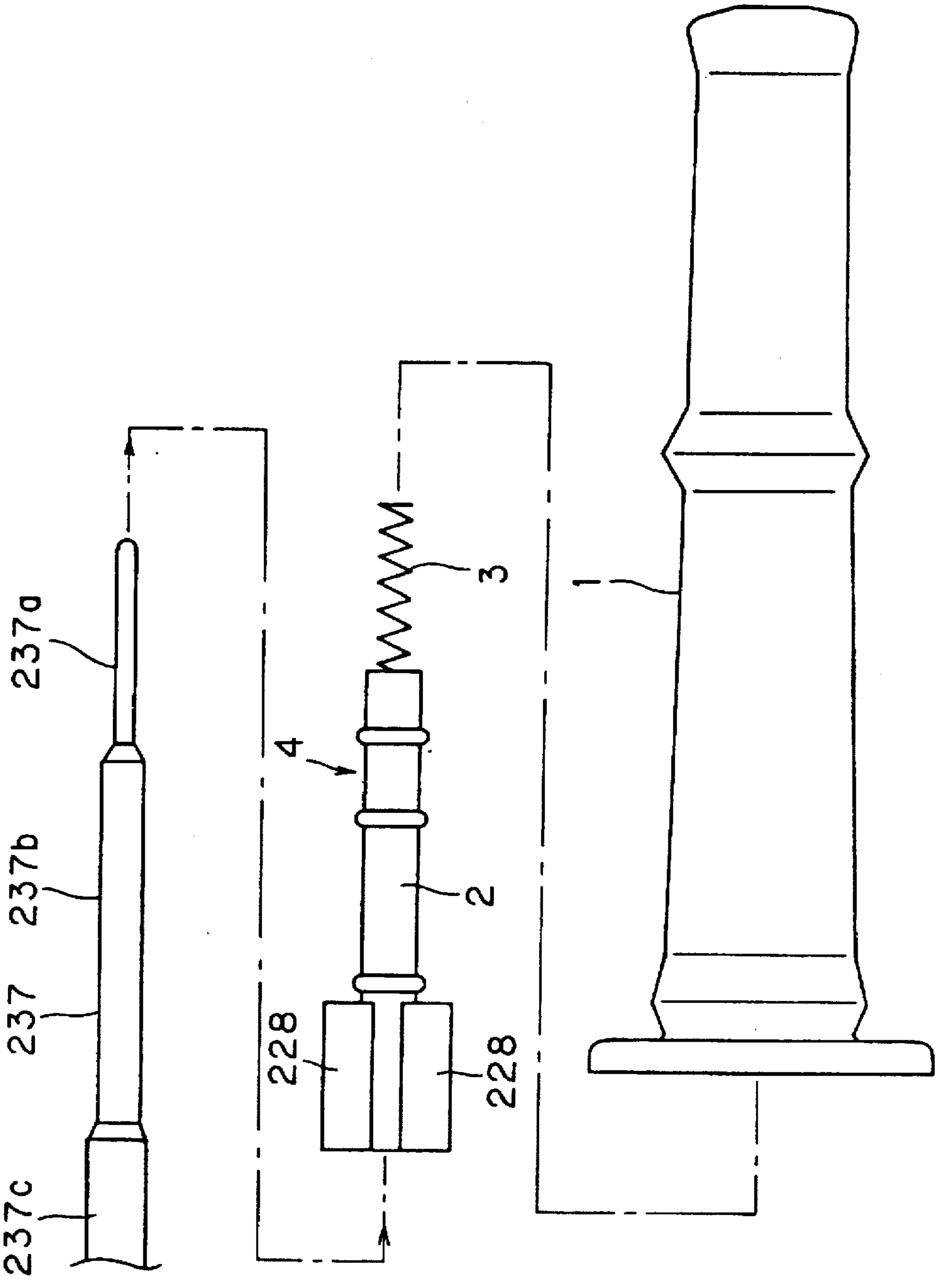
FIGS. 19 through 21 illustrate a temporary insertion process.
Figure 20:
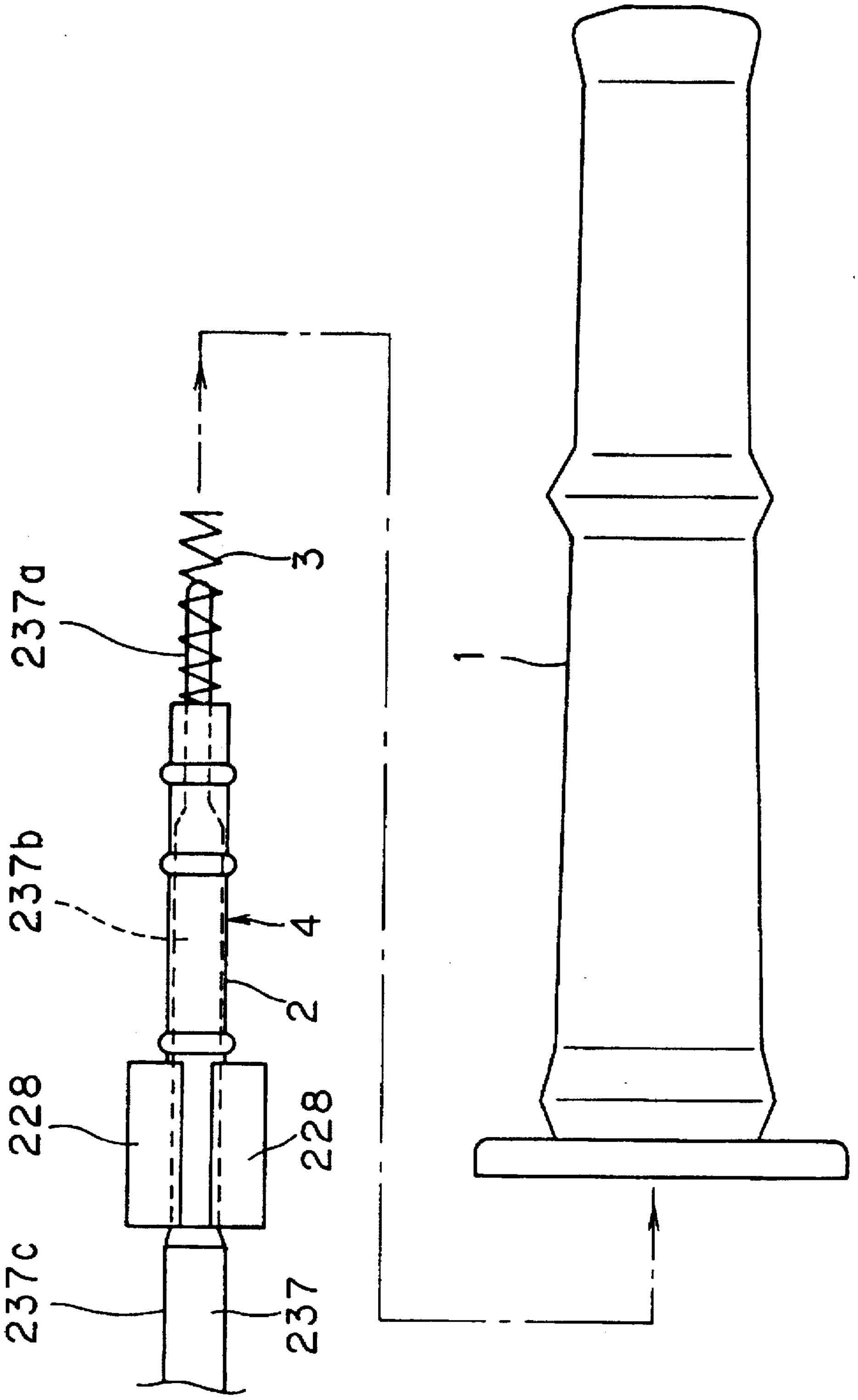
Figure 21:
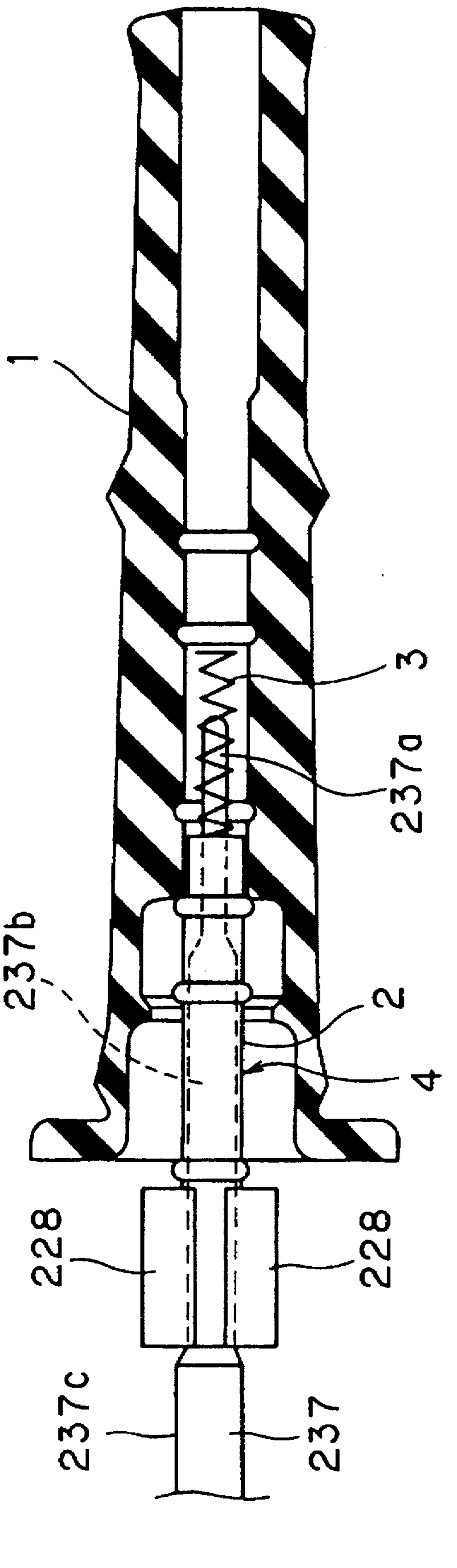

With reference to FIGS. 19 through 21, the terminal alignment rod 237 includes a small-diameter shaft portion 237*a* to be inserted in the coil spring 3, a medium-diameter shaft portion 237*b* to be inserted in the terminal element 2, and a large-diameter shaft portion 237*c* having a greater diameter than the terminal element 2. The longitudinal axes of the respective shaft portions 237*a*, 237*b*, 237*c* are aligned with each other. As shown in FIG. 20, the terminal alignment rod 237 is inserted in the joint terminal 4 such that the forward end of the terminal alignment rod 217 enters the coil spring 3 until it stops slightly short of reaching the free end of the coil spring 3.

A temporary insertion cylinder 239 is provided on one end of the terminal chucking mechanism 202. The forward end of a piston shaft 239*a* of the temporary insertion cylinder 239 is coupled to the slide base plate 232 and the base plate 224. As the piston shaft 239*a* is retracted, the slide base plate 232 and the base plate 224 are integrally moved from the initial position toward the temporary insertion bushing chucking mechanism 201 under the guidance of the guide elements 231 and guide rails 223. The piston shaft 239*a* is extended to return the slide base plate 232 and base plate 224 to the initial position.

Figure 17:
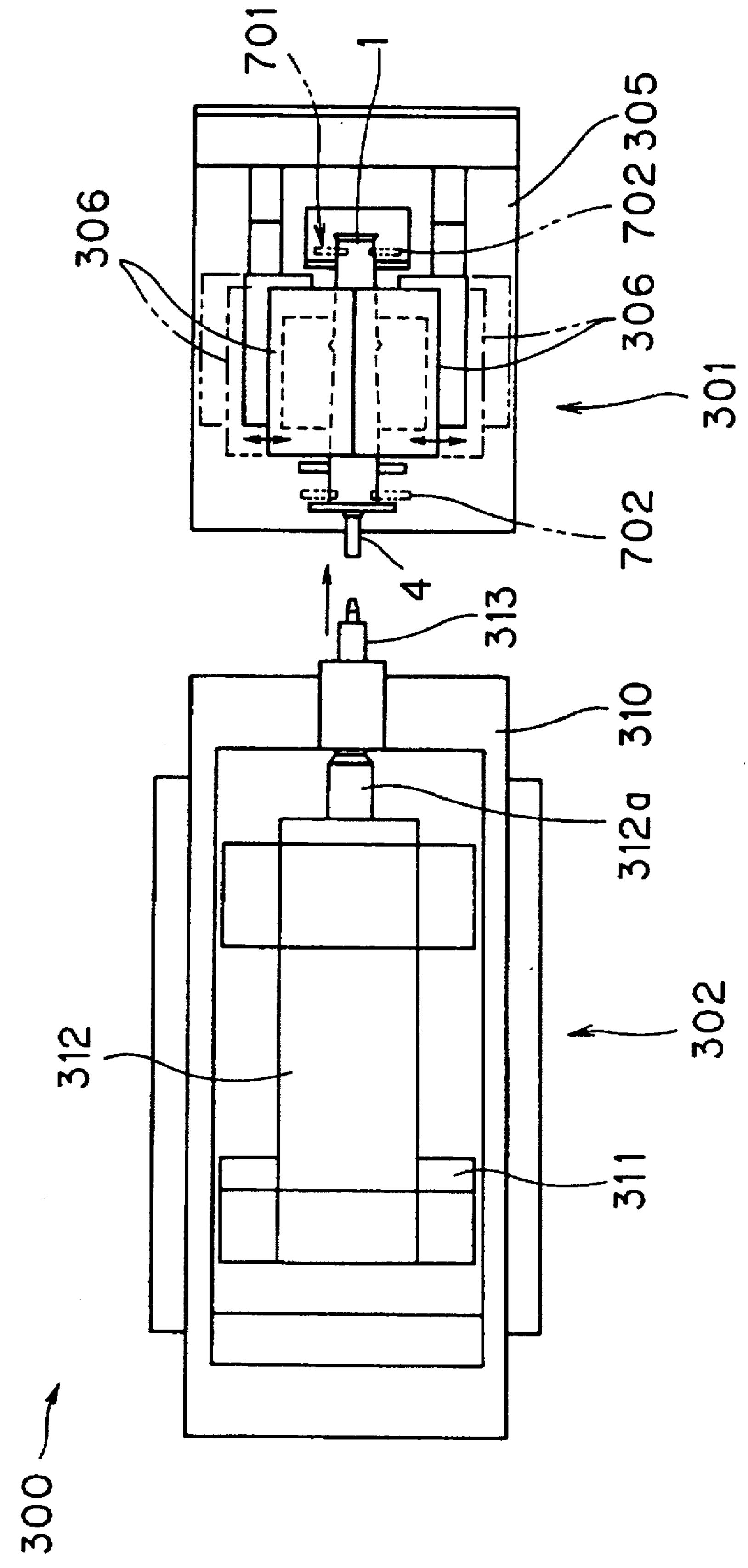
FIG. 17 is a top plan view of the terminal main insertion portion.
Figure 18:
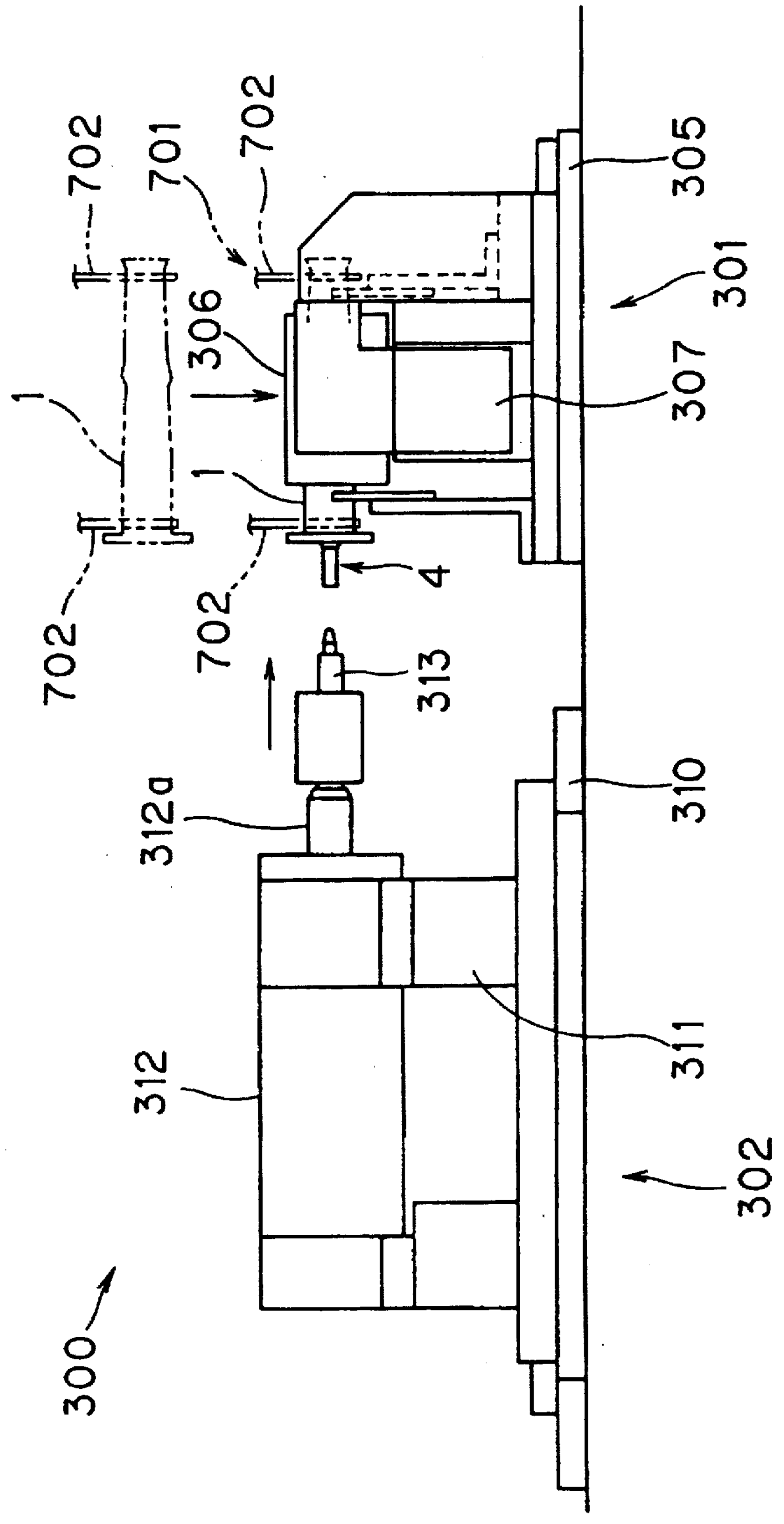
FIG. 18 is a front view of FIG. 17.

The main insertion bushing chucking mechanism 301 is generally similar in construction to the temporary insertion bushing chucking mechanism 201 and, as shown in FIGS. 10,17 and 18, comprises an opening and closing mechanism 307 formed on a base 305 for horizontally opening and closing a pair of chucking elements 306 made of a synthetic resin such as MC nylon by means of an air cylinder and the like. The opening and closing mechanism 307 causes the pair of chucking elements 306 to open and provide access to each other, thereby releasably holding the joint bushing 1.

The opposed inner surfaces of the pair of chucking elements 306 have respective arcuate retaining grooves corresponding to the joint bushing 1 for holding the joint bushing 1 in the horizontal position such that the longitudinal axis of the joint bushing 1 extends in the horizontal direction. The opposed inner surfaces of the pair of chucking elements 306 are in contact with each other when the joint bushing 1 is held by the pair of chucking elements 306. The terminal main insertion portion 300 further comprises a suitable detector 308 such as a sensor for detecting the joint bushing 1 held by the pair of chucking elements 306 as shown in FIG. 22.

Referring to FIGS. 17 and 18, the terminal main insertion mechanism 302 comprises a support base 311 formed on a base plate 310, and a main insertion cylinder 312 including an oil-hydraulic cylinder and mounted on and supported by the support base 311.

A piston shaft 312*a* of the main insertion cylinder 312 is coaxial with the longitudinal axis of the joint bushing 1 held by the chucking elements 306 of the main insertion bushing chucking mechanism 301. A terminal insertion tool 313 sewing as a pushing element is removably mounted on the forward end of the piston shaft 312*a*.

Figure 22:
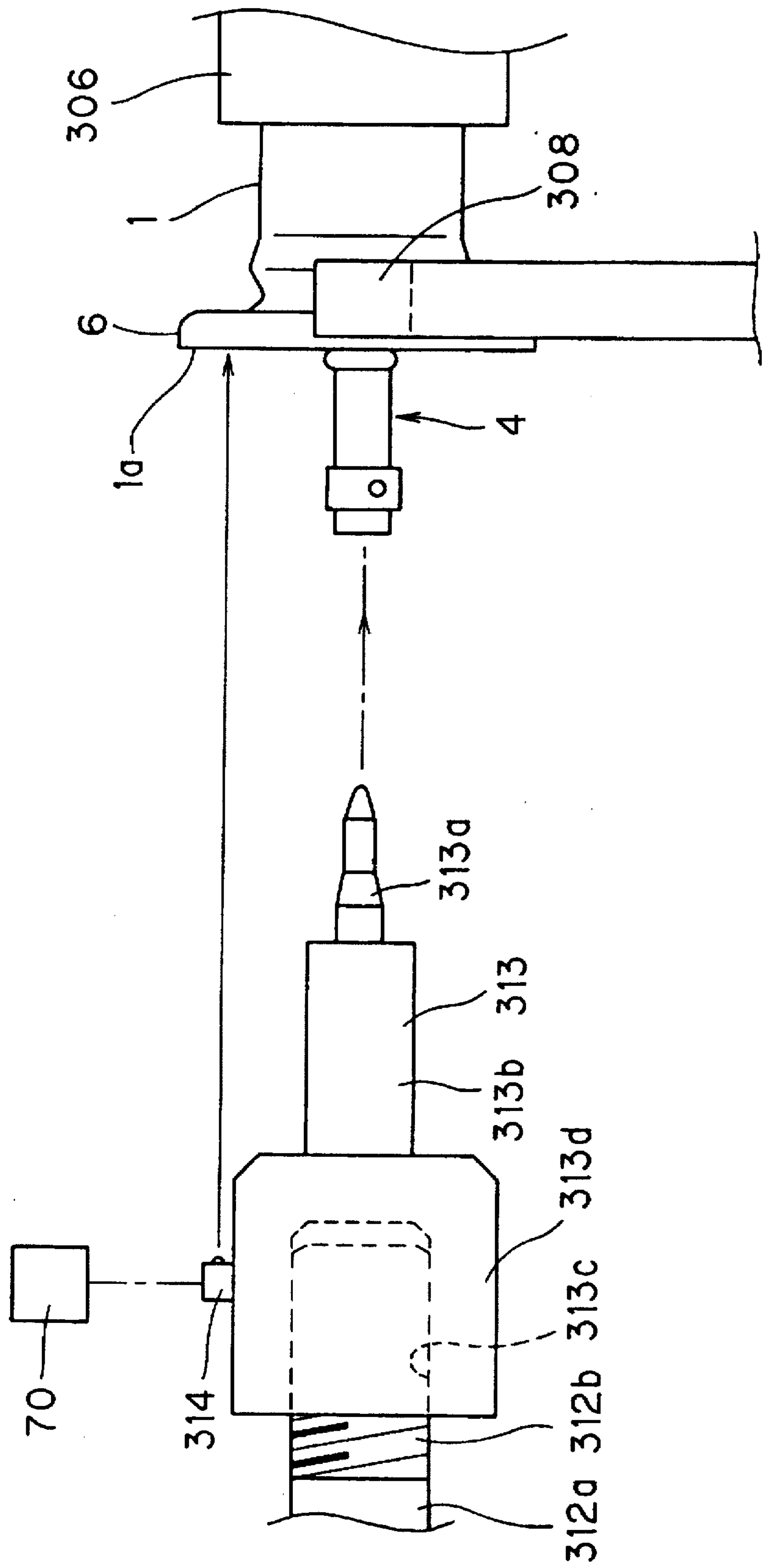
FIGS. 22 and 23 illustrate a main insertion process.
Figure 23:
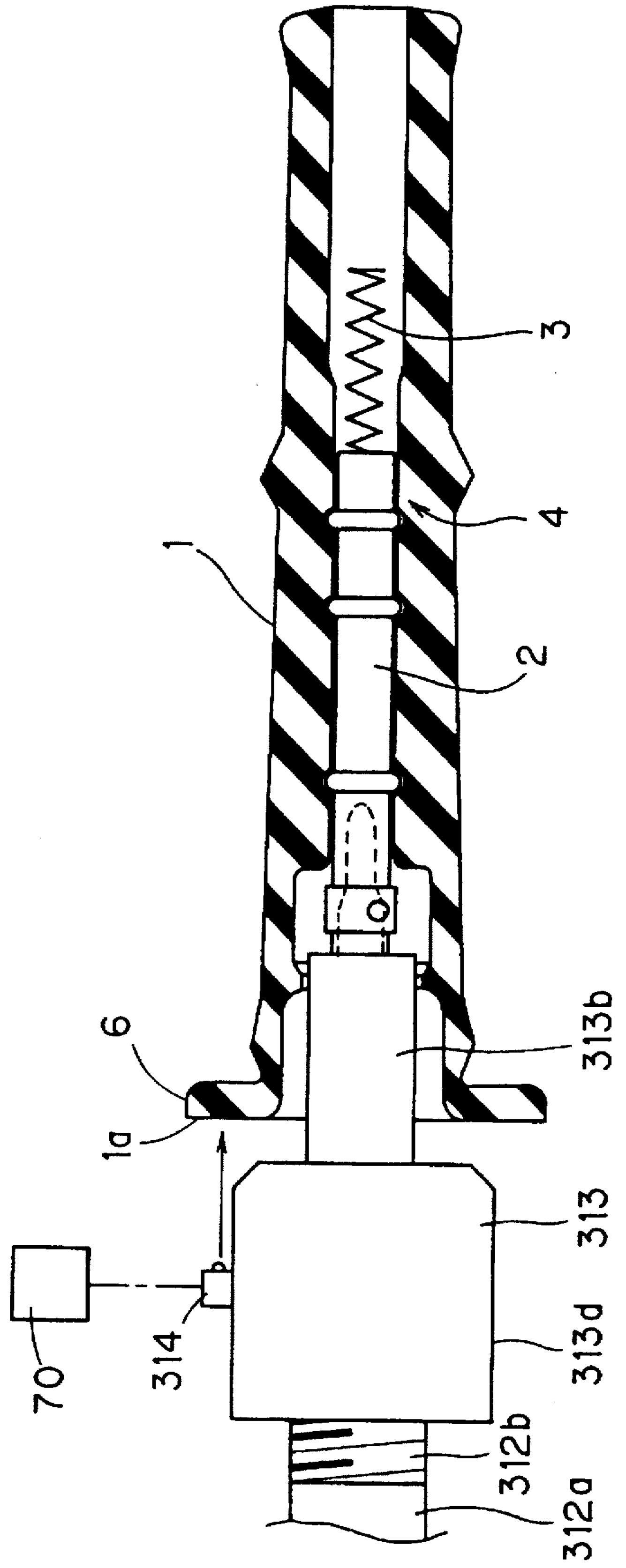

As depicted in FIGS. 22 and 23, the terminal insertion tool 313 includes an insertion shaft portion 313*a* to be inserted in the terminal element 2 of the joint terminal 4, a pressing shaft portion 313 having a greater diameter than the terminal element 2, and a female threaded shaft portion 313*d* having a greater diameter that the pressing shaft portion 313*b* and including a female threaded hole 313*c* in threaded engagement with a male threaded shaft portion 312*b* formed on the forward end portion of the piston shaft 312*a*. The longitudinal axes of the respective portions 313*a*, 313*b*, and 313*d* are aligned with each other. With the terminal insertion tool 313 in threaded engagement with the piston shaft 312*a*, the longitudinal axes of the piston shaft 312*a*, terminal insertion tool 313, and joint bushing 1 held by the chucking elements 306 are aligned with each other.

A distance detector 314 such as a photosensor for detecting the distance from a collar portion end surface 1*a* of the joint bushing 1 is mounted on the outer peripheral surface of the female threaded shaft portion 313*d*. A control portion 70 for the plug joint assembling apparatus 50 controls the amount of extension of the piston shaft 312*a* in response to a signal from the distance detector 314.

When the piston shaft 312*a* of the main insertion cylinder 312 is extended and the distance between the collar portion end surface 1*a* and the distance detector 314 reaches a suitable set value, the control portion 70 stops the extension of the piston shaft 312*a*. Then the control portion 70 retracts the piston shaft 312*a* to the initial position.

As illustrated in FIGS. 14, 15, 17 and 18, the second joint bushing extraction and supply mechanism 701 comprises a pair of openable and closable chucking mechanisms 702 for releasably grasping axially opposite end portions of the joint bushing 1 held by the chucking elements 206 of the temporary insertion bushing chucking mechanism 201.

The pair of chucking mechanisms 702 each of which is open are lowered from the initial position over the joint bushing 1 held by the chucking elements 206. Upon reaching the position of the joint bushing 1, the pair of chucking mechanisms 702 are closed to gasp the opposite end portions of the joint bushing 1, respectively. Then, as the chucking elements 206 are opened to release the grasp of the joint bushing 1, the chucking mechanisms 702 rise and then move horizontally to a position over the main insertion bushing chucking mechanism 301 provided adjacent the temporary insertion bushing chucking mechanism 201.

Upon reaching the position over the main insertion bushing chucking mechanism 301, the pair of chucking mechanisms 702 are lowered. As the joint bushing 1 is fed between the pair of chucking elements 306, the chucking elements 306 are caused to provide access to each other. When the joint bushing 1 is held by the chucking elements 306, each of the chucking mechanisms 702 is opened and moved upwardly and then horizontally to the initial position.

With the chucking mechanisms 702 in the initial position, a third joint bushing extraction and supply mechanism 710 (FIGS. 24 and 25) is located over the main insertion bushing chucking mechanism 301. Like the second joint bushing extraction and supply mechanism 701, the third joint bushing extraction and supply mechanism 710 comprises a pair of chucking mechanisms 711 which are driven in synchronism with the chucking mechanisms 702 of the second joint bushing extraction and supply mechanism 701 so that one joint bushing 1 is removed from the main insertion bushing chucking mechanism 301 at the time when another joint bushing 1 is removed from the temporary insertion bushing chucking mechanism 201.

A series of process steps of inserting the joint terminal 4 in the joint bushing 1 are described below.

The first joint bushing extraction and supply mechanism 600 is driven when each of the joint bushings 1 sequentially transported by the joint bushing feed portion 100 reaches the predetermined position.

The first joint busing extraction and supply mechanism 600 feeds the joint bushing 1 which reaches the predetermined position to the temporary insertion bushing chucking mechanism 201.

In the temporary insertion bushing chucking mechanism 201, when the joint bushing 1 is transported between the pair of chucking elements 206 by the first joint bushing extraction and supply mechanism 600, the chucking elements 206 are caused to provide access to each other and the joint bushing 1 is held in the predetermined horizontal position.

When the joint terminal 4 has reached the terminal extraction position C in the terminal supply mechanism 203, the terminal chucking mechanism 202 is driven to receive the joint terminal 4 at the terminal extraction position C and then return to the initial position.

Upon detection of the joint bushing 1 held by the temporary insertion bushing chucking mechanism 201 and the joint terminal 4 gasped by the terminal chucking mechanism 202 in its initial position, the terminal temporary insertion mechanism 204 is driven.

The slide cylinder 236 of the terminal temporary insertion mechanism 204 is actuated to advance the terminal alignment rod 237 toward the joint terminal 4. When the small-diameter shaft portion 237*a* is inserted in the coil spring 3 and the medium-diameter shaft portion 237*b* is inserted in the joint terminal 4 as shown in FIG. 20, the slide cylinder 236 stops operating.

Next, the temporary insertion cylinder 239 is actuated to integrally move the slide base plate 232 and base plate 224 toward the temporary insertion bushing chucking mechanism 210, thereby inserting the joint terminal 4 receiving the terminal alignment rod 237 therein into the joint bushing 1 held by the chucking elements 206.

As the temporary insertion cylinder 239 is actuated to insert the joint terminal 4 in the joint bushing 1 by a predetermined amount, for example, about two-thirds of the total length of the joint terminal 4, the temporary insertion cylinder 239 stops operating and the chucking elements 228 of the terminal chucking mechanism 202 are opened. The slide cylinder 236 is actuated to return the terminal alignment rod 237 to the initial position, and the temporary insertion cylinder 239 is actuated to return the slide base plate 232 and the base plate 224 to the initial position. This terminates the process step of temporarily inserting the joint terminal 4.

Upon completion of the temporary insertion process, the second joint bushing extraction and supply mechanism 701 is driven to move the pair of chucking mechanisms 702 downwardly. Then each of the chucking mechanisms 702 is closed to grasp the joint bushing 1. The pair of chucking elements 206 are opened to release the grasp of the joint bushing 1. The pair of chucking mechanisms 702 are then moved upwardly. In this manner, the temporary insertion bushing chucking mechanism 201 extracts the joint bushing 1 in the temporary insertion condition.

The chucking mechanisms 702 are moved horizontally to a position over the main insertion bushing chucking mechanism 301, stopped, and moved downwardly. As the joint bushing 1 is transported between the chucking elements 306, the chucking elements 306 are caused to provide access to each other to hold the joint bushing 1 in the predetermined horizontal position.

When the joint bushing 1 is held by the chucking elements 306, each of the chucking mechanisms 702 is opened and returned to the initial position.

The terminal main insertion mechanism 302 is driven upon detection of the joint bushing 1 held by the main insertion bushing chucking mechanism 301. More specifically, the main insertion cylinder 312 of the terminal main insertion mechanism 302 is actuated to advance the terminal insertion tool 313 toward the joint bushing 1. During the advance, the distance detector 314 continuously measures the distance from the collar portion end surface 1*a*.

The main insertion cylinder 312 stops operating when the distance between the distance detector 314 and the collar portion end surface 1*a* reaches the set value. This provides the joint terminal 4 inserted in the joint bushing 1 by the predetermined amount corresponding to the set value as shown in FIG. 23.

Then, the main insertion cylinder 312 is actuated to return the terminal insertion tool 313 to the initial position. This terminates the process step of mainly inserting the joint terminal 4.

Upon completion of the main insertion process, the third joint bushing extraction and supply mechanism 710 is driven to lower the pair of chucking mechanisms 711. Then the pair of chucking mechanisms 711 are caused to provide access to each other to grasp the joint bushing 1. The pair of chucking elements 306 are opened to release the holding of the joint bushing 1. The pair of chucking mechanisms 711 grasping the joint bushing are moved upwardly. In this manner, the main insertion bushing chucking mechanism 301 extracts the joint bushing 1 in which the joint terminal 4 has been inserted.

The chucking mechanisms 701 are moved horizontally toward the withstand voltage test portion 400 to transport the joint bushing 1 to a predetermined position.

The terminal main insertion portion 300 performs the terminal main insertion process while the terminal temporary insertion portion 200 performs the terminal temporary insertion process. The third joint bushing extraction and supply mechanism 710 extracts one joint bushing 1 from the main insertion bushing chucking mechanism 301 while the second joint bushing extraction and supply mechanism 701 extracts another joint bushing 1 from the temporary insertion bushing chucking mechanism 201. The first joint bushing extraction and supply mechanism 600 feeds one joint bushing 1 to the temporary insertion bushing chucking mechanism 201 while the second joint bushing extraction and supply mechanism 701 feeds another joint bushing 1 to the main insertion bushing chucking mechanism 301.

Figure 24:
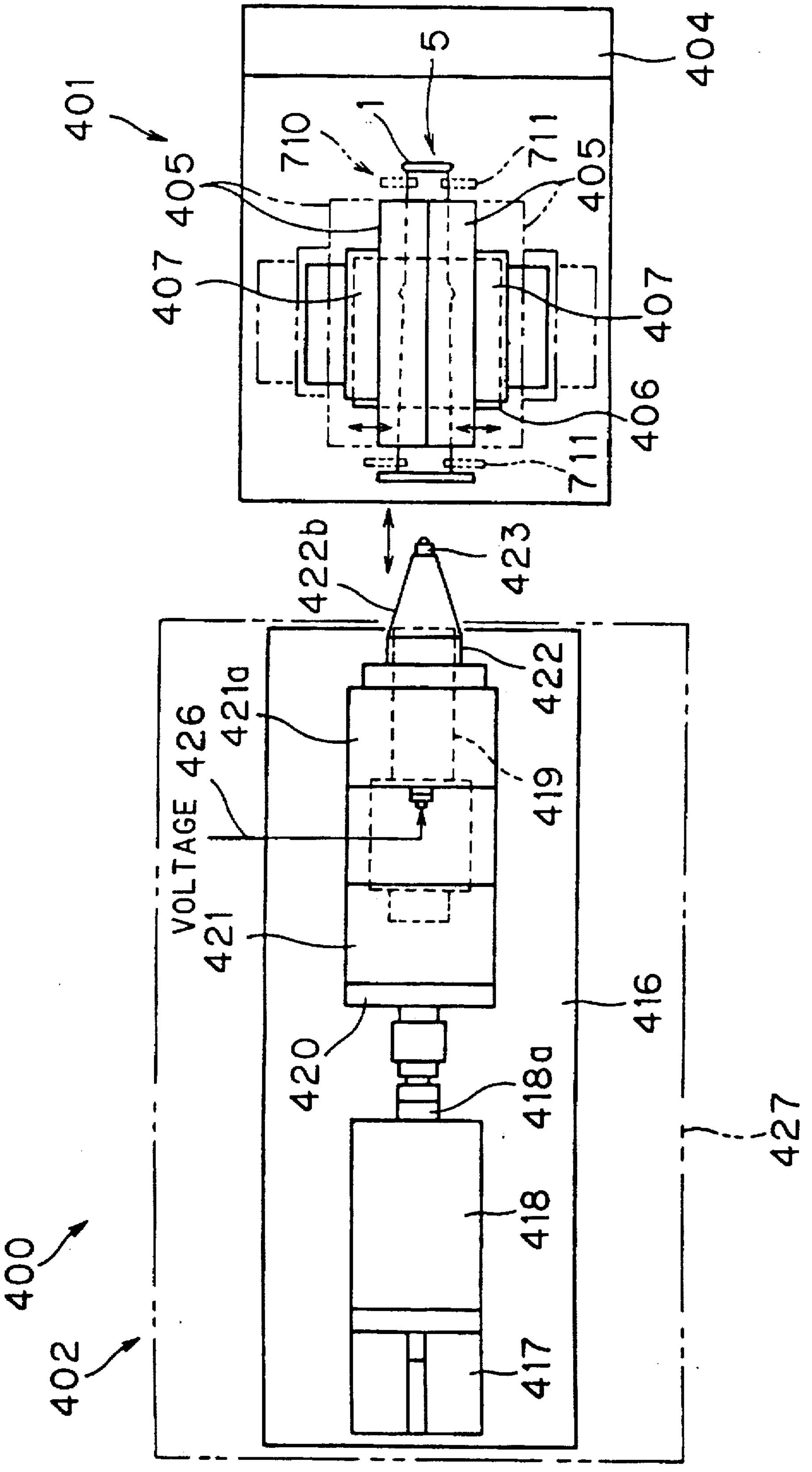
FIG. 24 is a top plan view of a withstand voltage test portion.
Figure 25:
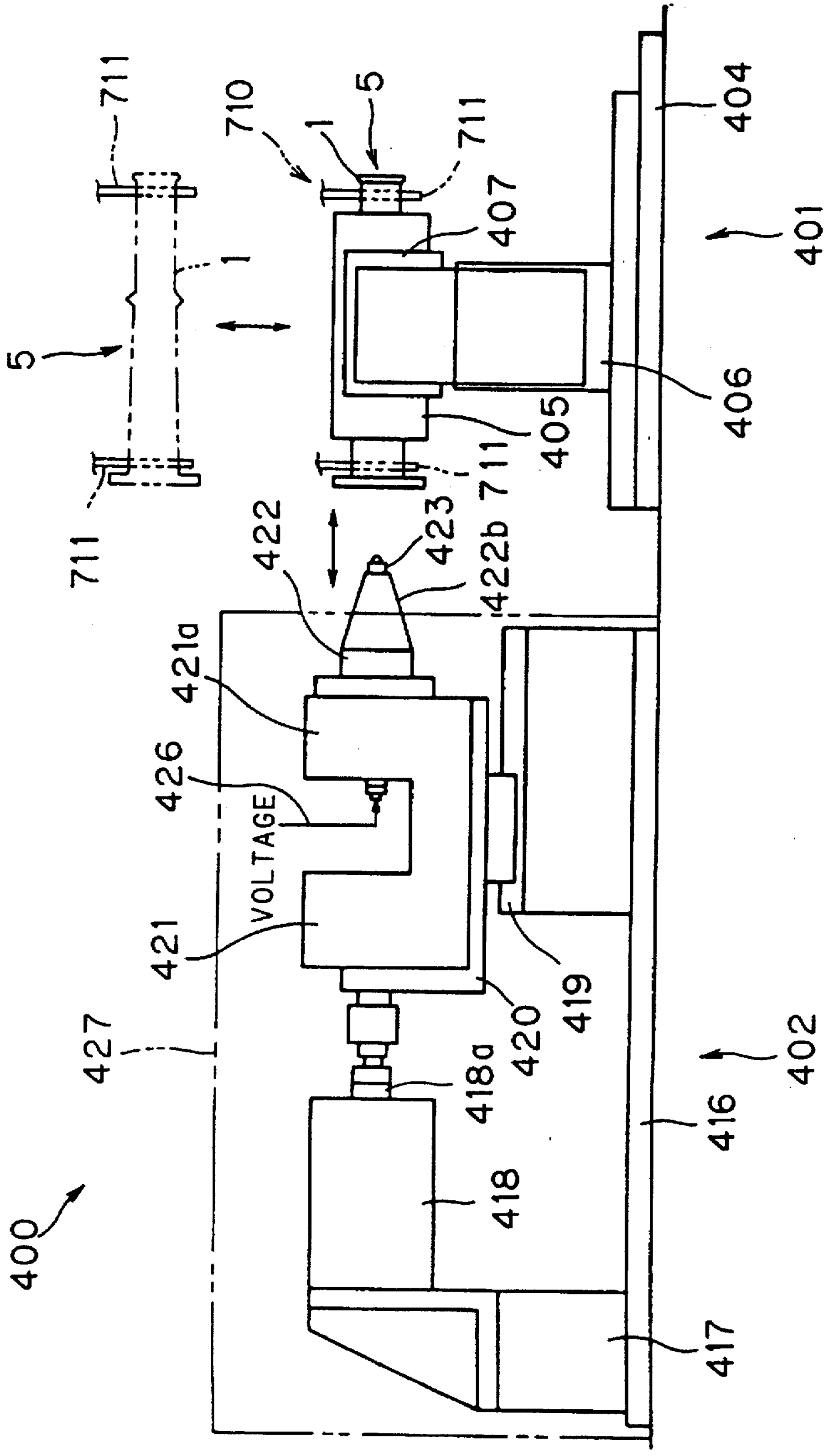
FIG. 25 is a front view of FIG. 24.
Figure 26:
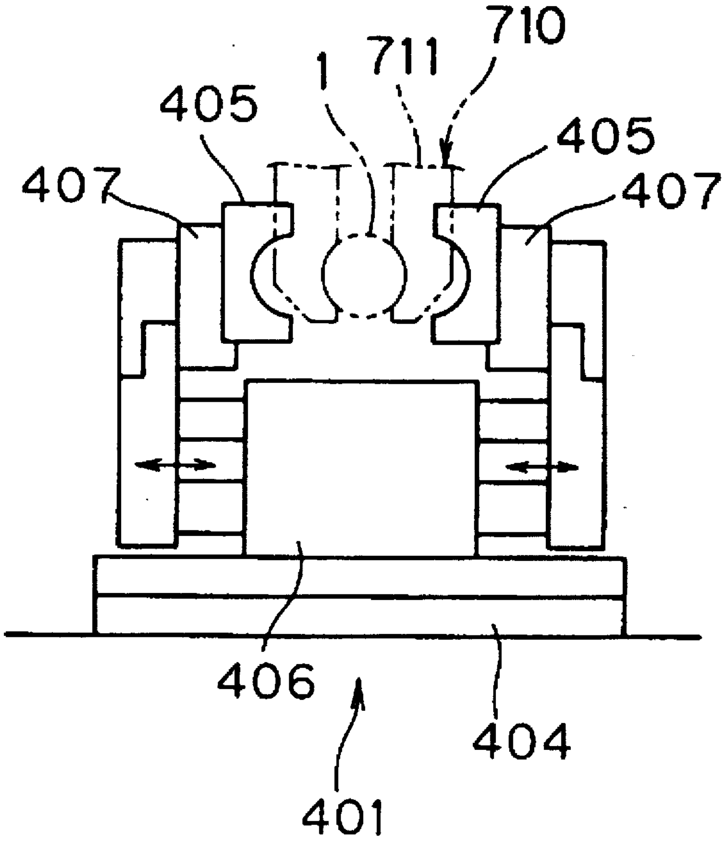
FIG. 26 is a left side view of a check bushing chucking mechanism in FIG. 25.

Referring now to FIGS. 24 through 26, the withstand voltage test portion 400 comprises a check bushing chucking mechanism 401 and a voltage applying mechanism 402.

The third joint bushing extraction and supply mechanism 710 is provided over the main insertion bushing chucking mechanism 301 located upstream of the assembly process of a plug joint 5 and the check bushing chucking mechanism 401. The third joint bushing extraction and supply mechanism 710 removes the plug joint 5 having the joint terminal 4 inserted in the joint bushing 1 from the main insertion bushing chucking mechanism 301 to feed the plug joint 5 to the check bushing chucking mechanism 401.

The check bushing chucking mechanism 401 which is similar in construction to the main insertion bushing chucking mechanism 301 comprises an opening and closing mechanism 406 formed on a base 404 for horizontally opening and closing a pair of grounded chucking elements 405 by means of an air cylinder and the like as shown in FIGS. 24 through 26. The opening and closing mechanism 406 causes the pair of grounded chucking elements 405 to open and provide access to each other to releasably hold the outer peripheral surface of the joint bushing 1 of the plug joint 5.

The grounded chucking elements 405 are made of a conductive metal material such as SS41 (defined by the Japanese Industrial Standards) and supported by an insulating member 407 made of an insulative material such as MC nylon. The insulating member 407 is supported by the opening and closing mechanism 406.

The opposed inner surfaces of the pair of grounded chucking elements 405 have respective arcuate retaining grooves corresponding to the joint bushing 1 for holding the joint bushing 1 in a horizontal position such that the longitudinal axis of the joint bushing 1 extends in the horizontal direction.

Figure 29:
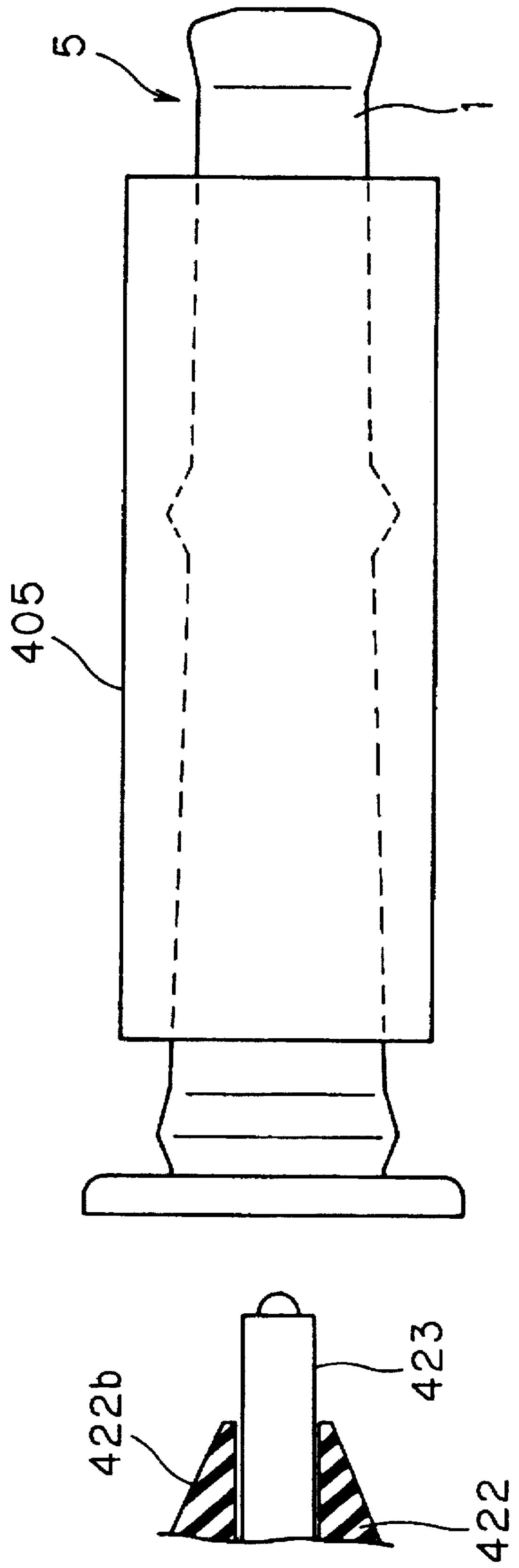
FIG. 29 illustrates a plug joint held by grounded chucking elements.

Referring to FIG. 29, the pair of grounded chucking elements 405 hold an axially intermediate portion of the joint bushing 1 in the horizontal position such that a predetermined length (e.g., about 15 to 20 mm) of axially opposed end portions of the joint bushing 1 are left unretained.

The withstand voltage test portion 400 further comprises a suitable detector such as a sensor for detecting the joint bushing 1 held by the pair of grounded chucking elements 405.

Figure 27:
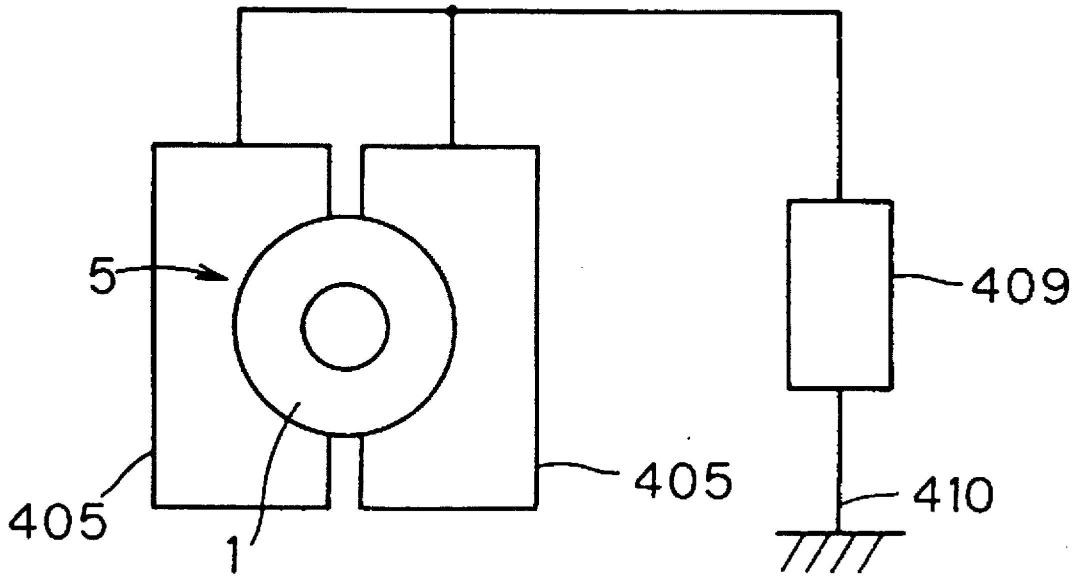
FIG. 27 illustrates a circuit of a leak detector.
Figure 28:
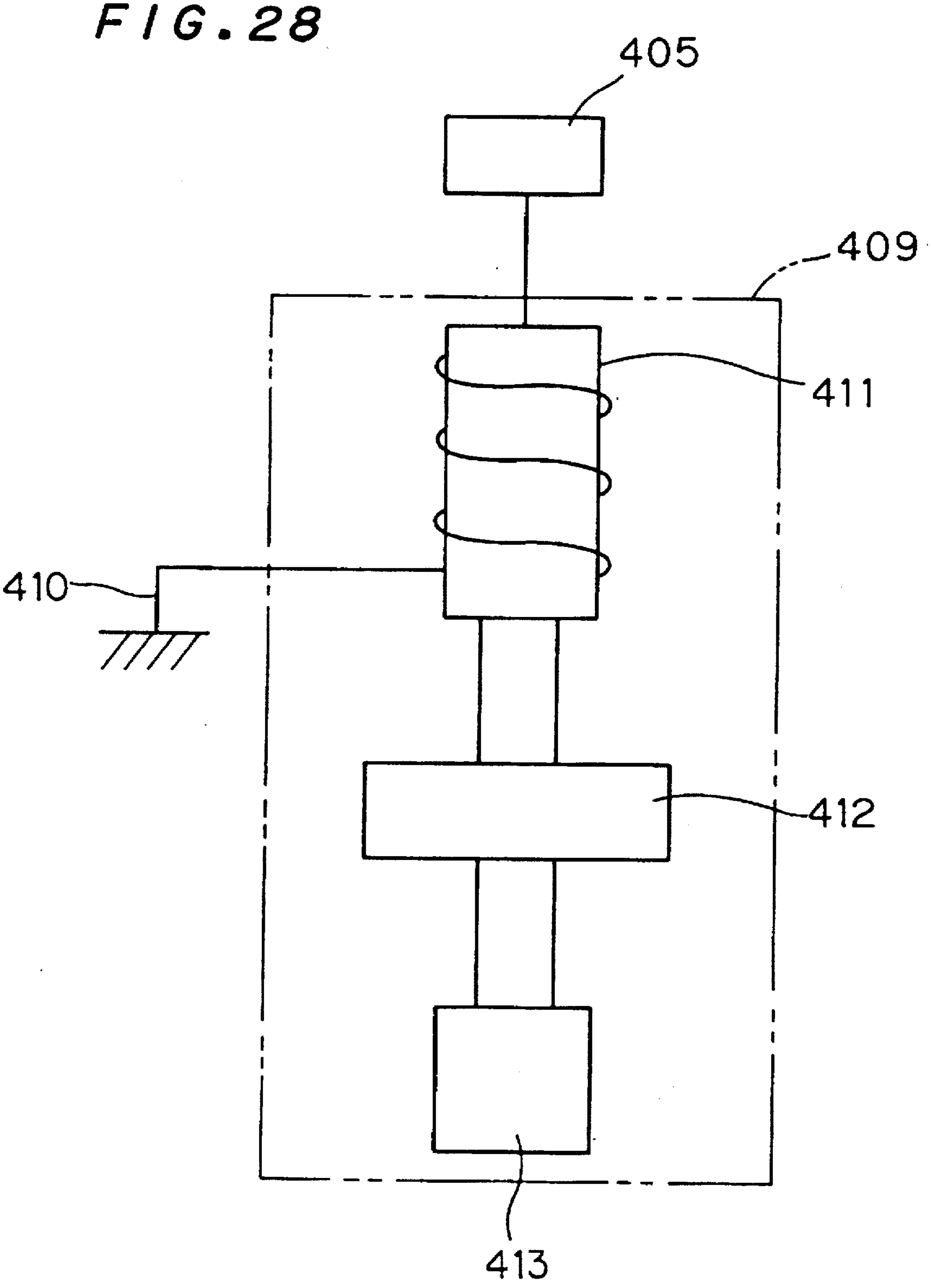
FIG. 28 is a detail view of the leak detector.

As illustrated in FIGS. 27 and 28, the pair of grounded chucking elements 405 are grounded through a leak detector 409 which includes a current amplifier 411 for amplifying the current flowing from the grounded chucking elements 405 to a ground 410, a variable resistor 412 (0 to 1 KΩ) for converting the current amplified by the current amplifier 411 to a voltage, and an indicator 413 for indicating the voltage converted by the variable resistor 412.

As shown in FIGS. 24 and 25, the voltage applying mechanism 402 comprises a cylinder support base 417 on one end of an upper surface of a base plate 416, and an operating cylinder 418 including an oil-hydraulic cylinder mounted to the cylinder support base 417.

A piston shaft 418*a* of the operating cylinder 418 is located in coaxially aligned relation with the joint bushing 1 held by the grounded chucking elements 405 of the check bushing chucking mechanism 401.

A guide rail 419 extending in the direction of extension and retraction of the piston shaft 418*a* is provided on the other end portion of the base plate 416. As shown in FIG. 25, a slide element of generally L-shape in front elevation is slidably mounted along the guide rail 419. One end of the slide element 420 adjacent the one end portion of the base plate 416 is coupled to the piston shaft 418*a* of the operating cylinder 418.

Mounted on the slide element 420 is an insulating support element 421 of generally U-shape in front elevation and made of an insulating material such as MC nylon. An electrode support element 422 formed of an insulating material such as MC nylon is mounted on the end surface of a vertical wall portion 421*a* of the insulating support element 421 which is closer to the check bushing chucking mechanism 401.

Figure 30:
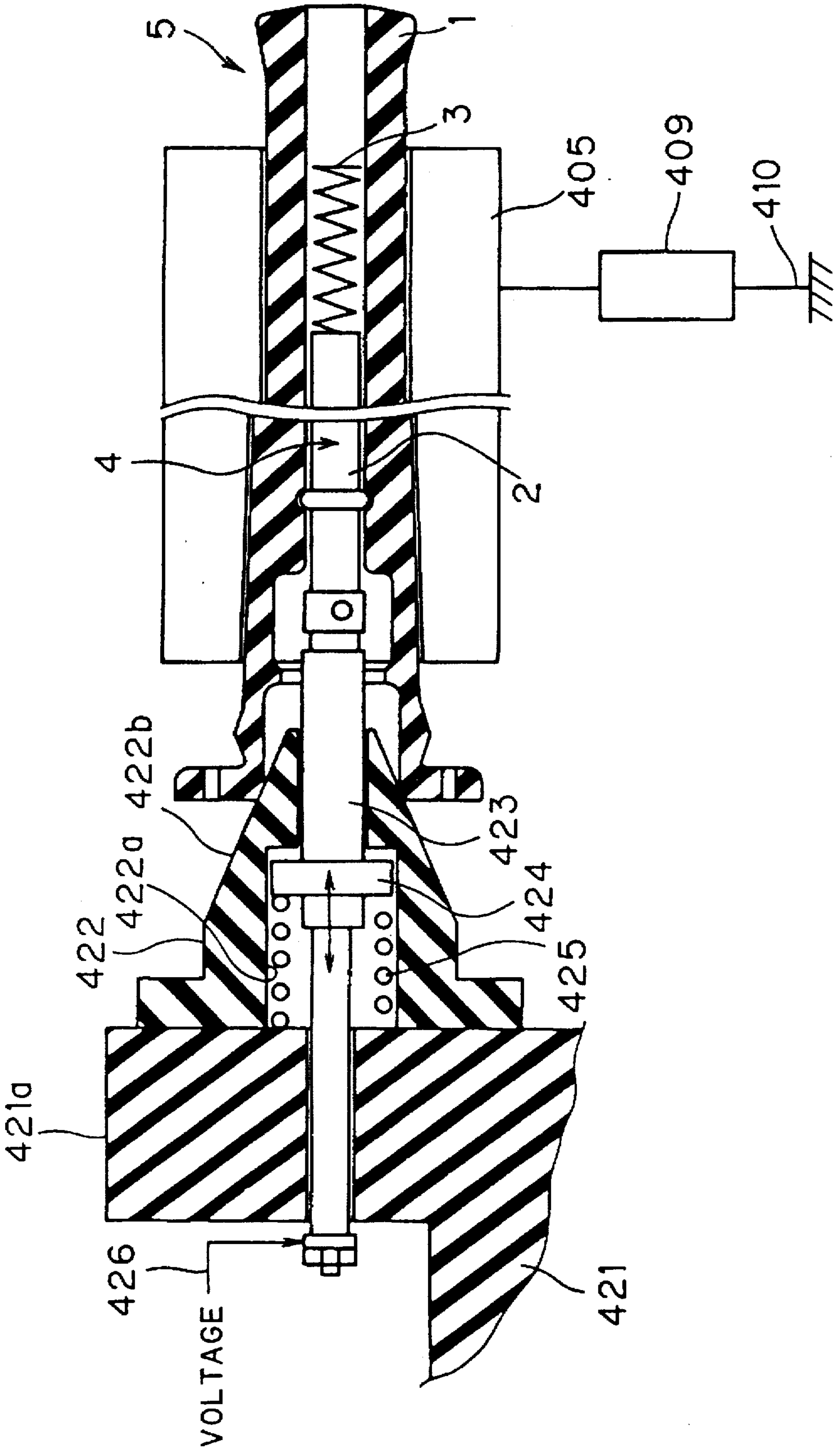
FIG. 30 illustrates the operation of a leak check.

An electrode 423 serving as an electrode portion extends through the vertical wall portion 421*a* and electrode support element 422 and in coaxially aligned relation with the joint bushing 1 held by the grounded chucking elements 405 of the check bushing chucking mechanism 401. The electrode 423 is provided with a radially overhanging spring receiving portion 424 in its axially intermediate portion as shown in FIG. 30.

The electrode support element 422 has a recess 422*a* formed therein for receiving the spring receiving portion 424 of the electrode 423 which is movable in the axial direction. As illustrated in FIG. 30, a coil spring 425 which is compressed is received between the spring receiving portion 424 received in the recess 422*a* and the vertical wall portion 421*a*. The electrode 423 is movable in the axial direction against the elastic urging force of the coil spring 425.

More specifically, the piston shaft 418*a* of the operating cylinder 418 is extended to push the slide element 420 and insulating support element 421 along the guide rail 419. As the forward end of the electrode 423 contacts the joint terminal 4 of the plug joint 5 held by the grounded chucking elements 405 as shown in FIG. 30, the electrode 423 is slightly pushed back against the elastic urging force of the coil spring 425.

The retraction of the piston shaft 418*a* returns the slide element 420 and insulating support element 421 to the initial position. The electrode 423 is returned to the initial position by the elastic urging force of the coil spring 425.

A connecting cord 426 from an ignition coil not shown is connected to an end of the electrode 423 projecting from the other end of the vertical wall portion 421*a*. The outer peripheral surface of the electrode support element 422 adjacent the check bushing chucking mechanism 401 includes a tapered surface 422*b* of a gradually decreasing diameter and coaxially aligned with the electrode 423.

A cover element 427 made of an insulating clear synthetic resin surrounds the outer peripheral portion, that is, the front, rear and upper portions of the voltage applying mechanism 402.

The third joint bushing extraction and supply mechanism 710 comprises the pair of openable and closable chucking mechanisms 711 for releasably grasping the axially opposite end portions of the joint bushing 1 held by the chucking elements 306 of the main insertion bushing chucking mechanism 301. The pair of chucking mechanisms 711 each of which is open are moved downwardly from the initial position over the joint bushing 1 of the plug joint 5 held by the chucking elements 306. Upon arrival at the position of the joint bushing 1, the pair of chucking mechanisms 711 are closed to grasp the opposite end portions of the joint bushing 1, respectively.

As the chucking elements 306 are opened to release the grasp of the joint bushing 1, the chucking mechanisms 711 are moved upwardly and then horizontally to a position over the check bushing chucking mechanism 401 provided adjacent the main insertion bushing chucking mechanism 301.

Upon reaching the position over the check bushing chucking mechanism 401, the pair of chucking mechanisms 711 are moved downwardly. As the joint bushing 1 is transported between the grounded chucking elements 405, the grounded chucking elements 405 are caused to provide access to each other. As the joint bushing 1 is held by the grounded chucking elements 405, each of the chucking mechanisms 711 is opened, moved upwardly and then horizontally back to the initial position over the main insertion bushing chucking mechanism 301. In this manner; the plug joint 5 is fed to the check bushing chucking mechanism 401.

With the pair of chucking mechanisms 711 in the initial position, a fourth joint bushing extraction and supply mechanism 720 is located in a position over the check bushing chucking mechanism 401. Like the third joint bushing extraction and supply mechanism 710, the fourth joint bushing extraction and supply mechanism 720 comprises a pair of chucking mechanisms 721 (FIGS. 31 and 32) which are driven in synchronism with the chucking mechanisms 711 of the third joint bushing extraction and supply mechanism 710 and designed to extract one plug joint 5, that is, one joint bushing 1 from the check bushing chucking mechanism 401 while another joint bushing 1 is extracted from the main insertion bushing chucking mechanism 301.

The leak check of the plug joint 5 in the withstand voltage test portion 400 is described below.

When the terminal main insertion portion 300 forces the joint terminal 4 into the predetermined position in the joint bushing 1, the third joint bushing extraction and supply mechanism 710 is driven to lower the pair of chucking mechanisms 711. The pair of chucking mechanisms 711 are closed to grasp the joint bushing 1, respectively. As the chucking elements 306 are opened to release the holding of the joint bushing 1, the pair of chucking mechanisms 711 are moved upwardly. In this fashion, the main insertion bushing chucking mechanism 301 extracts the joint bushing 1 receiving therein the joint terminal 4, that is, the plug joint 5.

The chucking mechanisms 711 are moved horizontally to reach a position over the check bushing chucking mechanism 401. Then the chucking mechanisms 711 are stopped and lowered. As the plug joint 5 is fed between the grounded chucking elements 405, the grounded chucking elements 405 are caused to provide access to each other to hold the joint bushing 1 of the plug joint 5 in a predetermined horizontal position.

When the joint bushing 1 is held by the grounded chucking elements 405, each of the chucking mechanisms 711 is opened and then returned to the initial position.

The voltage applying mechanism 402 is driven when the detector detects the joint bushing 1 held by the check bushing chucking mechanism 401. More specifically, the operating cylinder 418 of the voltage applying mechanism 402 is actuated to advance the insulating support element 421 toward the plug joint 5.

When the insulating support element 421 is moved a predetermined distance, as shown in FIG. 30, the forward end of the electrode 423 comes into elastic contact with the end of the terminal element 2 in the joint bushing 1.

Then, in this state, a voltage (about 30 kV) generated by the ignition coil is applied to the joint terminal 4 through the connecting cord 426 and electrode 423 over a predetermined time period (e.g., 5 seconds).

If no current flows to the grounded chucking elements 405, the leak detector 409 detects no current to determine that the result of leak check is acceptable. If current flows to the grounded chucking elements 405, the leak detector 409 detects the current to determine that the result of leak check is defective (leak check process).

The voltage from the ignition coil is removed at the time when the leak detector 409 detects a current flow.

Upon completion of the leak check, the fourth joint bushing extraction and supply mechanism 720 is driven to lower the pair of chucking mechanisms 721. The pair of chucking mechanisms 721 are closed to grasp the joint bushing 1 of the plug joint 5, respectively. Then the pair of grounded chucking elements 405 are opened to release the holding of the joint bushing 1. The pair of chucking mechanisms 721 grasping the joint bushing 1 are moved upwardly. In this manner, the plug joint 5 on which the leak check has been performed by the check bushing chucking mechanism 401 is extracted.

The pair of chucking mechanisms 721 are horizontally moved toward the terminal insertion condition check and talc coating portion 500 to transport the plug joint 5 to a predetermined position.

The withstand voltage test portion 400 performs the leak check while the terminal main insertion portion 300 mainly inserts the joint terminal 4. The fourth joint bushing extraction and supply mechanism 720 extracts one plug joint 5 from the check bushing chucking mechanism 401 while the third joint bushing extraction and supply mechanism 710 extracts another plug joint 5 from the main insertion bushing chucking mechanism 301. The second joint bushing extraction and supply mechanism 701 feeds one joint bushing 1 in the temporary insertion condition to the main insertion bushing chucking mechanism 301 while the third joint bushing extraction and supply mechanism 710 feeds one plug joint 5 to the checking bushing chucking mechanism 401.

Referring to FIGS. 31 through 34, the terminal insertion condition check and talc coating portion 500 comprises a bushing retaining mechanism 501, a retraction length check mechanism 501 located on one side of the bushing retaining mechanism 501, and a talc coating mechanism 503 located on the other side of the bushing retaining mechanism 501.

The fourth joint bushing extraction and supply mechanism 720 is provided over the check bushing chucking mechanism 401 located upstream of the assembly process of the plug joint 5 and the bushing retaining mechanism 501. The fourth joint bushing extraction and supply mechanism 720 is designed to remove the plug joint 5 from the check bushing chucking mechanism 401 to feed the plug joint 5 to the bushing retaining mechanism 501.

Figure 31:
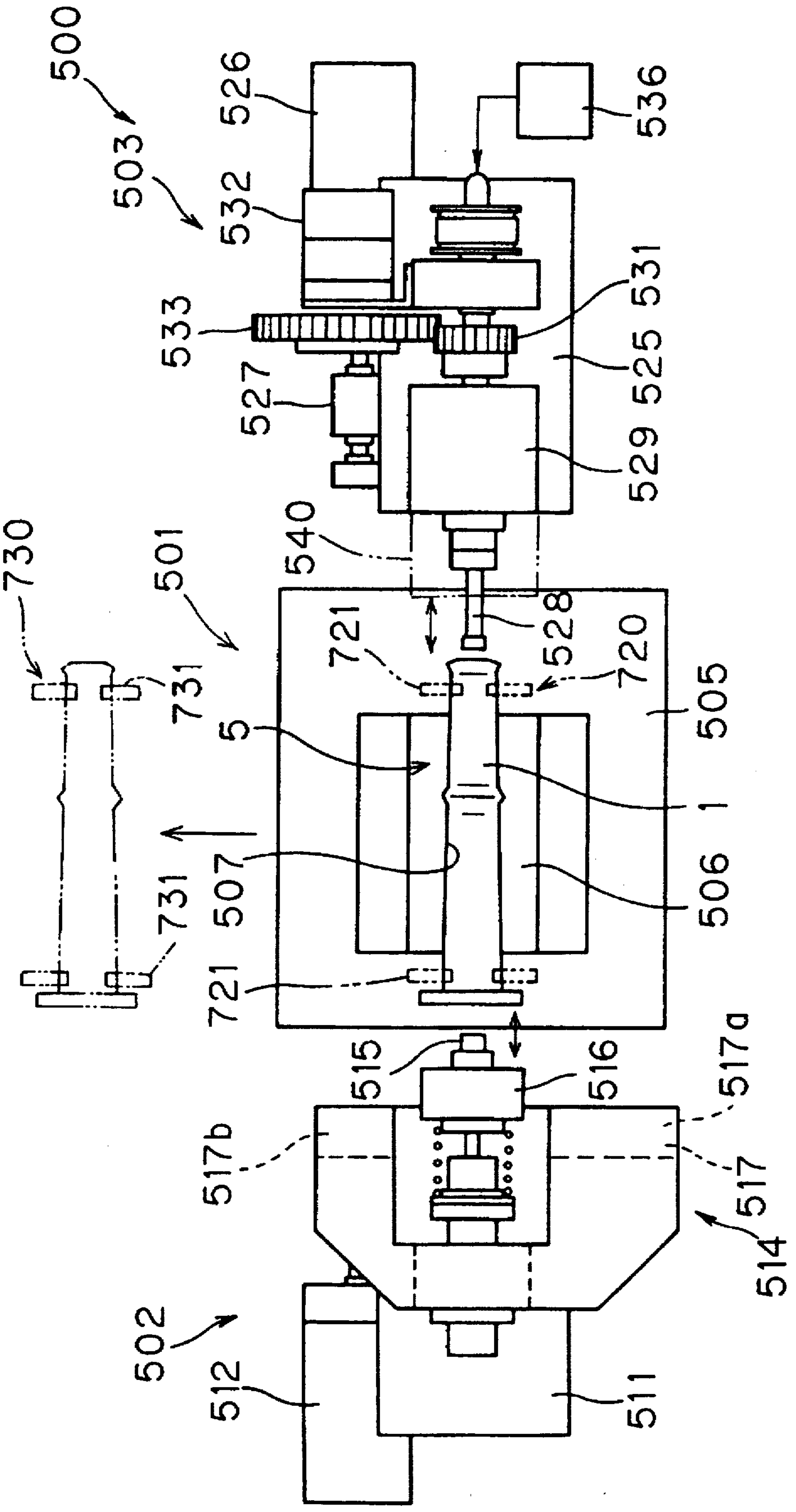
FIG. 31 is a top plan view of a terminal insertion condition check and talc coating portion.
Figure 32:
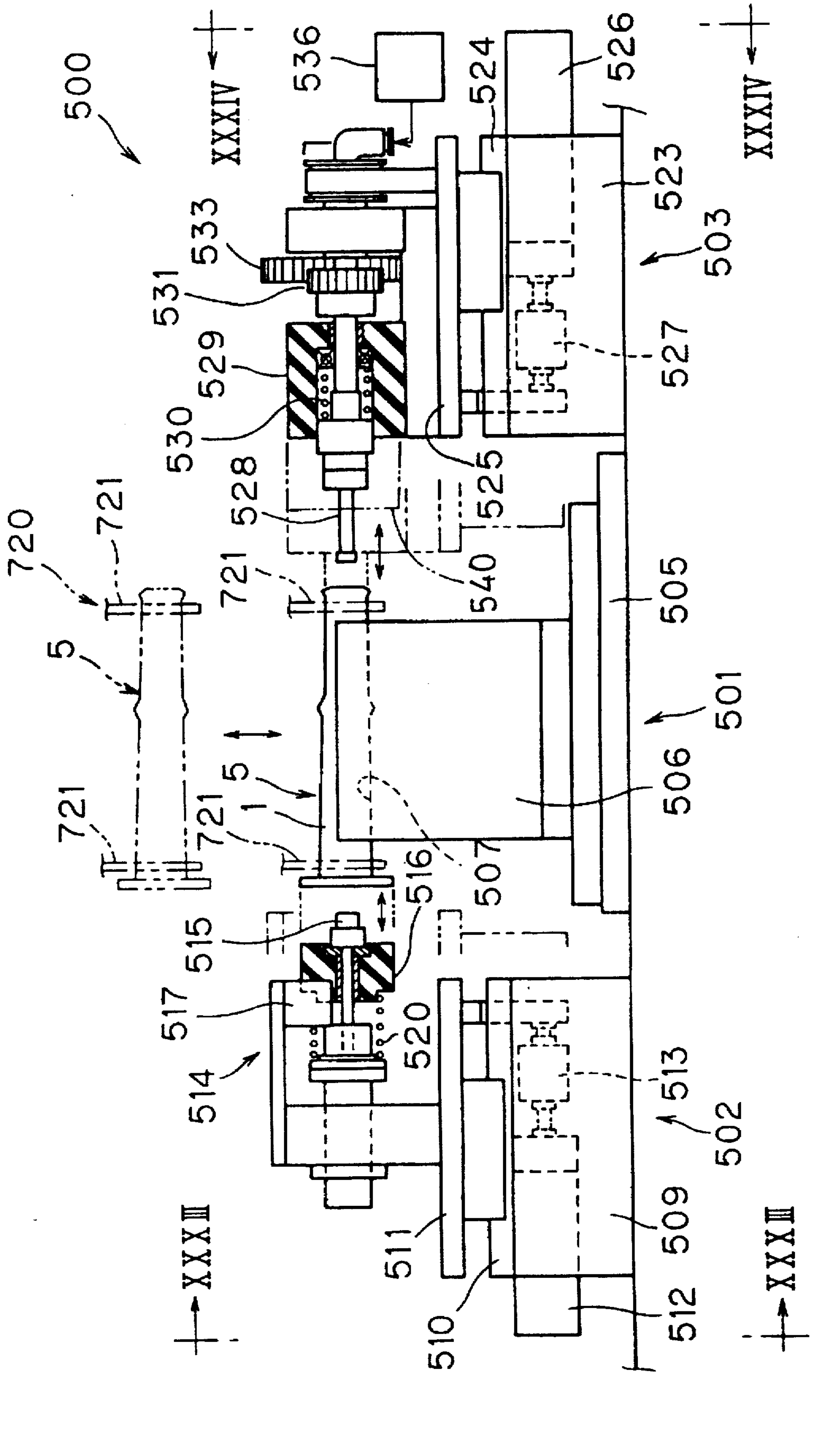
FIG. 32 is a front view of FIG. 31.
Figure 33:
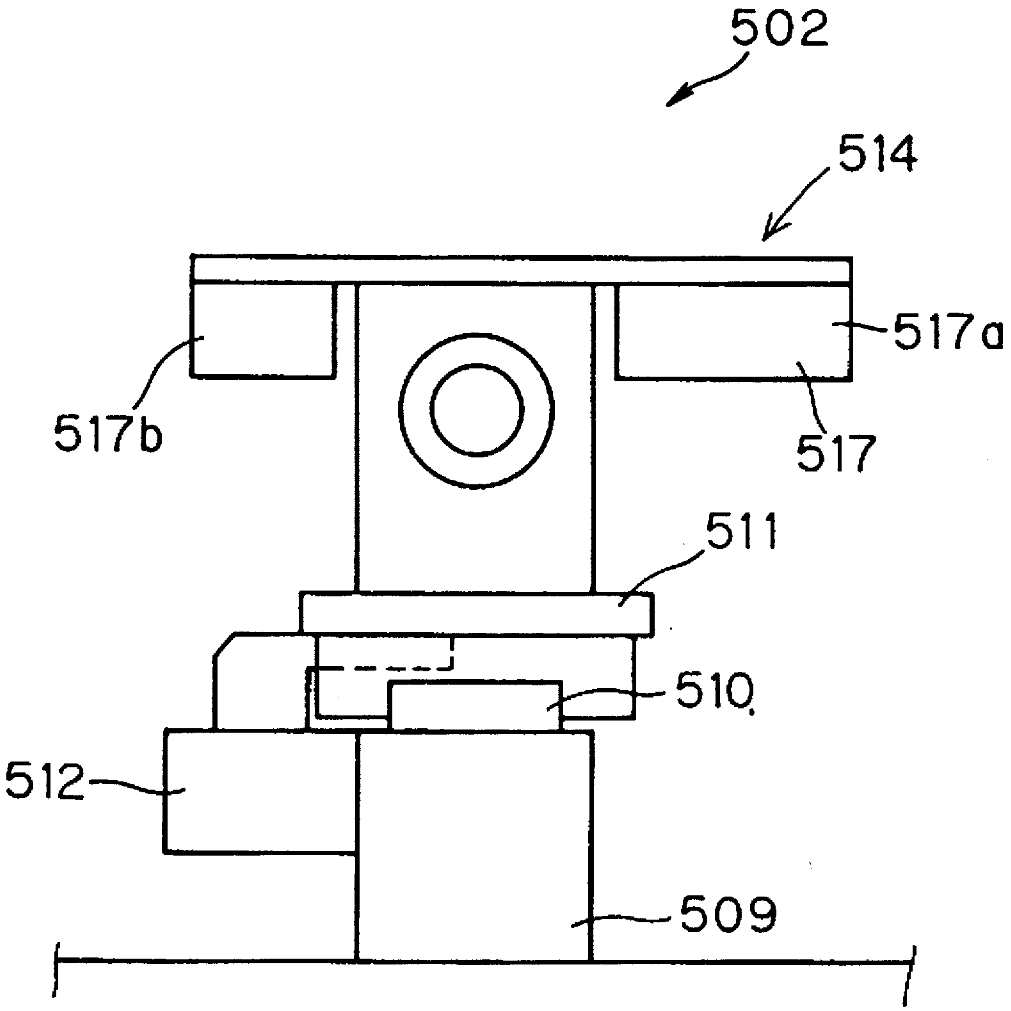
FIG. 33 is a left side view of a retraction length check mechanism in FIG. 32.
Figure 34:
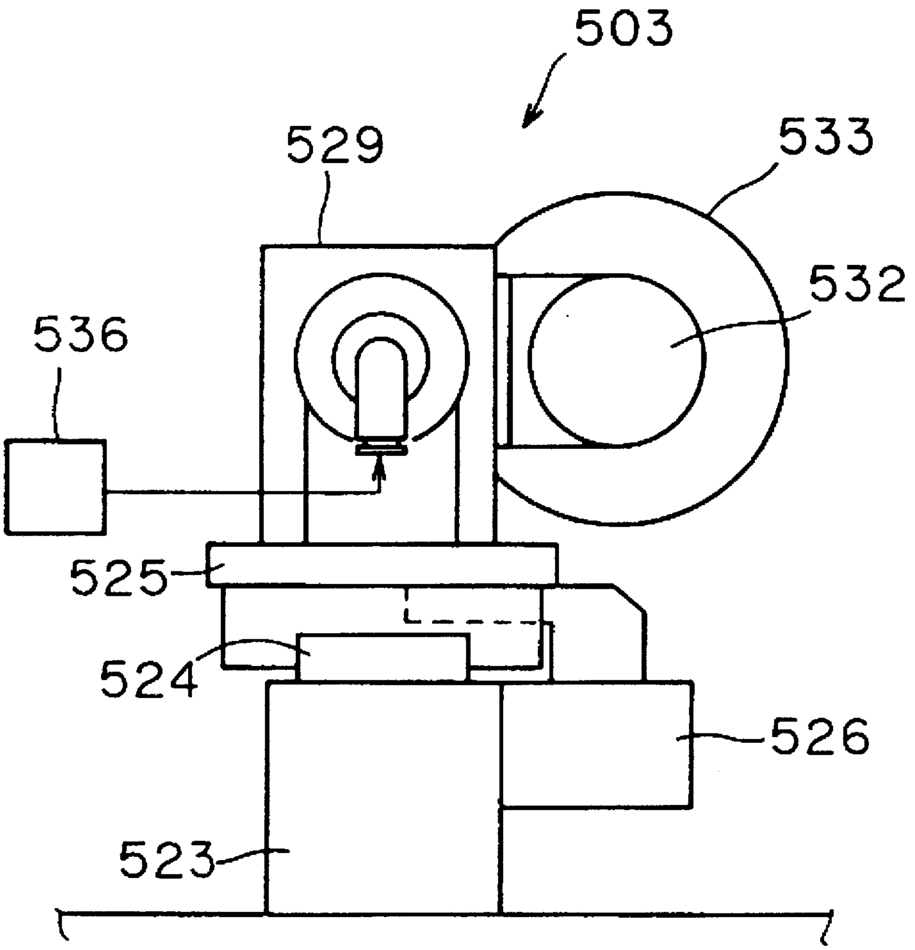
FIG. 34 is a right side view of a talc coating mechanism in FIG. 32.

As illustrated in FIGS. 31 and 32, the bushing retaining mechanism 501 includes a base 505, a bushing receiving tool 506 formed on the base 505 and made of a synthetic resin such as MC nylon. An upwardly open retaining groove 507 corresponding to the joint bushing 1 is formed in the upper surface of the bushing receiving tool 506 to hold the joint bushing 1 in a horizontal position such that the longitudinal axis of the joint bushing 1 extends in the horizontal direction.

The terminal insertion condition check and talc coating portion 500 further comprises a suitable detector such as a sensor for detecting the joint bushing 1 held in the retaining groove 507 in the bushing receiving tool 506.

As shown in FIGS. 31 through 33, 35, and 36, the retraction length check mechanism 502 includes a base 509, a guide rail 510 formed on the base 509 and extending in the axial direction of the joint bushing 1 held by the bushing receiving tool 506, and a slide element 511 slidably mounted along the guide rail 510.

An operating cylinder 512 including an air cylinder is mounted on one side of the base 509. A piston shaft of the operating cylinder 512 and the slide element 511 are cooperatively coupled to each other through a free joint 513.

Formed on the slide element 511 is a retraction length check portion 514 which includes a retraction length measuring rod 515 located in coaxially aligned relation with the joint bushing 1 held by the bushing receiving tool 506, a check float element 516 as a check element fitted on the retraction length measuring rod 515 for movement in the axial direction thereof and made of a synthetic resin such as MC nylon, and a photosensor 517 as a retraction length detector including a light emitter 517*a* and a light receiver 517*b* for detecting the position of the check float element 516 relative to the retraction length measuring rod 515.

Upon actuation of the operating cylinder 512, the retraction length measuring rod 515 is moved toward the joint bushing 1 held by the bushing receiving tool 506 to releasably contact the edge of the terminal element 2 in the joint bushing 1.

The retraction length measuring rod 515 which is made of a conductive material such a metal rod is mounted to an insulating material mounted on the slide element 511, and is electrically connected to a continuity detecting portion 518.

An overhanging restrictive flange portion 519 for restricting the movement of the check float element 516 in the axial direction is formed adjacent the end of the retraction length measuring rod 515 which is closer to the terminal element 2. A coil spring 520 for elastically urging the check float element 516 toward the restrictive flange portion 519 is mounted over the retraction length measuring rod 515. The elastic urging force of the coil spring 520 brings the check float element 516 into elastic contact with the restrictive flange portion 519.

When the retraction length measuring rod 515 contacts the edge of the terminal element 2 in the joint bushing 1, the check float element 516 releasably contacts the end surface of the joint bushing 1 to move in the axial direction of the retraction length measuring rod 515 against the elastic urging force of the coil spring 520.

Figure 35:
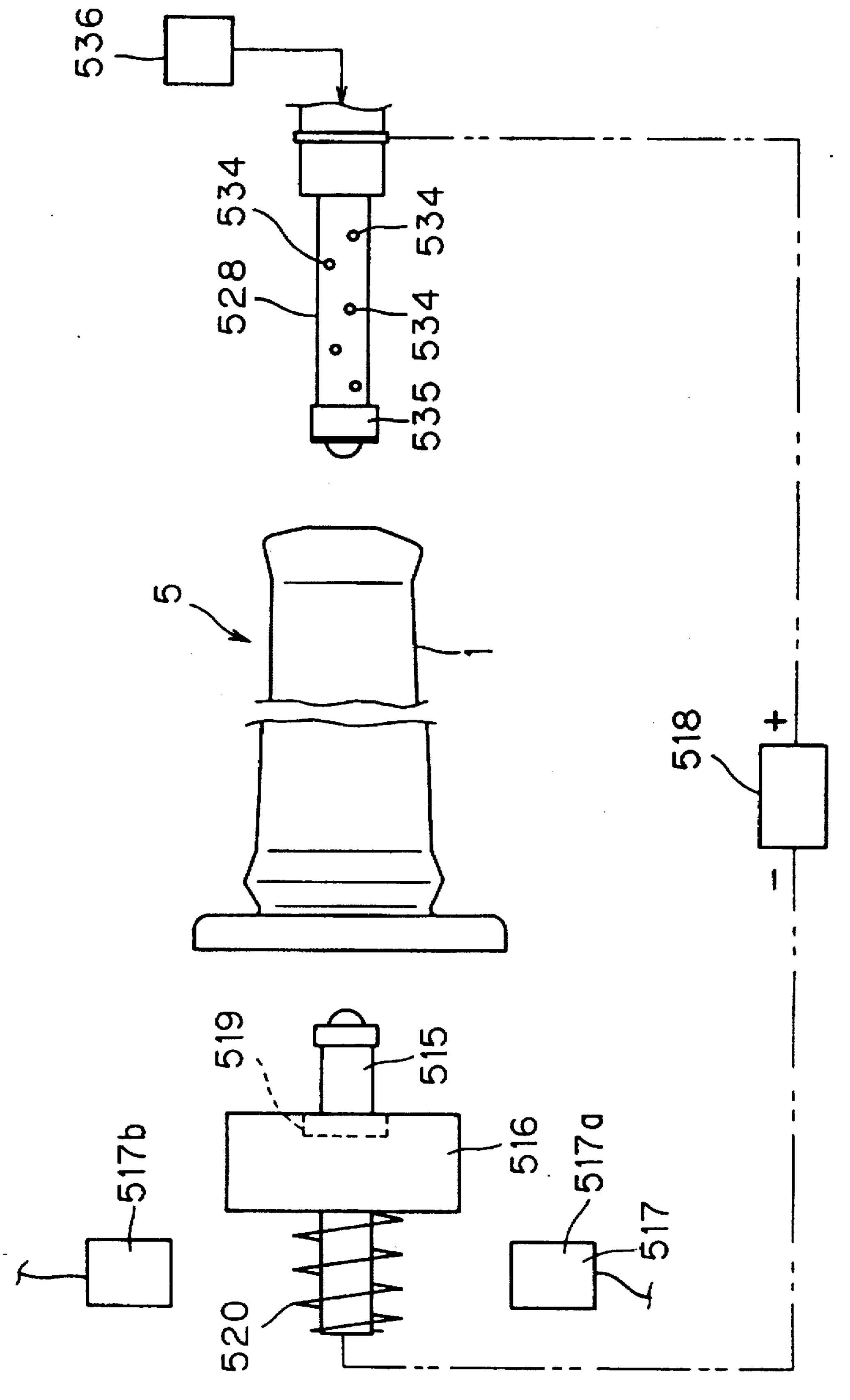
FIGS. 35 and 36 illustrate the operation of major portions of the retraction length check mechanism and the talc coating mechanism.
Figure 36:
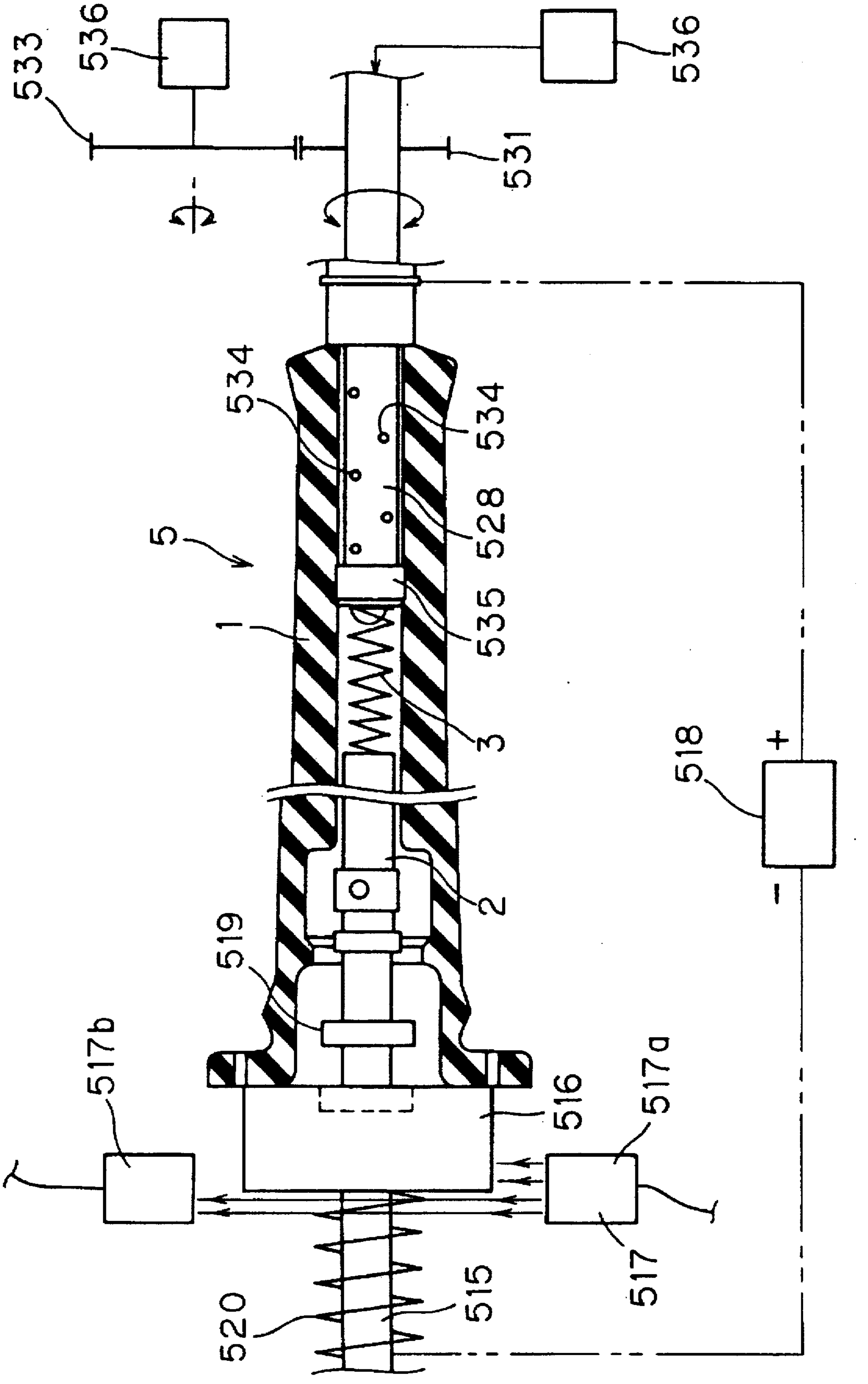
Figure 37:
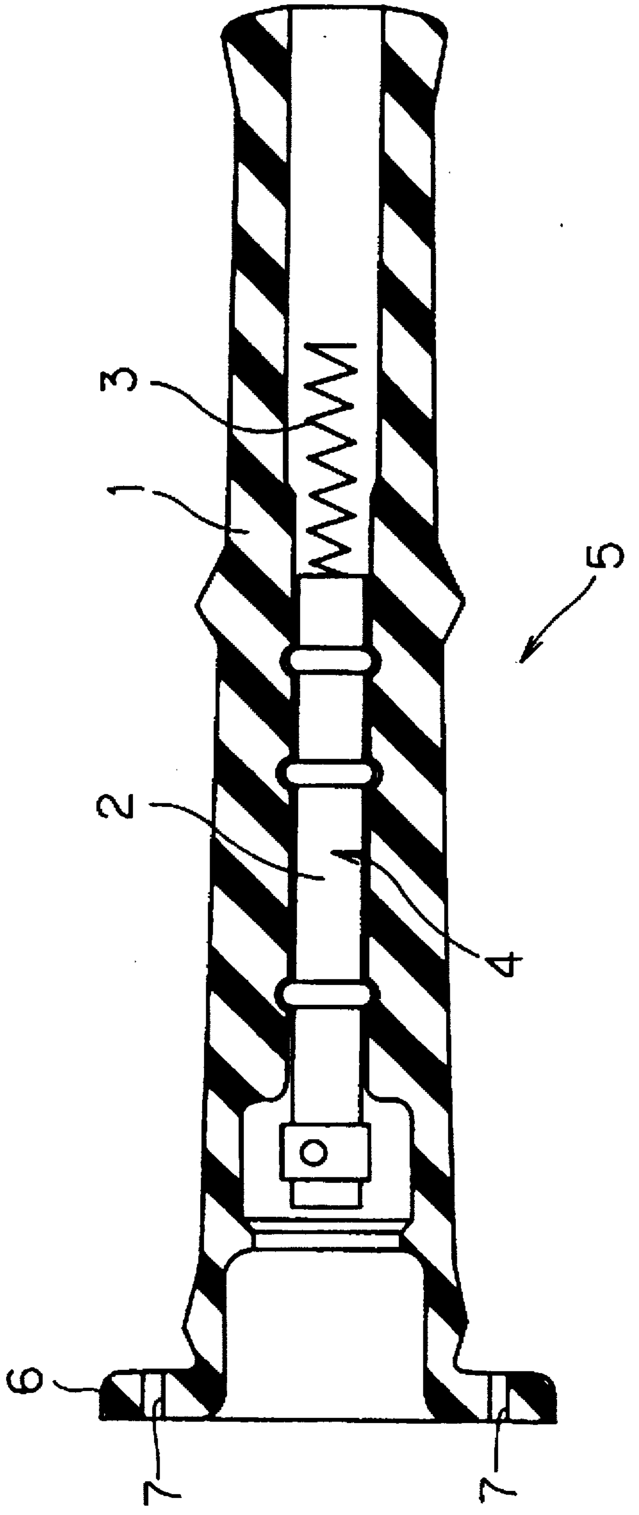
FIG. 37 is a cross sectional view of a plug joint.
Figure 38:
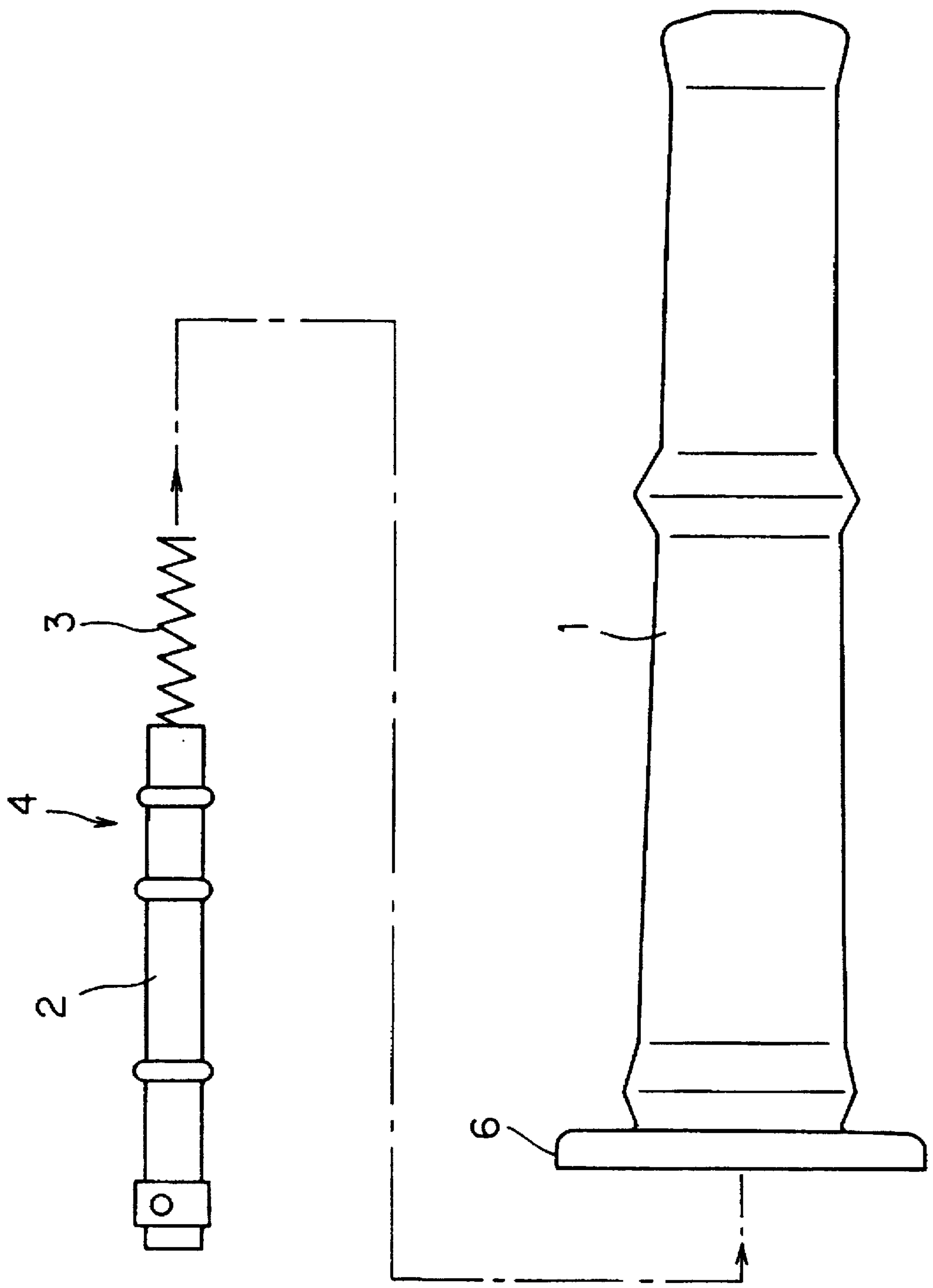
FIGS. 38 and 39 illustrate a conventional terminal insertion process.
Figure 39:
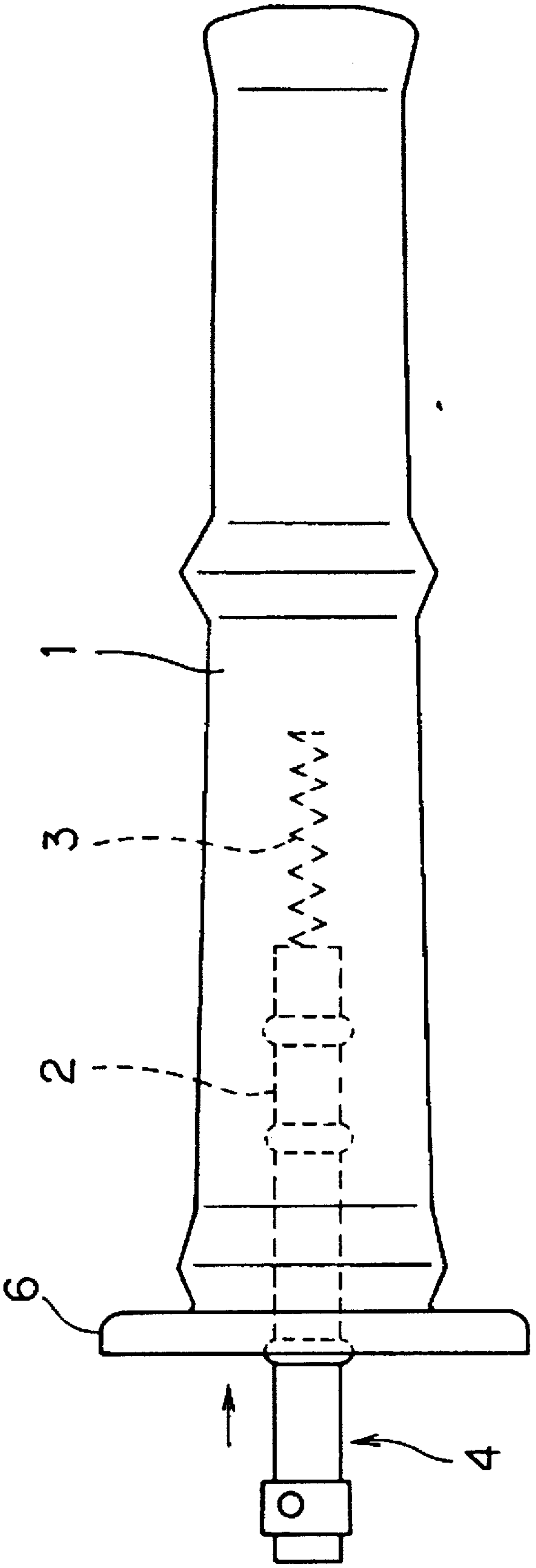
Figure 40:
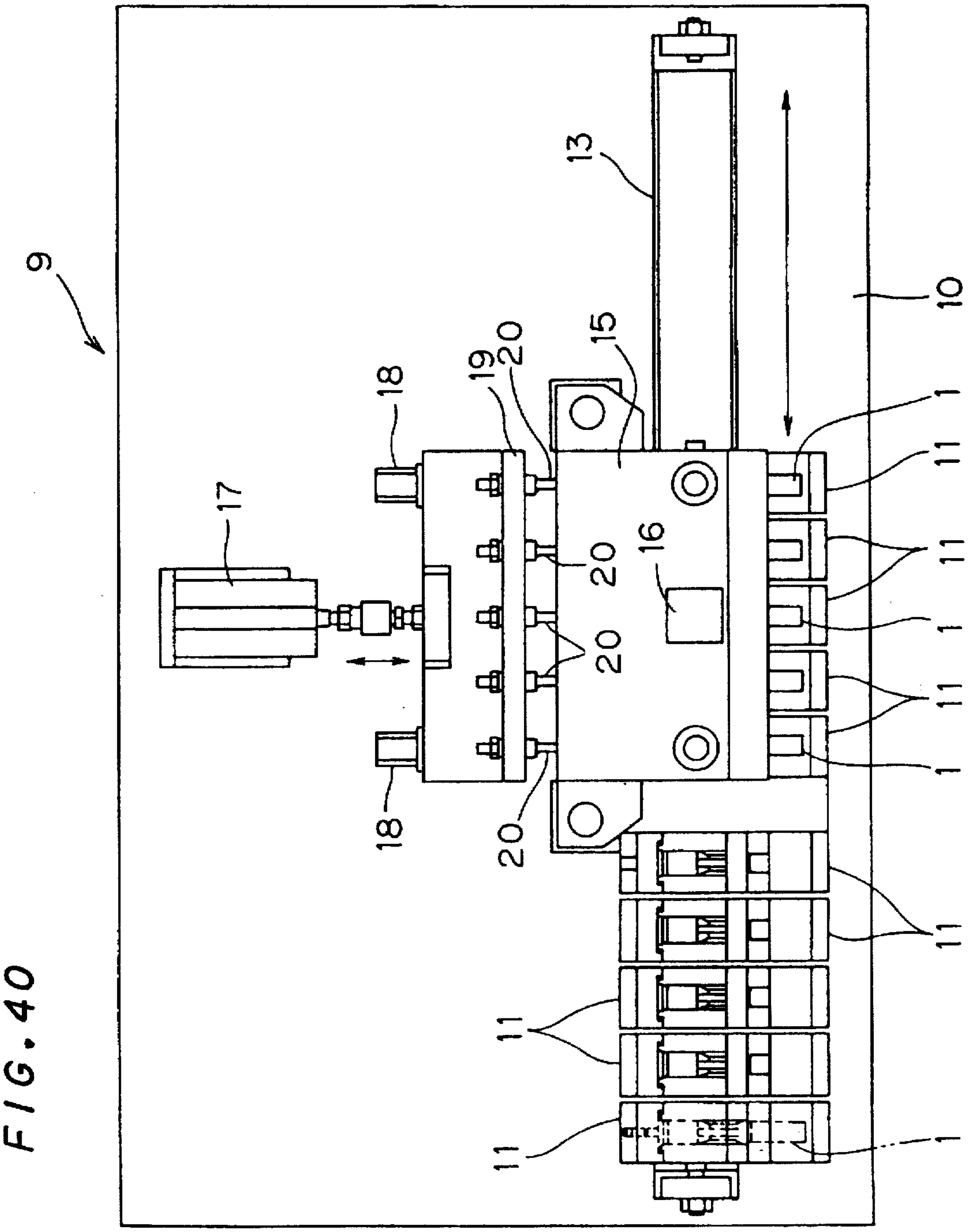
FIG. 40 is a top plan view of a conventional terminal inserting machine.
Figure 41:
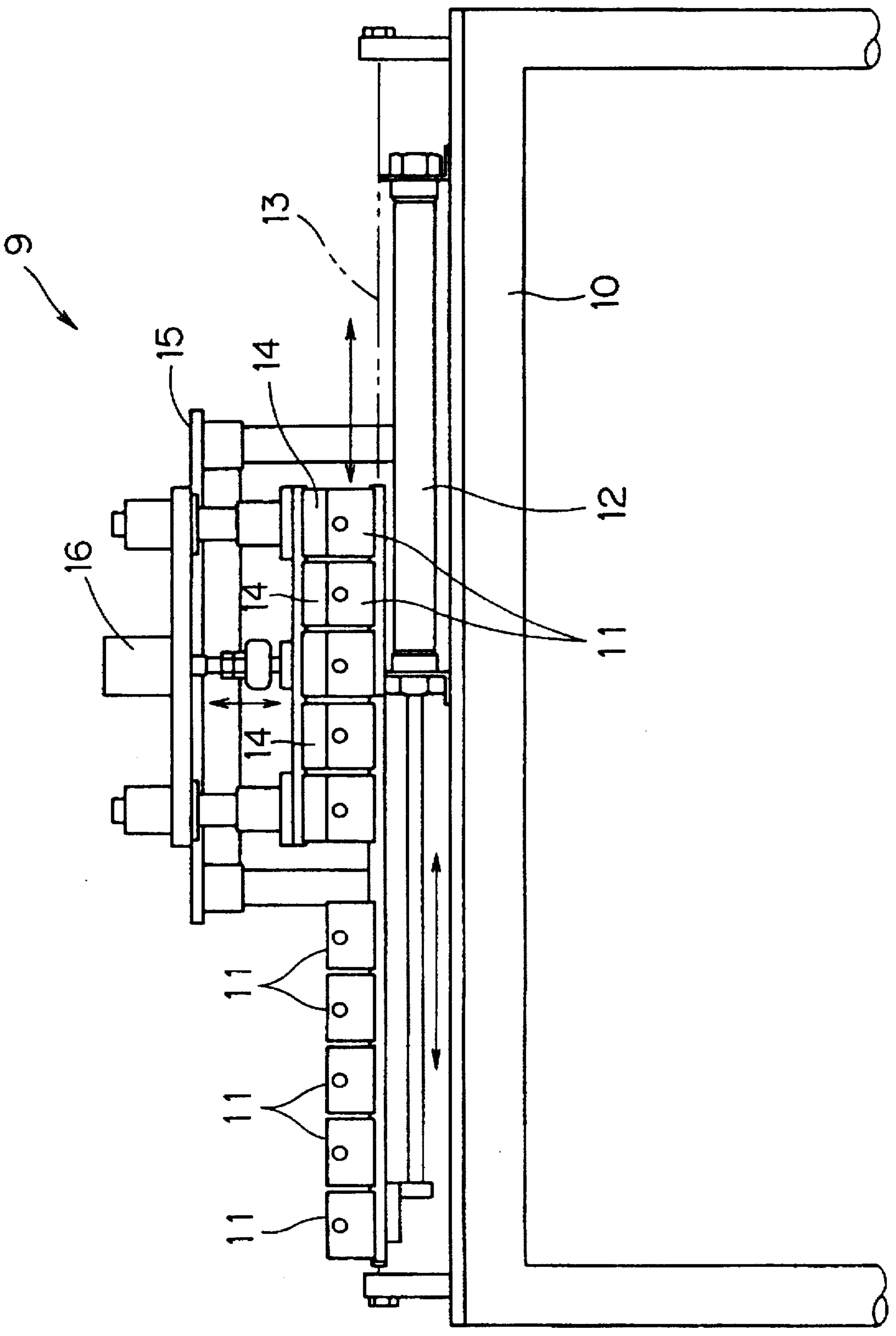
FIG. 41 is a front view of FIG. 40.
Figure 42:
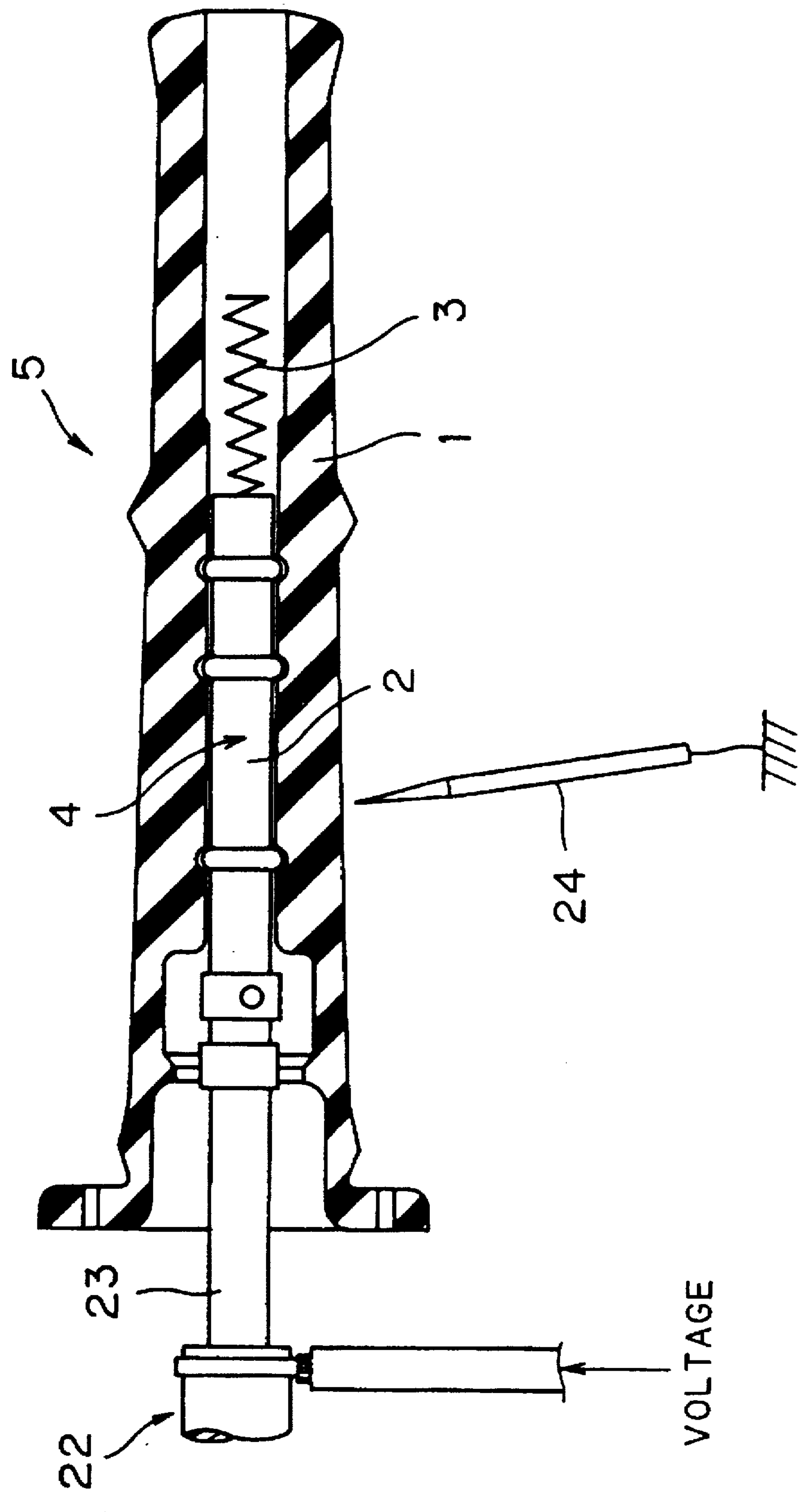
FIG. 42 illustrates a conventional leak check.
Figure 43:
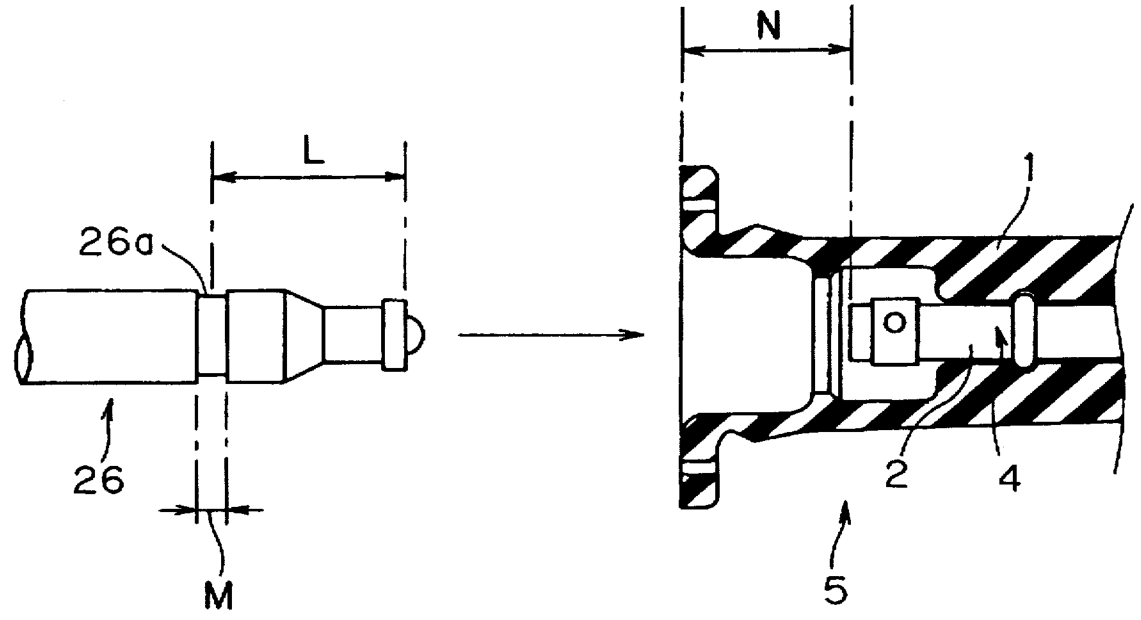
FIGS. 43 and 44 illustrate a conventional retraction length check.
Figure 44:
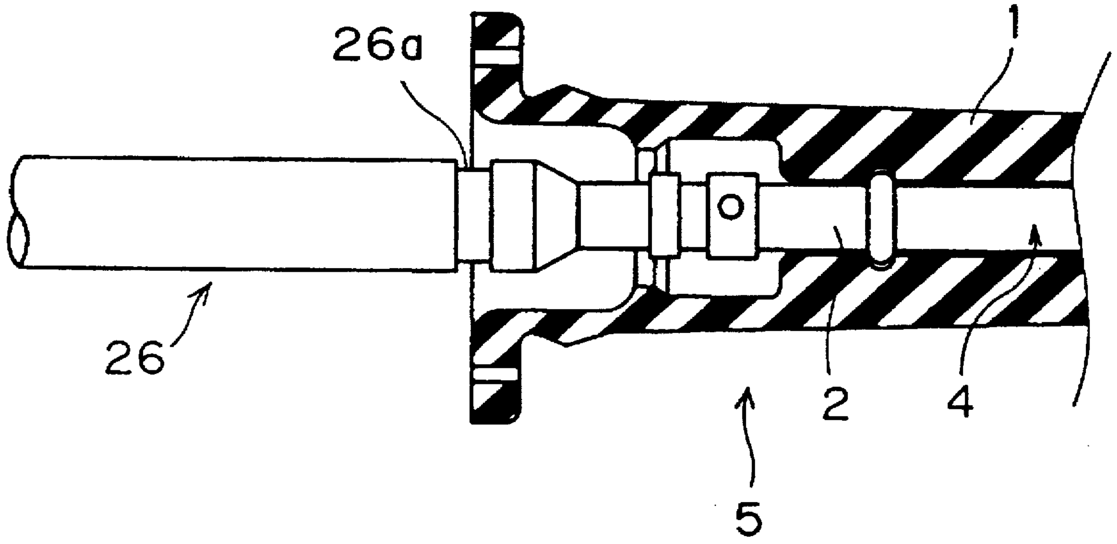

As illustrated in FIGS. 35 and 36, the light emitter 517*a* and light receiver 517*b* of the photosensor 517 are opposed on both sides of the retraction length measuring rod 515 to detect the check float element 516 moved in the axial direction of the retraction length measuring rod 515. More specifically, the photosensor 517 detects the position of the check float element 516 relative to the retraction length measuring rod 515 by detecting the width of light intercepted by the check float element 516. The photosensor employs a sensor which can set the allowable range in thousandths of a millimeter.

As illustrated in FIGS. 31, 32, and 34 through 36, the talc coating mechanism 503 comprises a base 523, a guide rail 524 formed on the base 523 and extending in the axial direction of the joint bushing 1 held by the bushing receiving tool 506, and a slide element 525 slidably mounted along the guide rail 524.

An operating cylinder 526 including an air cylinder is mounted on one side of the base 523. A piston shaft of the operating cylinder 526 and the slide element 525 are cooperatively coupled to each other through a free joint 527.

A support mechanism 529 is formed on the slide element 525 and supports a talc coating rod 528 serving as a tubular coating rod in coaxially aligned relation with the joint bushing 1 held by the bushing receiving tool 506. More specifically, the talc coating rod 528 is formed of a conductive material such as a metal pipe and supported by the support mechanism 529, with an insulating material therebetween, for relative rotation about its axis and for movement of a predetermined distance in the axial direction.

The talc coating rod 528 is electrically connected to the continuity detecting portion 518. As illustrated in FIG. 32, the talc coating rod 528 is elastically urged by a coil spring 530 so as to move toward the joint bushing 1.

A driven gear 531 is fixed on a longitudinally intermediate portion of the talc coating rod 528, and a driving gear 533 in meshing engagement with the driven gear 531 is fixed on a rotating shaft of a rotary actuator 532 including an air cylinder and mounted on one side of the support mechanism 529.

The rotary actuator 532 is actuated to rotate the talc coating rod 528 about its axis by a predetermined angle in the normal and reverse directions through the gears 531 and 533. The rotary actuator 532, driven gear 531 and driving gear 533 form a talc coating rod rotating mechanism. For example, the talc coating rod 528 may be rotated about 300° in this preferred embodiment.

The talc coating rod 528 to be inserted in the joint bushing 1 has a closed forward end surface. The peripheral surface of a portion of the talc coating rod 528 which is to be inserted has a plurality of suitably spaced talc emitting holes 534 formed therein as shown in FIGS. 35 and 36.

An annular felt element 535 is mounted on the outer peripheral surface of the forward end portion of the talc coating rod 528 with an adhesive and the like. The felt element 535 is adapted for slidable contact with the inner peripheral surface of the joint bushing 1 when the talc coating rod 528 is inserted into and removed from the joint bushing 1.

The talc coating rod 528 is connected to a talc pressure feed portion 536 with a pipe. A compressed air is intermittently supplied from the talc pressure feed portion 536 into the talc coating rod 528 in response to an instruction signal from the control portion 70 not shown, thereby feeding a predetermined amount of talc powder under pressure.

A flexible cover element 540 made of vinyl and the like surrounds the outer periphery of the base end of a talc emitting portion of the talc coating rod 528 in spaced apart relation to the base end as shown in phantom in FIGS. 31 and 32 to prevent talc from flying apart from the end of the joint bushing 1 into which the talc coating rod 528 is inserted as shown in FIG. 36. The cover element 540 is supported by the support mechanism 529.

The fourth joint bushing extraction and supply mechanism 720 includes the pair of openable and closable chucking mechanisms 721 (FIGS. 31 and 32) for releasably grasping the axially opposite end portions of the joint bushing 1 held by the grounded chucking elements 405 of the check bushing chucking mechanism 401.

The pair of chucking mechanisms 721 each of which is open are lowered from the initial position over the joint bushing 1 of the plug joint 5 held by the grounded chucking elements 405. Upon reaching the position of the joint bushing 1, the pair of chucking mechanisms 721 are closed to grasp the opposite end portions of the joint bushing 1, respectively.

The grounded chucking elements 405 are opened to release the grasp of the joint bushing 1. The chucking mechanisms 721 are moved upwardly and then horizontally to the position over the bushing retaining mechanism 501 located adjacent the check bushing chucking mechanism 401.

Upon reaching the position over the bushing retaining mechanism 501, the chucking mechanisms 721 are moved downwardly. As the joint bushing 1 is located in the retaining groove 507 in the bushing receiving tool 506, each of the chucking mechanisms 721 is opened and moved upwardly and then horizontally to the initial position over the check bushing chucking mechanism 401. In this manner, the plug joint 5 is fed to the bushing retaining mechanism 501.

With the chucking mechanisms 721 in the initial position, a joint bushing extraction mechanism 730 (FIG. 31) is located over the bushing retaining mechanism 501. Similar to the fourth joint bushing extraction and supply mechanism 720, the joint bushing extraction mechanism 730 comprises a pair of chucking mechanisms 731 driven in synchronism with the chucking mechanisms 721 of the fourth joint bushing extraction and supply mechanism 720 so that one joint bushing 1, or one plug joint 5, is removed from the bushing retaining mechanism 501 when another joint bushing 1 is removed from the check bushing chucking mechanism 401.

Description is given hereinafter on the control operation by the control portion 70 over the continuity check, retraction length check and talc coating in the terminal insertion condition check and talc coating portion 500.

Upon completion of the leak check of the plug joint 5 by the withstand voltage test portion 400, the fourth joint bushing extraction and supply mechanism 720 is driven to move the pair of chucking mechanism 721 downwardly. Each of the chucking mechanisms 721 is closed to grasp the joint bushing 1. Then, as the grounded chucking elements 405 are opened to release the holding of the joint busing 1, the pair of chucking mechanisms 721 are moved upwardly. In this manner, the check bushing chucking mechanism 401 extracts the plug joint 5.

The chucking mechanisms 721 are moved horizontally. Upon reaching the position over the bushing retaining mechanism 501, the chucking mechanisms 721 are stopped and moved downwardly. As the plug joint 5 is fed to the retaining groove 507 in the bushing receiving tool 506, each of the chucking mechanisms 721 is opened and returned to the initial position. In this fashion, the joint bushing 1 of the plug joint 5 is held in the predetermined horizontal position in the bushing receiving tool 506.

When the detector detects the joint bushing 1 held by the bushing retaining mechanism 501, the retraction length check mechanism 502 and talc coating mechanism 503 are driven. More specifically, the operating cylinders 512, 526 of the retraction length check mechanism 502 and talc coating mechanism 503 are actuated to advance the retraction length measuring rod 515 and talc coating rod 528 from axially opposite sides of the plug joint 5 toward the plug joint 5, respectively.

As the retraction length measuring rod 515 and talc coating rod 528 are moved the predetermined distance, the forward end of the retraction length measuring rod 515 comes in contact with the edge of the terminal element 2 of the joint bushing 1, and the forward end of the talc coating rod 528 comes in elastic contact with the edge of the coil spring 4 in the joint bushing 1 as shown in FIG. 36.

When the retraction length measuring rod 515 is inserted into the joint bushing 1, the check float element 516 comes in contact with the end surface of the joint bushing 1 to move in the axial direction of the retraction length measuring rod 515 against the elastic urging force of the coil spring 520.

In this condition, current is fed between the retraction length measuring rod 515 and the talc coating rod 528, for example, from the talc coating rod 528 through the coil spring 4 and terminal element 2 to the retraction length measuring rod 515, and the continuity detecting portion 518 checks for continuity (continuity check process). If the continuity detecting portion 518 detects the continuity, the control portion 70 determines that the coil spring 3 is not removed (acceptable). If the continuity detecting portion 518 detects no continuity, the control portion 70 determines that the coil spring 3 is removed (defective).

Upon determination as acceptable in the continuity check process, the operation proceeds to the retraction length check process. In the retraction length check process, the photosensor 517 are actuated to emit a laser light from the light emitter 517*a* to the light receiver 517*b*. A retraction length N of the terminal element 2 is detected by detecting the width of light intercepted by the check float element 516. The control portion 70 determines the result of retraction length check as acceptable or defective depending upon whether or not the retraction length N falls within an allowable range.

Upon determination as acceptable in the retraction length check process, the operation proceeds to the talc coating process. In the talc coating process, a predetermined amount of talc under pressure is fed into the talc coating rod 528 from the talc pressure feed portion 536 by using the compressed air in response to the instruction signal from the control portion 70. The rotary actuator 532 is actuated in synchronism with the pressure feed of the predetermined amount of talc to rotate the talc coating rod 528 in its axial direction through the gears 533 and 531.

Thus, with the talc coating rod 528 rotating, talc is emitted from the talc emitting holes 534 toward the inner peripheral surface of the joint bushing 1.

The operating cylinders 512 and 526 are actuated to remove the retraction length measuring rod 515 and talc coating rod 528 from the joint bushing 1. During the removal, the felt element 535 mounted on the outer peripheral surface of the forward end portion of the talc coating rod 528 slidably moves along the inner peripheral surface of the joint bushing 1 to flatten the talc applied to the inner peripheral surface of the joint bushing 1.

The control portion 70 is adapted to dispense with the talc coating process when the results of the leak check, continuity check, and retraction length check processes are determined as defective in the withstand voltage test portion 400.

Upon completion of the talc coating process (after an elapse of time required for the talc coating process if the talc coating process is dispensed with), the joint bushing extraction mechanism 730 is driven to move the pair of chucking mechanisms 731 downwardly. Each of the chucking mechanisms 731 is closed to grasp the joint bushing 1 of the plug joint 5. Then, the chucking mechanisms 731 are moved upwardly. In this fashion, the plug joint 5 on which the respective checks and talc coating have been performed is extracted from the bushing retaining mechanism 501.

The pair of chucking mechanisms 731 are moved horizontally. If the results of the respective checks are determined as acceptable by the control portion 70, the plug joint 5 is transported onto a product guide chute 61, and each of the chucking mechanisms 731 is opened in this position. The plug joint 5 is dropped onto the product guide chute 61 and guided to a predetermined position by the product guide chute 61.

On the other hand, if the results of the respective checks are determined as defective by the control portion 70, the plug joint 5 is transported onto the defective discharge opening portion 60, and each of the chucking mechanisms 731 is opened in this position. The plug joint 5 is dropped into and collected by a collecting bin below the defective discharge opening portion 60.

The terminal insertion condition check and talc coating portion 500 sequentially performs the continuity check, retraction length check, and talc coating while the withstand voltage test portion 400 performs the leak check. The joint bushing extraction mechanism 730 extracts one plug joint 5 from the bushing retaining mechanism 501 while the fourth joint bushing extraction and supply mechanism 720 extracts another plug joint 5 from the check bushing chucking mechanism 401. The third joint bushing extraction and supply mechanism 710 feeds one plug joint 5 to the check bushing chucking mechanism 401 while the fourth joint bushing extraction and supply mechanism 720 feeds another plug joint 5 to the bushing retaining mechanism 501.

The first joint bushing extraction and supply mechanism 600, the second joint bushing extraction and supply mechanism 701, the third joint bushing extraction and supply mechanism 710, the fourth joint bushing extraction and supply mechanism 720, and the joint bushing extraction mechanism 730 are controlled to operate in synchronism with each other.

The joint bushing conveying mechanism 700 is formed by the second joint bushing extraction and supply mechanism 701 for transporting the joint bushing 1 from the terminal temporary insertion portion 200 to the terminal main insertion portion 300, the third joint bushing extraction and supply mechanism 710 for transporting the joint bushing 1 from the terminal main insertion portion 300 to the withstand voltage test portion 400, the fourth joint bushing extraction and supply mechanism 720 for transporting the joint bushing 1 from the withstand voltage test portion 40 to the terminal insertion condition check and talc coating portion 500, and the joint bushing extraction mechanism 730 for transporting the joint bushing 1 from the terminal insertion condition check and talc coating portion 500 to the defective discharge opening portion 60 and the product guide chute 61.

The preferred embodiment according to the present invention is constructed as above described. The joint bushing feed portion 100 automatically feeds the joint bushings 1 at a predetermined speed from the joint bushing supply position A to the joint bushing extraction position B, allowing the supply of the joint bushings 1 at a stable pace to the next process, that is, the terminal temporary insertion portion 200. The length measuring mechanism 111 and air vent hole detecting mechanism 112 automatically measure the length of the joint bushing 1 and check the air vent holes 7, respectively, providing a stable check level.

The axial length of the joint bushing 1 is detected by detecting the height of the top end of the joint bushing placed on and held by the bushing retaining element 106. This allows the detection of the axial length of the joint bushing 1 which is transported to the joint bushing check station 110, simplifying the length measuring structure.

The rotating portion 120 rotates the joint bushing 1 lifted by the lifting portion 119, permitting the photosensors 128 of the air vent hole detecting portions 121 to check the air vent holes 7 in the sealing collar portion 6 throughout the circumference of the sealing collar portion 6.

When the air vent hole detecting portions 121 are moved toward the sealing collar portion 6, the joint bushing 1 is rotated about its axis while being guided in the predetermined position by the guide rollers 129 in contact with the outer peripheral surface of the joint bushing 1. This provides for stable rotation of the joint bushing 1 and satisfactory check of the air vent holes 7.

The structure for feeding the joint bushings 1 in the vertical position reduces the width of the endless belt element 105, space for installation, and the size if the joint bushing feed portion 100.

In the terminal temporary insertion portion 200 and terminal main insertion portion 300, the terminal alignment rod 237 enters the terminal element 2 to reach the coil spring 3 in the temporary insertion process of the joint terminal 4 to restrict the curve of the coil spring 3 at the free end. This effectively prevents the coil spring 3 lodging in the joint bushing 1 from being removed from the terminal element 2 during the temporary insertion of the joint terminal 4 and allows smooth temporary insertion of the joint terminal 4 into the joint bushing.

Automatic temporary insertion process mid main insertion process of the joint terminal 4 in the joint bushing 1 eliminate the need for an operator to care much about the removal of the coil spring 3 and to manually push the joint terminal 4 in the temporary insertion, alleviating operator's work. In this manner, the insertion of the joint terminal 4 is facilitated, and the operator is less fatigued.

Automatic feed of the joint bushings 1 to the temporary insertion bushing chucking mechanism 201 and main insertion bushing chucking mechanism 301 stabilizes the feed position of the joint bushings 1 in the temporary insertion bushing chucking mechanism 201 and main insertion bushing chucking mechanism 301. When the terminal main insertion mechanism 302 forces the joint terminal 4 into the joint bushing 1, the insertion position of the joint terminal 4 relative to the joint bushing 1 is stabilized, and a stable product quality is provided.

When the joint terminal 4 receiving the terminal alignment rod 237 therein is temporarily inserted into the joint bushing 1, the terminal chucking mechanism 202 grasping the joint terminal 4 is integrally moved, further stabilizing the position of the joint terminal 4 during the temporary insertion.

The terminal main insertion mechanism 302 comprises the terminal insertion tool 313 provided with the distance detector 314 for detecting the distance between the distance detector 314 and the collar portion end surface 1*a* to stop the insertion of the joint terminal 4 by the terminal insertion tool 313 when the distance reaches the set value. The amount of insertion of the joint terminal 4 by the terminal insertion tool 313 is readily controlled. The insertion position of the joint terminal 4 is readily controlled by changing the set value of the distance between the distance detector 314 and the collar portion end surface 1*a*.

For various types of joint bushings 1 and joint terminals 4 to be used, the terminal alignment rods 237 and terminal insertion tools 313 corresponding to various types may be prepared and suitably-replaced. The distance between the distance detector 314 and the collar portion end surface 1*a* may be set as desired by the control portion 700.

The withstand voltage test portion 400 is adapted to automatically supply the plug joint 5 and to electrically automatically determine the presence/absence of leak from the joint bushing 1, stabilizing the check level and pace. The operator need not perform the conventional manual check.

The axially intermediate portion of the joint bushing 1 is held by the grounded chucking elements 4, effectively preventing the detection of so-called creeping leak, or current flow from the inner peripheral surface of the joint bushing 1 through the opposite ends thereof along the outer peripheral surface thereof. Misjudgment by the leak detector 409 is effectively prevented.

The leak detector 409 is adapted such that the current amplifier 411 amplifies the current flowing from the grounded chucking elements 405 to the ground 410, the variable resistor 412 converts the amplified current to the voltage, and the indicator 413 indicates the voltage, thereby satisfactorily detecting a slight leak.

The insulating cover element 427 surrounding the outer periphery of the voltage applying mechanism 402 effectively isolates the high-voltage portion.

The terminal insertion condition check and talc coating portion 500 is automatically supplied with the plug joints 5 and automatically performs the check of the plug joint 5 for removal of the coil spring 3, the check of the retraction length N of the terminal element 2, and the coating of a predetermined amount of talc. In this fashion, since the respective operations are automatically carried out without dependence upon operator's technical skills, the joint terminal insertion condition check and talc coating are performed at a stable pace. The check level and the amount of applied talc are stabilized, and reliability is improved.

The talc coating rod 528 is rotated about its axis in synchronism with the feed of talc under pressure into the talc coating rod 528. Thus, talc emitted from the talc emitting holes 534 of the talc coating rod 528 to the inner peripheral surface of the joint bushing 1 is dispersed more uniformly, achieving uniform talc coating.

The felt element 535 on the forward end of the talc coating rod 528 slidably moves along the inner peripheral surface of the joint bushing 1 when the talc coating rod 528 is removed from the joint bushing 1. The sliding of the felt element 535 flattens the talc applied to the inner peripheral surface of the joint bushing 1 to accomplish more uniform talc coating.

The differences in retraction length N from the standard retraction length L are indicated with plus and minus. Thus, the variations in retraction length N are easy-to-read, and data management using a personal computer is facilitated. The use of the photosensor 517 which can set the allowable range in thousands of a millimeter may readily meet the requirements if the retraction length N is set and changed and if variations in fabrication error are caused depending upon the products.

The cover element 540 effectively prevents talc powder from flying off when talc is emitted, improving the work environment.

In this manner, the automatic assembly of the joint terminal 4 and joint bushing 1 and automatic talc coating provide for efficient assembly of the plug joint 5 at a stable pace and a stable check level with improved reliability.

The conventional method requires five operators in a series of assembly processes. However, the automatic assembly processes of this preferred embodiment require two operators: one for supplying the joint bushings 1 to the joint bushing supply position A of the joint bushing feed portion 100, and the other for supplying the joint terminals 4 to the terminal receiving and guiding portion 208 of the terminal supply mechanism 203. This reduces the number of operators and the production costs.

The joint bushing feed portion 100 is provided in linear form in the predetermined direction, and the terminal temporary insertion portion 200, terminal main insertion portion 300, withstand voltage test portion 400, terminal insertion condition check and talc coating portion 500 are arranged in side-by-side relation from the joint bushing extraction position B toward the joint bushing supply position A. Such arrangements provide for effective use of the space for arrangements, reduction in size of the whole plug joint assembling apparatus 50, and reduction in space for installation.

The first joint bushing extraction and supply mechanism 600, the second joint bushing extraction and supply mechanism 701, the third joint bushing extraction and supply mechanism 710, the fourth joint bushing extraction and supply mechanism 720, and the joint bushing extraction mechanism 730 are operated in synchronism with each other, efficiently assembling the plug joints 5.

The control by the control portion 70 is exercised such that the talc coating is dispensed with if any one of the results of the leak check, retraction length check and continuity check is determined as defective. This effectively prevents talc coating from being wasted and readily determines the acceptance or rejection of the assembled plug joint 5 depending on the presence/absence of talc.

If the control portion 70 determines any one of the results of the leak check, retraction length check and continuity check as defective, the joint bushing extraction mechanism 730 transports the joint bushing 1 to the defective discharge opening portion 60. If the control portion 70 determines all of the results of the leak check, retraction length check and continuity check as acceptable, the joint bushing extraction mechanism 730 transports the joint bushing 1 to the product guide chute 61. The plug joints 5 are automatically classified into the acceptable products and defectives. This improves operation efficiency.

The control by the control portion 70 may be exercised such that the subsequent process is dispensed with if any one of the results of the leak check, continuity check and retraction length check is determined as defective.

While the invention has been described in detail, the foregoing description is in all aspects illustrative and not restrictive. It is understood that numerous other modifications and variations can be devised without departing from the scope of the invention.

We claim:

1. A plug joint assembling apparatus for inserting a joint terminal into an insulative tubular joint bushing to assemble a plug joint, said joint bushing including at its one end a sealing collar portion having an air vent hole, said joint terminal including a tubular terminal element and a terminal spring connected to one end of said terminal element and serving as a coil spring, said plug joint assembling apparatus comprising:

- a joint bushing feed portion for feeding said joint bushing from a first position to a second position;
- a terminal temporary insertion portion for temporarily inserting a part of said joint terminal into said joint bushing;
- a terminal main insertion portion for inserting said joint terminal into a set position in said joint bushing;
- a withstand voltage test portion for checking said joint bushing receiving said joint terminal therein for leak;
- a terminal insertion condition check and talc coating portion for performing a retraction length check on said joint terminal received in said joint bushing, performing a continuity check between said terminal element and terminal spring of said joint terminal, and applying talc to an inner peripheral surface of said joint bushing around said terminal spring;
- a first joint bushing extraction and supply mechanism for removing said joint bushing from said second position in said joint bushing feed portion to feed said joint bushing to said terminal temporary insertion portion;
- a second joint bushing extraction and supply mechanism for removing said joint bushing from said terminal temporary insertion portion to feed said joint bushing to said terminal main insertion portion;
- a third joint bushing extraction and supply mechanism for removing said joint bushing from said terminal main insertion portion to feed said joint bushing to said withstand voltage test portion;

a fourth joint bushing extraction and supply mechanism for removing said joint bushing from said withstand voltage test portion to feed said joint bushing to said terminal insertion condition check and talc coating portion;

a joint bushing extraction mechanism for removing and feeding said joint bushing from said terminal insertion condition check and talc coating portion;

a length measuring mechanism for detecting the axial length of said joint bushing; and an air vent hole detecting mechanism for detecting said air vent hole, said length measuring mechanism and said air vent hole detecting mechanism being located at a given position in a joint bushing feed path extending from said first position to said second position in said joint bushing feed portion.

2. The plug joint assembling apparatus of claim 1, wherein said joint bushing feed portion is provided in linear form in a predetermined direction, wherein said terminal temporary insertion portion, said terminal main insertion portion, said withstand voltage test portion and said terminal insertion condition check and talc coating portion are arranged sequentially in side-by-side relation in a direction from said second position toward said first position.

3. The plug joint assembling apparatus of claim 1, wherein said first joint bushing extraction and supply mechanism, said second joint bushing extraction and supply mechanism, said third joint bushing extraction and supply mechanism, said fourth joint bushing extraction and supply mechanism, and said joint bushing extraction mechanism are operated in synchronism with each other.

4. The plug joint assembling apparatus of claim 1, further comprising:

a control portion for exercising control so that said talc coating is dispensed with when any one of the results of said leak check, said retraction length check and said continuity check is determined as defective.

5. The plug joint assembling apparatus of claim 4, further comprising:

a defective take-out portion for transporting a defective, and a product take-out portion for transporting a acceptable product, wherein said control portion exercises control so that said joint bushing extraction mechanism transports said joint bushing to said defective take-out portion when any one of the results of said leak check, said retraction length check and said continuity check is determined as defective, and so that said joint bushing extraction mechanism transports said joint bushing to said product take-out portion when all of the results of said leak check, said retraction length check and said continuity check are determined as acceptable.

6. The plug joint assembling apparatus of claim 1, wherein said terminal insertion condition check and talc coating portion includes a talc coating rod having a peripheral surface formed with talc emitting holes for applying talc to the inner peripheral surface of said joint bushing, and a cover element for covering said talc coating rod.

7. The plug joint assembling apparatus of claim 1, wherein said joint bushing feed portion includes:

an endless belt element movable around in a predetermined direction for feeding said joint bushing from said first position to said second position; and a plurality of bushing retaining elements mounted on an outer peripheral surface of said endless belt element in predetermined spaced relation in said predetermined direction, each of said bushing retaining elements having a retentive shaft portion to be inserted in said joint bushing for holding said joint bushing in a vertical position, with said sealing collar portion located downside, said plug joint assembling apparatus further comprising:

a joint bushing check station provided at a given position in said joint bushing feed path, said joint bushing check station including said length measuring mechanism and said air vent hole detecting mechanism.

8. The plug joint assembling apparatus of claim 7, wherein said length measuring mechanism includes a height detector for detecting the height of an upper end of said joint bushing placed on and held by each of said bushing retaining elements to detect the axial length of said joint bushing.

9. The plug joint assembling apparatus of claim 7, wherein said air vent hole detecting mechanism includes:

a lifting portion for grasping an upper end portion of said joint bushing in a position at said joint bushing check station to lift said joint bushing upwardly;

an air vent hole detecting portion movable toward and away from said sealing collar portion of said joint bushing lifted by said lifting portion; and a rotating portion for rotating said joint bushing lifted by said lifting portion about its axis, said air vent hole detecting portion having a hole detector for detecting said air vent hole.

10. The plug joint assembling apparatus of claim 9, wherein said air vent hole detecting portion includes a pair of air vent hole detecting portions corresponding to opposite sides of said joint bushing, each of said pair of air vent hole detecting portions including a guide roller in rolling contact with an outer peripheral surface of said joint bushing about its vertical axis when moved toward said sealing collar portion.

11. The plug joint assembling apparatus of claim 1, wherein said terminal temporary insertion portion includes:

a temporary insertion bushing chucking mechanism for releasably holding said joint bushing in a horizontal position;

a terminal chucking mechanism in coaxially aligned relation with said joint bushing held by said temporary insertion bushing chucking mechanism for releasably holding said joint terminal, with said terminal spring directed toward said joint bushing;

a terminal supply mechanism for supplying said joint terminal to said terminal chucking mechanism; and a terminal temporary insertion mechanism having an alignment rod portion to be inserted in said joint terminal held by said terminal chucking mechanism in such a manner as to enter said terminal element to reach said terminal spring, said terminal temporary insertion mechanism for temporarily inserting a part of said joint terminal into said joint bushing, with said alignment rod portion received in said joint terminal, wherein said terminal main insertion portion includes:

a main insertion bushing chucking mechanism for releasably holding said joint bushing in a horizontal position; and a terminal main insertion mechanism for forcing said temporarily inserted joint terminal into the set position in said joint bushing held by said main insertion bushing chucking mechanism, and wherein said first joint bushing extraction and supply mechanism feeds said joint bushing to said temporary insertion bushing chucking mechanism, and said second joint bushing extraction and supply mechanism removes said joint bushing from said temporary insertion bushing chucking mechanism to feed said joint bushing to said main insertion bushing chucking mechanism.

12. The plug joint assembling apparatus of claim 11, wherein said terminal chucking mechanism is moved integrally with said joint terminal when said joint terminal receiving said alignment rod portion therein is temporarily inserted into said joint bushing.

13. The plug joint assembling apparatus of claim 11, wherein said terminal main insertion mechanism includes a pushing element for pushing said joint terminal, said plug joint assembling apparatus further comprising:

a control portion for controlling the amount of insertion of said joint terminal forced by said pushing element.

14. The plug joint assembling apparatus of claim 13, wherein said control portion includes a detector mounted on said pushing element for detecting the distance from said joint bushing, and wherein said pushing element stops pushing when the distance detected by said detector reaches a set value.

15. The plug joint assembling apparatus of claim 7, wherein said terminal temporary insertion portion includes:

a temporary insertion bushing chucking mechanism for releasably holding said joint bushing in a horizontal position;

a terminal chucking mechanism in coaxially aligned relation with said joint bushing held by said temporary insertion bushing chucking mechanism for releasably holding said joint terminal in a horizontal position, with said terminal spring directed toward said joint bushing;

a terminal supply mechanism for supplying said joint terminal to said terminal chucking mechanism; and a terminal temporary insertion mechanism having an alignment rod portion to be inserted in said joint terminal held by said terminal chucking mechanism in such a manner as to enter said terminal element to reach said terminal spring, said terminal temporary insertion mechanism for temporarily inserting a part of said joint terminal into said joint bushing, with said alignment rod portion received in said joint terminal, wherein said terminal main insertion portion includes:

a main insertion bushing chucking mechanism for releasably holding said joint bushing in a horizontal position; and a terminal main insertion mechanism for forcing said temporarily inserted joint terminal into the set position in said joint bushing held by said main insertion bushing chucking mechanism, and wherein said first joint bushing extraction and supply mechanism feeds said joint bushing to said temporary insertion bushing chucking mechanism, and said second joint bushing extraction and supply mechanism removes said joint bushing from said temporary insertion bushing chucking mechanism to feed said joint bushing to said main insertion bushing chucking mechanism.

16. The plug joint assembling apparatus of claim 1, wherein said withstand voltage test portion includes:

a check bushing chucking mechanism for releasably holding an outer peripheral surface of said joint bushing in a horizontal position; and a voltage applying mechanism for applying voltage to said joint terminal in said joint bushing held by said check bushing chucking mechanism, said check bushing chucking mechanism including a pair of conductive grounded chucking elements supported by an insulating member for holding said joint bushing in a horizontal position, said voltage applying mechanism including a electrode portion for removably contacting said joint terminal in said joint bushing held by said check bushing chucking mechanism, and wherein said withstand voltage test portion further includes a leak detector for detecting current flowing in said grounded chucking elements when voltage is applied to said electrode portion in contact with said joint terminal.

17. The plug joint assembling apparatus of claim 16, wherein said pair of grounded chucking elements hold an axially intermediate portion of said joint bushing.

18. The plug joint assembling apparatus of claim 16, wherein said electrode portion is movable toward and away from said joint terminal in said joint bushing held by said check bushing chucking mechanism in its axial direction.

19. The plug joint assembling apparatus of claim 16, wherein said withstand voltage test portion further includes a ground portion for grounding said grounded chucking elements, and wherein said leak detector includes a current amplifier for amplifying current flowing from said grounded chucking elements to said ground portion, a variable resistor for converting the current amplified by said current amplifier to voltage, and an indicator for indicating the voltage converted by said variable resistor.

20. The plug joint assembling apparatus of claim 16, wherein said voltage applying mechanism includes an insulative cover element for surrounding an outer periphery of said voltage applying mechanism.

21. The plug joint assembling apparatus of claim 15, wherein said withstand voltage test portion includes:

a check bushing chucking mechanism for releasably holding an outer peripheral surface of said joint bushing in a horizontal position; and a voltage applying mechanism for applying voltage to said joint terminal in said joint bushing held by said check bushing chucking mechanism, said check bushing chucking mechanism including a pair of conductive grounded chucking elements supported by an insulating member for holding said joint bushing in a horizontal position, said voltage applying mechanism including a electrode portion for removably contacting said joint terminal in said joint bushing held by said check bushing chucking mechanism, wherein said withstand voltage test portion further includes a leak detector for detecting current flowing in said grounded chucking elements when voltage is applied to said electrode portion in contact with said joint terminal, and wherein said third joint bushing extraction and supply mechanism removes said joint bushing from said main insertion bushing chucking mechanism to feed said joint bushing to said check bushing chucking mechanism.

22. The plug joint assembling apparatus of claim 1, wherein said terminal insertion condition check and talc coating portion includes:

a bushing retaining mechanism for holding said joint bushing in a horizontal position;

a retraction length check mechanism for checking a retraction length from an edge of said terminal element to an end surface of said joint bushing receiving said joint terminal therein; and a talc coating mechanism for applying talc to the inner peripheral surface of said joint bushing receiving said joint terminal therein around said terminal spring, said retraction length check mechanism and said talc coating mechanism being opposed on both sides of said bushing retaining mechanism, said retraction length check mechanism including:

a retraction length measuring rod made of a conductive material and removably inserted into said joint bushing held by said bushing retaining mechanism for removably contacting the edge of said terminal element;

a check element axially movably fitted on and held by said retraction measuring rod and elastically urged toward the forward end of said retraction length measuring rod, said check element for releasably contacting an edge of said joint bushing when said retraction length measuring rod is inserted into said joint bushing; and a retraction length detector for detecting the position of said check element relative to said retraction length measuring rod in contact with the edge of said terminal element, said talc coating mechanism including:

a talc coating rod made of a tubular conductive material and removably inserted into said joint bushing held by said bushing retaining mechanism for releasable elastic contact with an edge of said terminal spring; and a talc pressure feed portion for feeding a predetermined amount of talc under pressure into said talc coating rod, said talc coating rod having a peripheral surface formed with talc emitting holes for emitting talc, said terminal insertion condition check and talc coating portion further includes a continuity detecting portion for detecting continuity between said retraction length measuring rod in contact with said terminal element and said talc coating rod in elastic contact with said terminal spring.

23. The plug joint assembling apparatus of claim 22, wherein said terminal insertion condition check and talc coating portion further includes a talc coating rod rotating mechanism for rotating said talc coating rod about its axis in synchronism with pressure feed of talc into said talc coating rod.

24. The plug joint assembling apparatus of claim 23, wherein said talc coating rod has a felt element mounted on an outer peripheral surface of a forward end portion thereof for slidable contact with the inner peripheral surface of said joint bushing.

25. The plug joint assembling apparatus of claim 22, further comprising:

a control portion for sequentially performing the continuity check by said continuity detecting portion, the retraction length check by said retraction length check mechanism, and the talc coating by said talc coating mechanism.

26. The plug joint assembling apparatus of claim 21, wherein said terminal insertion condition check and talc coating portion includes:

a bushing retaining mechanism for holding said joint bushing in a horizontal position;

a retraction length check mechanism for checking a retraction length from an edge of said terminal element to an end surface of said joint bushing receiving said joint terminal therein; and a talc coating mechanism for applying talc to the inner peripheral surface of said joint bushing receiving said joint terminal therein around said terminal spring, said retraction length check mechanism and said talc coating mechanism being opposed on both sides of said bushing retaining mechanism, said retraction length check mechanism including:

a retraction length measuring rod made of a conductive material and removably inserted into said joint bushing held by said bushing retaining mechanism for removably contacting the edge of said terminal element;

a check element axially movably fitted on and held by said retraction measuring rod and elastically urged toward the forward end of said retraction length measuring rod, said check element for releasably contacting an edge of said joint bushing when said retraction length measuring rod is inserted into said joint bushing; and a retraction length detector for detecting the position of said check element relative to said retraction length measuring rod in contact with the edge of said terminal element, said talc coating mechanism including:

a talc coating rod made of a tubular conductive material and removably inserted into said joint bushing held by said bushing retaining mechanism for releasable elastic contact with an edge of said terminal spring; and a talc pressure feed portion for feeding a predetermined amount of talc under pressure into said talc coating rod, said talc coating rod having a peripheral surface formed with talc emitting holes for emitting talc, said terminal insertion condition check and talc coating portion further includes a continuity detecting portion for detecting continuity between said retraction length measuring rod in contact with said terminal element and said talc coating rod in elastic contact with said terminal spring, and wherein said fourth joint bushing extraction and supply mechanism removes said joint bushing from said check bushing chucking mechanism to feed said joint bushing to said bushing retaining mechanism.

* * * * *